(12) United States Patent
Chan et al.

(10) Patent No.: US 12,492,227 B2
(45) Date of Patent: Dec. 9, 2025

(54) ENGINEERED CRY PROTEINS FOR DELIVERY OF THERAPEUTICS

(71) Applicant: The Chinese University of Hong Kong, Shatin (CN)

(72) Inventors: Michael Chan, Kowloon (CN); Marianne Lee, Kowloon (CN); Zaofeng Yang, Shatin (CN)

(73) Assignee: The Chinese University of Hong Kong, Shatin (CN)

( * ) Notice: Subject to any disclaimer, the term of this patent is extended or adjusted under 35 U.S.C. 154(b) by 965 days.

(21) Appl. No.: 17/602,980

(22) PCT Filed: Apr. 15, 2020

(86) PCT No.: PCT/CN2020/084939
§ 371 (c)(1),
(2) Date: Oct. 11, 2021

(87) PCT Pub. No.: WO2020/211782
PCT Pub. Date: Oct. 22, 2020

(65) Prior Publication Data
US 2023/0113102 A1    Apr. 13, 2023

Related U.S. Application Data

(60) Provisional application No. 62/834,605, filed on Apr. 16, 2019.

(51) Int. Cl.
C07K 14/325    (2006.01)
A61K 47/66    (2017.01)
C12N 15/62    (2006.01)
C12N 15/63    (2006.01)

(52) U.S. Cl.
CPC ............ *C07K 14/325* (2013.01); *A61K 47/66* (2017.08); *C12N 15/62* (2013.01); *C12N 15/63* (2013.01)

(58) Field of Classification Search
None
See application file for complete search history.

(56) References Cited

FOREIGN PATENT DOCUMENTS

| CN | 103588865 A | 2/2014 |
|---|---|---|
| CN | 103748228 A | 4/2014 |
| CN | 107022010 A | 8/2017 |
| WO | 01/40476 A2 | 6/2001 |
| WO | 2008/121633 A1 | 10/2008 |
| WO | 2010/141953 A2 | 12/2010 |

(Continued)

OTHER PUBLICATIONS

Jones, "Macropinocytosis: searching for an endocytic identity and role in uptake of cell-penetrating peptides". J Cell Mol Med. (Year: 2007).*

(Continued)

*Primary Examiner* — Tracy Vivlemore
*Assistant Examiner* — John David Moore
(74) *Attorney, Agent, or Firm* — Kilpatrick Townsend & Stockton LLP

(57) ABSTRACT

Provided are novel recombinant proteins that are capable of self-crystallization and exhibit desirable physical properties such as enhanced cellular uptake or and endoso-mal escape. Polynucleotides encoding the recombinant proteins as well as methods of making and using such proteins are also described.

Figure 1:
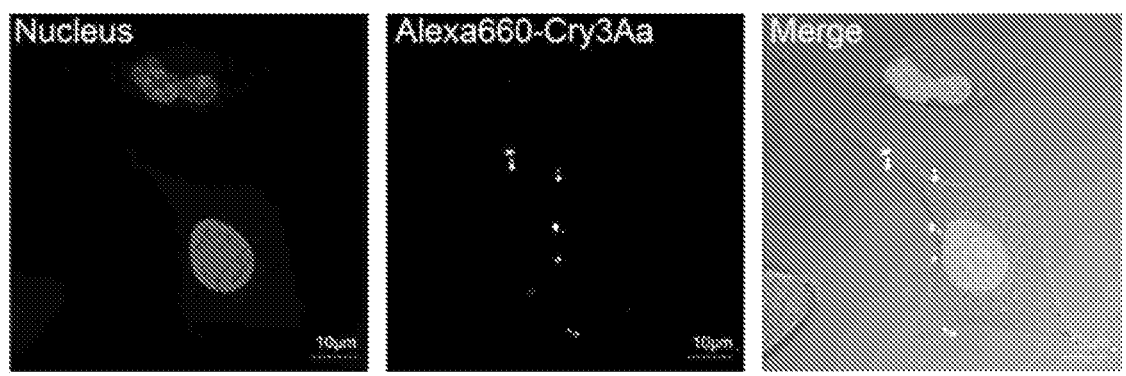

23 Claims, 30 Drawing Sheets
Specification includes a Sequence Listing.

(56) References Cited

FOREIGN PATENT DOCUMENTS

WO     2013/085540 A2     6/2013
WO     2018/028371 A1     2/2018

OTHER PUBLICATIONS

Moh & Shen, "The roles of cell adhesion molecules in tumor suppression and cell migration". Cell Adhesion & Migration (Year: 2009).*

Supplemental European search report for European Patent Application No. 20791621.4, mailed on Apr. 12, 2023, 8 pages.

Nair, et al., "Cry Protein Crystals: A Novel Platform for Protein Delivery," PLOS One, No. 6, vol. 10, Article No. 0127669, 16 pages (Jun. 2015).

International Search Report and Written Opinion for PCT Patent Application No. PCT/CN2020/084939, dated Jul. 15, 2020, 13 pages.

* cited by examiner

Figure 2

```
Cry3Aa   295  VKTELTRDVLTDPIVGVNNLRGYGTTFSNIENYIRKPHLFDYLHRIQFHTRFQPGYYGND
Pos3Aa   295  VKTELTRDVLTDPIVGVNNLRGYGTTFSNIENYIRKPHLFDYLHRIQFHTRFQPGYYGND
              ************************************************************

Cry3Aa   355  SPNYWSGNYVSTRPSIGSNDIITSPFYGNKSSEPVQNLEFNGEKVYRAVANTNLAVWPSA
Pos3Aa   355  SPNYWSGNYVSTRPSIGSNDIITSPFYGNKSSEPVQKLEFNGEKVYRAVANTNLAVWPSA
              ************************************************************

Cry3Aa   415  VYSGVTKVEFSQYNDQTDEASTQTYDSKRNVGAVSWDSIDQLPPETTDEPLEKGYSHQLN
Pos3Aa   415  VYSGVTKVKFSQYNDKTKKASKQTYDSKRNVGAVSWDSIDQLPPETKKPLKRGYSHQLN
              ************************************************************

Cry3Aa   475  YVMCFLMQGSRGTIPVLTWTHKSVD
Pos3Aa   475  YVMCFLMQGSRGTIPVLTWTHKSVD
              *************************
```

Figure 14

VQKLEFKGEK VYRAVANTNL
AVWPSAVYSG VTKVKFSQYN
DKTKKASKQT YDSKRNVGAV
SWDSIDQLPP ETKKKPLKKG
YSH

Figure 17
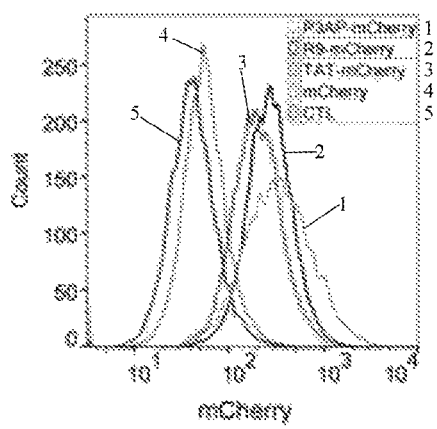
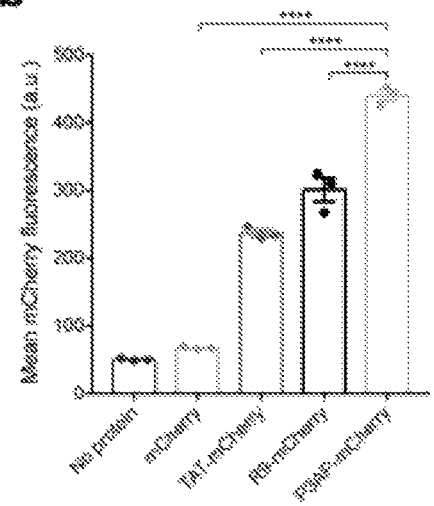
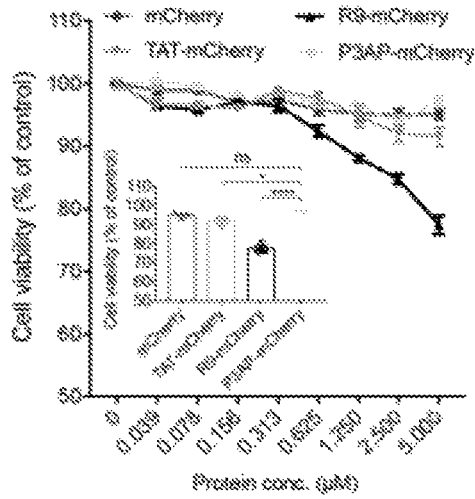

Figure 18

A1. Sequence alignment: Cry1Aa and Cry3Aa (Query)

```
DSSP   llHHHHHHHHHHHHHHLLLLlLLLHhhhhHHHHHHHHHLLLL--HHHHHHHHHHHHHHHL
Query  ttKDVIQKGISVVGDLLGVVgFPFGgalvSFYTNFLNTIWPS--EDPWKAFMEQVEALMD   58
ident         |    |  ||    |       |       ||         |||   |  |  |
Sbjct  --YTPIDISLSLTQFLLSEF-VPGA----GFVLGLVDIIWGIfgPSQWDAFLVQIEQLIN   53
DSSP   --LLHHHHHHHHHHHHHHHLL-LLLH----HHHHHHHHHLLLLllHHHHHHHHHHHHHHHL DSSP   LLLLHHHHHHHHHHHHHHHHHHHHHHHHHHHHHHL111lLLHHHHHHHHHHHHHHHHHHH
Query  QKIADYAKNKALAELQGLQNNVEDYVSALSSWQKNpvssRNPHSQGRIRELFSQAESHFR  118
ident  | |    | ||   |  | ||  |        |           ||      |  |    |
Sbjct  QRIEEFARNQAISRLEGLSNLYQIYAESFREWEAD---pTNPALREEMRIQFNDMNSALT  110
DSSP   LLLLHHHHHHHHHHHHHHHHHHHHHHHHHHHHHHHL---1LLHHHHHHHHHHHHHHHHHH DSSP   HHHHHHLLLLLLLLLHHHHHHHHHHHHHHHHHHLLLLLLLHHHHHHHHHHHHHHHHHHH
Query  NSMPSFAISGYEVLFLTTYAQAANTHLFLLKDAQIYGEEWGYEKEDIAEFYKRQLKLTQE  178
ident         |     |  |    |    | |||| ||   |   |    |  ||     |      |   |        |
Sbjct  TAIPLLAVQNYQVPLLSVYVQAANLHLSVLRDVSVFGQRWGFDAATINSRYNDLTRLIGN  170
DSSP   HHHHHHLLLLLHHHHHHHHHHHHHHHHHHHHHHHHHLHHHLLLHHHHHHHHHHHHHHHH DSSP   HHHHHHHHHHHHHHHLLLLLHHHHHHHHHHHHHHHHHLHHHHLLHHHHLLLLLLLLEELL
Query  YTDHCVKWYNVGLDKLRGSSYESWVNFNRYRREMTLTVLDLIALFPLYDVRLYPKEVKTE  238
ident  |||  |  |||  ||     |        ||  |  |||  ||||||   |||    || |  ||
Sbjct  YTDYAVRWYNTGLERVWGPDSRDWVRYNQFRRELTLTVLDIVALFSNYDSRRYPIR     230
DSSP   HHHHHHHHHHHHHHLLLLLHHHHHHHHHHHHHHHHHLHHHHLLHHHHLLLLLLLLEELL DSSP   LLLEEE1LLLLL--1LLLLLL111LHHHHHLLLLLLLLLEEEEEEEEEEEEL111111LE
Query  LTRDVLtDPIV--qVNNLRGygtTFSNIENYIRKPHLFDYLHRIQFHTRFQPgyygndSF  296
ident  |||      |                 ||   |  |||   |  |                 |
Sbjct                                                                    281
DSSP   LLLEEE-ELHHhh1LLLLLL--1LHHHHHHLLLLLLLLLEEEEEEEEEEEEL------LE DSSP   EEEEEEEEEEEEELLLLLLLEELLLEELLLL-LLLEEEELLLLEEEEEEEEEEEEEEELL--
Query  NYWSGNYVSTRPSIGSNDIITSPFYGNKSS-EPVQNLEFNGEKVYRAVANTNLAVWPS--  353
ident  ||||     |       |  |    | ||          |       |         |
Sbjct                                                                    341
DSSP   EEEEEEEEEEEEEHHHLLLLEELLLEELLLL1EEEEEEELLLLEEEEEEEEEEEEELLLL11

DSSP   ----EEEEEEEEEEEEEELlLLEEEEEEEE1111l1eEEEEHHHLLLLLLLLLLLHHHHL
Query  ----AVYSGVTKVEFSQYNDqTDEASTQTYDskrnvgaVSWDSIDQLPPETTDEPLEKGY  409
ident         ||||     |      |         |                ||  ||   ||       |
Sbjct                                                                    395
DSSP   1111LLEEEEEEEEEEELLL-LLLLLLEEEL-----11LLEEHHHLLLLLLLLLLHHHHL
```

Figure 18

A2. Sequence alignment: Cry1Aa and Cry3Aa (Query)

```
DSSP   LEEEEEEEEEELHH---HLLEEEEEEEEEELLLLLLLEELLLLEEEEEHHHLLEELLLLEE
Query  SHQLNYVMCFLMQG---SRGTIPVLTWTHKSVDFFNMIDSKKITQLPLVKAYKLQSGASV    466
ident  || |                | ||| | ||| |    ||| || |    | || ||
Sbjct  ░░░░░░░░░░░░░░░░░░░░░░░░░░░░░░░FNNIIPSSQITQIPLTKSTNLGSGTSV    455
DSSP   LEEEEEELLEELLLlllLEEEELLEEEEELLLLLLLEELLLLEEEEHHHLLEELLLLEE DSSP   ELLLLLLLLLEEEELLLEEEEEEELEELLLLLEEEEEEEEEEELLEEEEEEELLEEEEE
Query  VAGPRFTGGDIIQCTENGSAATIYVTPDVSYSQKYRARIHYASTSQITFTLSLDGAPFNQ    526
ident  | ||  ||||||  |   |   |        || || || ||||   |  | ||  | ||
Sbjct  VKGPGFTGGDILRRTSPGQISTLRVNITAPLSQRYRVRIRYASTTNLQFHTSIDGRPINQ    515
DSSP   ELLLLLLLLLEEEELLLEEEEEEEEELLLLLLLEEEEEEEEEELLEEEEEEELLEEEEE DSSP   EEELLLLLLLLLLLHHHLEEEELLLLEELLL--LEEEEEELLLLLLLLEEEEEEEEEEEL
Query  YYFDKTINKGDTLTYNSFNLASFSTPFELSG--NNLQIGVTGLSAGDKVYIDKIEFIPVN    584
ident   |  |  |   |  ||   | |||  |             |  ||||  |||  |
Sbjct  GNFSATMSSGSNLQSGSFRTVGFTTPFNFSNgsSVFTLSAHVFNSGNEVYIDRIEFVPAE    575
DSSP   EEELLLLLLLLLLLHHHLEEEELLLLLLLLLleEEEEEEEELLLLLLLEEEEEEEEEELL DSSP   --
Query  --   584
ident
Sbjct  vt   577
DSSP   ll
```

B1. Sequence alignment: Cry2Aa and Cry3Aa (Query)

```
DSSP   ------------------------------------------LLHHHhHHHHHHHHH
Query  ------------------------------------------TTKDViQKGISVVG    14
ident                                                    |
Sbjct  mnnvlnsqrtticdaynvvahdpfsfehksldtiqkewmewkrtdhSLYVA-PVVGTVSS   59
DSSP   lllllllllllllllllllllllllhhhhllhhhhhhhhhhhhhllLLLLLL-LHHHHHHH DSSP   HHLLLL-LLLLHhhhhHHHHHHHHHLLL--LHHHHHHHHHHHHHHHLLLLLHHHHHHHHH
Query  DLLGVV-GFPFGgalvsFYTNFLNTIWP--SEDPWKAFMEQVEALMDQKIADYAKNKALA   71
ident  || |                 | | |    | |        |  |            |
Sbjct  FLLKKVgSLIGK----rILSELWGIIFPsgSTNLMQDILRETEQFLNQRLNTDTLARVNA   115
DSSP   HHHHHHlLLLLL----lLHHHHHHHLHhhLLHHHHHHHHHHHHHHHLLLLLHHHHHHHHH DSSP   HHHHHHHHHHHHHHHHHHHHLLlllllhhHHHHHHHHHHHHHHHHHHHHHHHHHHLLLLLLL
Query  ELQGLQNNVEDYVSALSSWQKNPvssrnphSQGRIRELFSQAESHFRNSMPSFAISGYEV   131
ident  ||  ||| |                  |             |  | | |  | ||
Sbjct  ELIGLQANIREFNQQVDNFLNPT----qnpVPLSITSSVNTMQQLFLNRLPQFQIQGYQL   171
DSSP   HHHHHHHHHHHHHHHHHHHHHLLL----lllLLLHHHHHHHHHHHHHHHHHHHHHLLLLLHH
```

Figure 18

B2. Sequence alignment: Cry2Aa and Cry3Aa (Query)

```
DSSP   LLHHHHHHHHHHHHHHHHHHLLLLLLLHHHHHHHHHHHHHHHHHHHHHHHHH
Query  LFLTTYAQAANTHLFLLKDAQIYGEEWGYEKEDIAEFYKRQLKLTQEYTDHCVKWYNVGL    191
ident  | |   ||||| ||      |        |||               |   |    |    |
Sbjct  LLLPLFAQAANMHLSFIRDVILNADEWGISAATLRTYRDYLRNYTRDYSNYCINTYQTAF   231
DSSP   HHHHHHHHHHHHHHHHHHHHHHHLHHHHLLLHHHHHHHHHHHHHHHHHHHHHHHHHHH DSSP   HHLLLlhhHHHHHHHHHHHHHHHHLHHHHLLHHHHLlllLLLEELLLLLEEELLLLLL
Query  DKLRGssyeSWVNFNRYRREMTLTVLDLIALFPLYDvrlyPKEVKTELTRDVLTDPIVGV   251
ident        |         |   |  |   |
Sbjct  RGLNT----RLHDMLEFRTYMFLNVFEYVSIWSLFK----YQS████████████████   283
DSSP   HLLEE----EHHHHHHHHHHHHHHLHHHHHHHLLLL----LLLEELLLLLLEEELLLLL DSSP   lllllLLLHH-hhHLLL--LLLL-LLEEEEEEEEEEEELLLL-----lLLLEEEEEEE
Query  nnlrgyGTTFS-nlENYI--KKPH-LFDYLHRIQFHTRFQPGYY-----gNDSFNYWSGN   302
ident              |              |  |
Sbjct  ████████████████████████████████████████████████████████████   338
DSSP   -----lLLEEEhhhHHHHHhhHHLlLLLLEEEEEEEEEEEEELlllllEEEEEEEEE DSSP   EEEEEelllllLLEELLLEELLllllEEEEL----LLEEEEEEEEEEEEEEL-LEEEE
Query  YVSTRpsigsnDIITSPFYGNKssepVQNLEFN----GEKVYRAVANTNLAVWP-SAVYS   357
ident       |       |       |    |           |
Sbjct  ████████████████████████████████████████████████████████████   392
DSSP   EEEEH------HHLLLLLEELLlllLEEEELLllllLLLEEEEELLEEEEELlLEEEE DSSP   EEeEEEEEEEellleEEEEEEELllllleEEEEhhhLLLLlllllllhhhhlLEEE-EEE
Query  GVtKVEFSQYndqtdeASTQTYDSkrnvgaVSWDsidQLPPettdeplekqySHQL-NYV   416
ident       |        |           |                 |              |
Sbjct  ████████████████████████████████████████████████████████████   427
DSSP   EL-LLEEEEL------LLLEEEELL----llLLLE---ELLL----------LLEEeEEE DSSP   EEEEL---------------------hhhlLEEEEEEEELLLLLL---------LEE
Query  MCFLM---------------------qgsrgTIPVLTWTHKSVDFF---------NMI   444
ident   |
Sbjct  ██████████████████████████████████████████████IYaanengtmiHLA   487
DSSP   EEELLlhhhhllllllllllllllllllllllLEEEEEEEELLLLEEeellllleeEEL DSSP   L-LLLEEEEHHHLLEELL--LLEEELLlLLLLLLEEEELLEEEEEEELEELLlllLEE
Query  D-SKKITQLPLVKAYKLQS--GASVVAGpRFTGGDIIQCTENGSAATIYVTPDVsysQKY   501
ident              |                ||         |                  |
Sbjct  PeDYTGFTISPIHATQVNNqtRTFISEK-FGNQGDSLRFEQSNTTARYTLRGNG---NSY   543
DSSP   LlLLLEEEELLLLLLEELLhhHEEEELL-LLLLLLEEEELLLEEEEEEEELLL---EEE DSSP   EEEEEEEELLLEEEEEEELlEEEEEEEEELLLLLlllLLHH----HLEEEELlLLEELL-
Query  RARIHYASTSQITFTLSLDgAPFNQYYFDKTINkgdtLTYN----SFNLASFsTPFELS-   556
```

Figure 18

B3. Sequence alignment: Cry2Aa and Cry3Aa (Query)

```
ident         |      |                    |        |          |           |
Sbjct   NLYLRVSSIGNSTIRVTIN-GRVYTVSNVNTTT--nnDGVNdngaRFSDINI-GNIVASd    599
DSSP    EEEEEEELLLLEEEEEEEL-LEEEEEEEELLLL--llLLLEelleELEEEEE-EEEEEL1

DSSP    --LLEEEEEELLL1LLLEEEEEEEEEEL-----
Query   --GNNLQIGVTGLSaGDKVYIDKIEFIPVN-----    584
ident     |  | ||  | |         |  | |  |
Sbjct   ntNVTLDINVTLNS-GTPFDLMNIMFVPTNlpply    633
DSSP    llEEEEEEEEELLL-LLLEEEEEEEEEELLllll1
```

C1. Sequence alignment: Cry4Aa Z and Cry3Aa (Query)

```
DSSP    1LHHHhhHHHHHHHHHLLLLLLLLHHHH-HHHHHHHHHHLLLLL---HHHHHHHHHHHHH
Query   tTKDViqKGISVVGDLLGVVGFPFGGAL-VSFYTNFLNTIWPS---EDPWKAFMEQVEAL    56
ident       |||   |   ||        |                       |   |   |
Sbjct   -GELS--AYTIVVGTVLTGFGFTTPLGLaLIGFGTLIPVLFPAqdqSNTWSDFITQTKNI    57
DSSP    -LLLL--HHHHHHHHHHHHLLLLLLLLLlLLHHHHHHHHHLLLhhhLHHHHHHHHHHHHH DSSP    HLLLLLHHHHHHHHHHHHHHHHHHHHHHHHHHHHHHLl11LLLHHHHhHHHHHHHHHHHH
Query   MDQKIADYAKNKALAELQGLQNNVEDYVSALSSWQKNpvsSRNPHSQGrIRELFSQAESH    116
ident    ||       |    |       |  |       |               |       |
Sbjct   IKKEIASTYISNANKILNRSFNVISTYHNHLKTWENN---PNPQNTQD-VRTQIQLVHYH    113
DSSP    HLLLLLHHHHHHHHHHHLLHHHHHHHHHHHHHHHLLLLL---LLLLLLLL-HHHHHHHHHH DSSP    HHHHHHHHLLLLL---------LLLLLHHHHHHHHHHHHHHHHHHHHLLLLLL11hHHHhh
Query   FRNSMPSFAISG---------YEVLFLTTYAQAANTHLFLLKDAQIYGEEWGyeKEDIae    167
ident   | |   |          |   |  | ||||| ||  |          |
Sbjct   FQNVIPELVNSCppnpsdcdyYNILVLSSYAQAANLHLTVLNQAVKFEAYLKnnTAID--    171
DSSP    HHHHHHHHHHLLl1lhhhhhHHHLLHHHHHHHHHHHHHHHHHHHHHHHHLl1LLLL--

DSSP    HHHHHHHHHHHHHHHHHHHHHHHLLL------llhHHHHHHHHHHHHHHHHHLHHHHL
Query   FYKRQLKLTQEYTDHCVKWYNVGLDKLRG------ssyESWVNFNRYRREMTLTVLDLIA    221
ident     |    |  ||  ||  |  ||                |  |||  || ||||  |
Sbjct   YYPVLTKAIEDYTNYCVTTYKKGLNLIKTtpdsnldgnINWNTYNTYRTKMTTAVLDLVA    231
DSSP    LHHHHHHHHHHHHHHHHHHHHHHHHHHLLl1hhhl1LLHHHHHHHHHHHHHHLHHHHL DSSP    LHHHHLLLLLLLLEELLLLLEEEELLLLL1lLLLLL1LLLHHHHHLL-LLLLLLLEEEEE
Query   LFPLYDVRLYPKEVKTELTRDVLTDPIVgvNNLRGyGTTFSNIENY-IRKPHLFDYLHRI    280
ident   |||  |||  ||   |  ||||                |    | |||| |
Sbjct   LFPNYDVGKYPIG▒▒▒▒▒▒▒▒▒▒▒▒▒▒▒▒▒▒▒▒▒▒▒▒▒▒▒▒▒▒▒▒▒▒▒▒▒▒▒▒▒▒▒▒▒    289
DSSP    LHHHHLLLLLLLLEELLLLLEEEEEELL--LLLHHhHLLHHHHHHHHhLLLLLLLEEEEE DSSP    EEEEEee1111l11LEEEEEEEEEEEELlLLLLLEELLLEELLL-LLLLEEEELLL-LE
Query   QFHTRfqpgyygndSFNYWSGNYVSTRPSIgSNDIIISPFYGNKS-SEPVQNLEFNG-EK    338
ident   |                |          |    |     ||            |
```

Figure 18

C2. Sequence alignment: Cry4Aa Z and Cry3Aa (Query)

```
Sbjct  ▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓  343
DSSP   EEEEL------llllLLLLEEEEEEEEEELL-LLLLEELLLEELLLlLLEEEEEELLLlLE DSSP   EEEEEEEEEEEEellEEEE-EEEEEEEEEEELllLEEEEEEEEL-LLLL--LEEEEEHHh
Query  VYRAVANTNLAVwpsAVYS-GVTKVEFSQYNDqtDEASTQTYDS-KRNV--GAVSWDSId  394
ident                        |   |   |
Sbjct  ▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓  398
DSSP   EEEEEEEEELLL--lLLLLlLEEEEEEEEEELL--LLEEEEEEELlLLLLllLEEEEEEL- DSSP   lLLLLLLLLL----HHHHLLEEEEEEEEEEELH-HHLLEEEEEEEEEELLLLLLLEELLLE
Query  qLPPETTDEP----LEKGYSHQLNYVMCFLMQ-GSRGTIPVLTWTHKSVDFFNMIDSKKI  449
ident    ||       |       |||  |              ||| |||    | |
Sbjct  ▓▓▓▓▓▓▓▓▓▓▓▓▓▓▓▓▓▓▓▓▓▓▓▓▓▓▓▓▓▓▓▓▓▓▓▓▓▓▓▓▓▓PKNTIYTHLT  457
DSSP   -LLLLLLLLLllllLLLLLLEEEEEEEEEELLLlLLLLLEEEEEEELLLLLLLLLLLLLE DSSP   EEEEHHHLLEELLLLEEELLLLLLLLEEEELlleEEEEEEELEELLLlLLEEEEEEEEEE
Query  TQLPLVKAYKLQSGASVVAGPRFTGGDIIQCTengSAATIYVTPDVSySQKYRARIHYAS  509
ident  || |  |||  |     || || |||| |          |      |  || |||
Sbjct  TQIPAVKANSLGTASKVVQGPGHTGGDLIDFK---DHFKITCQHSNF-QQSYFIRIRYAS  513
DSSP   EEEEHHHLLEELLLLEEELLLLLLLLLEEELL---LEEEEEELLLL-LEEEEEEEEEE DSSP   LL----LEEEEEELLEEEEEEEELLLLLLLL--LLLHHHLEEEELLLLEELL---LLEE
Query  TS----QITFTLSLDGAPFNQYYFDKTINKGD--TLTYNSFNLASFSTPFELS---GNNL  560
ident  ||    |              |       ||     |   |        ||       |
Sbjct  NGsantRAVINLSIPGVAELGMALNPTFSGTDytNLKYKDFQYLEFSNEVKFApnqNISL  573
DSSP   LLlllLLEEEEEELLEEEEEELLLLLLLLLllLLLHHHLEEEELLLLEEELllEEEE DSSP   EEEEELLLLLLLEEEEEEEEEEL-
Query  QIGVTGLSAGDKVYIDKIEFIPVN-   584
ident           | |||||| |
Sbjct  VFNRSDVYTNTTVLIDKIEFLPITr   598
DSSP   EEEELLLLLLLLEEEEEEEEEELl
```

D1. Sequence alignment: Cry5B and Cry3Aa (Query)

```
DSSP   llhhhhhhhhhhhhhllllllllhhhhhhhhhhhhhhllllhhhhhhhhhhhhhhhlllL
Query  ttkdviqkgisvvgdllgvvgfpfggalvsfytnflntiwpsedpwkafmeqvealmdqK  60
ident
Sbjct  ----------------------------------------kdqqlfnaimdavnkmvdnkF  21
DSSP   ---------------------------------------lllhhhhhhhhhhhhhhhhH DSSP   LLHhHHHHHHHHHHHHHHHHHHHHHHHHHHHL--------------LLLLLLHHHHHHH
Query  IADyAKNKALAELQGLQNNVEDYVSALSSWQKN--------------PVSSRNPHSQGRI  106
ident    ||| |        |                                        |
Sbjct  LSY-NLSTLNKTIEGLQGNLGLFQNAIQVAICQgstperfdqnctpcNPNQPCKDDLDRV  80
```

Figure 18

D2. Sequence alignment: Cry5B and Cry3Aa (Query)

```
DSSP   HHH-HHHHHHHHHHHHHHHHHHHHHHHLLLl111111111111LLLLLLHHHHHH

DSSP   HHHHHHHHHHHHHHHHHLLLL------------LLLLLHHHHHHHHHHHHHHHHHH
Query  RELFSQAESHFRNSMPSFAISG------------YEVLFLTTYAQAANTHLFLLKDAQIY   154
ident   |   |   |   | |                  |   |   |   |  || |
Sbjct  ASRFDTANSQFTQHLPEFKNPWsdenstqefkrtSVELTLPMYTTVATLHLLLYEGYIEF   140
DSSP   HHHHHHHHHHHHHHHHHHLLLLl1lllhhhhhHHHHHHHHHHHHHHHHHHHHHHHH DSSP   LL-LLLLLHHHHHHHHHHHHHHHHHHHHHHHHHhLLLL--LHHHHHHHHHHHHHH
Query  GE-EWGYEKEDIAEFYKRQLKLTQEYTDHCVKWYNVGLdkLRGS--SYESWVNFNRYRRE   211
ident    |    |           |         |    |   |    ||| |
Sbjct  MTkWNFHNEQYLNNLKVELQQLIHSYSETVRTSFLQFL--PTLNnrSKSSVNAYNRYVRN   198
DSSP   HHhLLLLLHHHHHHHHHHHHHHHHHHHHHHHHHHHHL--LLLLl1LHHHHHHHHHHHH DSSP   HHHHLHHHHLLHHHHLLLLLLLLLEELLLLLEEELLLL--LLLL--------LLLLLLLL--
Query  MTLTVLDLIALFPLYDVRLYPKEVKTELTRDVLTDPI--VGVN--------NLRGYGTT--   260
ident  ||   ||   |   |   |   |  ||| | |                        |
Sbjct  MTVNCLDIAATWPTFDTHNYHQG[...]   258
DSSP   HHHHLHHHHLLHHHHLLLLLLLLLEEELLLLEELLLLl1LLLLl11l1l1LHHHLLEEel DSSP   ---------hhhhHLLL-LLLLLLEEEEEEEEEEEEEel1111LLLEEEEEEEEEEEell
Query  --------fsniENYI-RKPHLFDYLHRIQFHTRFqpgyygNDSFNYWSGNYVSTRpsi   310
ident                 |    |      |      |      |      |
Sbjct  [...]   311
DSSP   lhhhl111111l11LLLHhHLLLLLLLEEEEEEEEEL----l1LLLLLEEEEEEEEEL---

DSSP   l11LLEELlLEELL---------1LLLLEEEEL111EEEEEEEEEEEEEEELleeeeeeEEE
Query  gsnDIITSpFYGNK---------sSEPVQNLEFngeKVYRAVANTNLAVWPsavysgvTKV   362
ident     |     ||                 |                  |
Sbjct  [...]   362
DSSP   ---LLLEE-EEELL11111111LEEEEEEEL---LEEEEEEEEEEELLL--lleeeEEE DSSP   EEEEEell1leeEEEEEE--LLLLL----LEEEEEHhhLLLLl1111lhhhhlLEEEEEE
Query  EFSQYndqtdeaSTQTYD--SKRNV----GAVSWDSidQLPPettdeplekgySHQLNYV   416
ident                                |                      |
Sbjct  [...]   402
DSSP   EEEEL--------LLEELLl1HHHHHhh1lLLEELLL--LLLL-----------LEEEEEE DSSP   EEEELHH----HLLEEEEEEEELLLLLLLEELL---------LLEEEEEHHHLL--EEL
Query  MCFLMQG-----SRGTIPVLTWTHKSVDFFNMIDS---------KKITQLPLVKAY--KLQ   461
ident                                                  | |           | |
Sbjct  [...]PENVIGDvnadtklplTQLKGFPFEKYGseYNN   462
DSSP   EEEEELLl111LLLLLEEEEEEEELLLLLEEELl11111111LLEEEEELLLLLhhHLL DSSP   LLLEEEELLlLLLLLLLEEEELLLEeEEEEELEELLl1LLEEEEEEEEEEELLLEEEEEEL-
```

Figure 18

D3.   Sequence alignment: Cry5B and Cry3Aa (Query)

```
Query  SGASVVAGpRFTGGDIIQCTENGsAATIYVTPDVsySQKYRARIHYASTSQITFTLSLD-  520
ident  | | |           |                | |      | | |   | | | |              |
Sbjct  RGISLVRE-WINGNNAVKLSNSQ-SVGIQITNQT--KQKYEIRCRYASKGDNNVYFNVDl  518
DSSP   LLLLEEEE-HHHLEEEEEELLLL-EEEEEEEELL--LEEEEEEEEEEELLLEEEEEEELl DSSP   --lEEEEEEEELLLLLlllLLHH---HLEEEELlLLEELL--LLEEEEEEELLlllLLE
Query  --gAPFNQYYFDKTINkgdtLTYN---SFNLASFsTPFELS--GNNLQIGVTGLsagDKV  573
ident     |   |   |            | | | |       |   |          |    |
Sbjct  senPFRNSISFGSTES-svvGVQGengKYILKSI-TTVEIPagSFYVHITNQGS---SDL  573
DSSP   lllLEEEEEEELLLLL-lllLEELllEEEEEE-EEEEELeEEEEEEEELLL---LLE DSSP   EEEEEEEEEEL-
Query  YIDKIEFIPVN-  584
ident  |  |||  |
Sbjct  FLDRIEFVPKIq  585
DSSP   EEEEEEEEELLl
```

E1.   Sequence alignment: Cry7Ca1 and Cry3Aa (Query)

```
DSSP   llhHHHHHHHHHHHHHLLLLLLLLHHHHHHHHHHHHHLLL--LHHHHHHHHHHHHHHHL
Query  ttkDVIQKGISVVGDLLGVVGFPFGGALVSFYTNFLNTIWP--SEDPWKAFMEQVEALMD  58
ident      |  ||      |    |     |       |       | |   | |   | ||||
Sbjct  ---SMIFSSISIIRTFMGFAGHGTAGGIIGLFTEVLRLLWPnkQNDLWESFMNEVEALIN  57
DSSP   ---LHHHHHHHHHHHHHHLLLLLLHHHHHHHHHHHHHHHLHhhLLHHHHHHHHHHHHHHL DSSP   LLLLHHHHHHHHHHHHHHHHHHHHHHHHHHHHLLlllLLHHHHHHHHHHHHHHHHHHH
Query  QKIADYAKNKALAELQGLQNNVEDYVSALSSWQKNPvssRNPHSQGRIRELFSQAESHFR  118
ident  | |      ||| || || |  | | |||  || |          |     | |    |
Sbjct  QEITEAVVSKALSELEGLRNALEGYTSALEAWQNNR---SDKLKQLLVYERFVSTENLFK  114
DSSP   LLLLHHHHHHHHHHHHHHHHHHHHHHHHHHHHHLLL---LLHHHHHHHHHHHHHHHHHH DSSP   HHHHHHLLLLLLLLLLHHHHHHHHHHHHHHHHHHLLLLLLLHHHHHHHHHHHHHHHHHH
Query  NSMPSFAISGYEVLFLTTYAQAANTHLFLLKDAQIYGEEWGYEKEDIAEFYKRQLKLTQE  178
ident  ||||     | |  ||||||||| ||||||  | |||  |  |  |  | |  |   |
Sbjct  FAMPSFRSVGFEGPLLTVYAQAANLHLFLLKNAELFGAEWGMQQYEIDLFYNEQKGYVEE  174
DSSP   HHHHHHLLLLLLLLHHHHHHHHHHHHHHHHHHHHLLLHHHHHHHHHHHHHHHHHHHHH DSSP   HHHHHHHHHHHHHHLLL---LLHHHHHHHHHHHHHHHHLHHHHLLHHHHLLLLLLLLE
Query  YTDHCVKWYNVGLDKLRG---SSYESWVNFNRYRREMTLTVLDLIALFPLYDVRLYPKEf  235
ident  |||||||||  || ||           | || ||||| | ||| || ||| ||  | |
Sbjct  YTDHCVKWYKEGLNKLKNasgVKGKVWENYNRFRREMTIMVLDLLPLFPIYDARTYPMEf  234
DSSP   HHHHHHHHHHHHHHHHLlllLHHHHHHHHHHHHHHHHHLHHHLLHHHHLLLLLLLLE
```

Figure 18

E2.  Sequence alignment: Cry7Ca1 and Cry3Aa (Query)

```
DSSP   ELLLLLEEEELLLLLLLL-------LLLLLLL-LHHHHHLL-LLLLLLLEEEEEEEEEEEE
Query  KTELTRDVLTDPIVGVN-------NLRGYGT-TFSNIENY-IRKPHLFDYLHRIQFHTRF    286
ident  |||||   ||||              |      |  |||  | ||  ||    |    |
Sbjct                                                                294
DSSP   ELLLLLEEELLLLLLLLL111111lLHHHHLL1LHHHHHHhLLLLLLLEEEEEEEEEEEE DSSP   ELL11lLLLEEEEEEEEEEEEEELL1LLLLEEL1LEELLL-LLLEEEELLLLEEEEEEEE
Query  QPGyygNDSFNYWSGNYVSTRPSIgSNDIITSpFYGNKS-SEPVQNLEFNGEKVYRAVAN    345
ident         ||  |  |  ||        |     |  ||  ||             |
Sbjct                                                                349
DSSP   ELL---LLLEEEEEEEEEEEEELL-LLLLEEE-EEELLL1LLEEEEEELLLEEEEEEEE DSSP   EEEEEE1LEEEEEEEEEEEEEEEL1LLEEEEEEEELLLL---1LEEEEEHHHLLLL11LL
Query  TNLAVWpSAVYSGVTKVEFSQYNDqTDEASTQTYDSKRN---vGAVSWDSIDQLPPetTD    402
ident    |  |       |      |      |      |         |  ||||
Sbjct                                                                405
DSSP   EEEEEL-LLEEEEEEEEEEEEEEL-LLLEEEEEEELLLLL1hhHLEEEEHHHLLLL--LL DSSP   LLHHH-----HLLEEEEEEEEEELHHHLLEEEEEEEEELLLLLLLEELLLLEEEEEHHHL
Query  EPLEK-----GYSHQLNYVMCFLMQGSRGTIPVLTWTHKSVDFFNMIDSKKITQLPLVKA    457
ident     |  |  ||       |||||| ||| ||   |          |||| |  |||
Sbjct                                                    PDNKLYPDKITQIPAVKA    465
DSSP   LLLLL11111LLLEEEEEEEELLLLLLLLLLEEEEEEEELLLLLLLLLLLEEEEHHHL DSSP   LEEL-LLLEEELL1LLLLLLEEEELL----LEEEEEEELEELL11LLEEEEEEEEEELLL
Query  YKLQ-SGASVVAGpRFTGGDIIQCTE----NGSAATIYVTPDVsySQKYRARIHYASTSQ    512
ident   |       |||   |||                    ||  ||   |   |||
Sbjct  FETNtAGVEIIDS-ASTGGPILKIVNnnlpSNQVFRMRLSFSE--PQKIKVRVRYAATGD    522
DSSP   LEEL1LLEEEEELL-LLLLLLEEEEEHhh11LLEEEEEELLLLL--LLEEEEEEEEELLL DSSP   EEEEEEE11eEEEEEEEELLLLLLLLLLLhhHLEEEELLL--LEEL1LLEEEEEE---ELL
Query  ITFTLSLdgaPFNQYYFDKTINKGDTLtynSFNLASFST--PFELsGNNLQIGV---TGL    567
ident      |        ||  |  |  |
Sbjct  GVMSFSG---IAHDEYFTATMKEGEAL---KYSYLTMGNdyAGTA-AELSMLYIikaNTS    575
DSSP   EEEEELL---LLLLEEELLLLLLLLLL---LLEEEEELL1lLEEL-LLEEEEEELhhHLL DSSP   L11LLEEEEEEEEEEEL
Query  SagDKVYIDKIEFIPVN    584
ident        ||||||||||
Sbjct  N--CTIYIDKIEFIPVV    590
DSSP   L--LEEEEEEEEEEELL
```

Figure 18

F1. Sequence alignment: Cry8Ea1 and Cry3Aa (Query)

```
DSSP  -LLHHHHHHHHHHHHHLLLLLLLLHHHHHHHHHHHHHHLLLL-HHHHHHHHHHHHHHL
Query -TTKDVIQKGISVVGDLLGVVGFPFGGALVSFYTNFLNTIWPS-EDPWKAFMEQVEALMD    58
ident      |    || ||  ||  |  |  || |       ||      |  ||||||||
Sbjct iSERDAVKTAISLVGTILGKLGVPLVGPIVSLYSTLIDVLWPGgKSQWEIFMEQVEALIN    60
DSSP  lHHHHHHHHHHHHHHHHHHHHLLLLLHHHHHHHHHHHHHHHHHLLLlLLHHHHHHHHHHHHL DSSP  LLLLHHHHHHHHHHHHHHHHHHHHHHHHHHHHLLlllLLHHHHHHHHHHHHHHHHHHHH
Query QKIADYAKNKALAELQGLQNNVEDYVSALSSWQKNPvssRNPHSQGRIRELFSQAESHFR   118
ident |||| ||  ||||||  || ||   |   ||  ||        |   |    |    | |
Sbjct QKIAEYARAKALAELEGLGNNYQLYLTALEEWQENP---SSTRVLRDVRNRFEILDSLFT   117
DSSP  LLLLHHHHHHHHHHHHHHHHHHHHHHHHHHHHHLLL---LLHHHHHHHHHHHHHHHHHHH DSSP  HHHHHHLLLLLLLLLHHHHHHHHHHHHHHHHHHHLLLLLLLHHHHHHHHHHHHHHHHHH
Query NSMPSFAISGYEVLFLTTYAQAANTHLFLLKDAQIYGEEWGYEKEDIAEFYKRQLKLTQE   178
ident   ||||    ||||  |  ||||||| || |||| ||  |||||  |   |  ||  |
Sbjct QYMPSFRVTGYEVPLLSVYAQAANLHLLLLKDASIFGEEWGFSTTAINNYYNRQMSLIAQ   177
DSSP  HHHHHHLLLLLLLLHHHHHHHHHHHHHHHHHHHHHHHLLLLLLLHHHHHHHHHHHHHHHH DSSP  HHHHHHHHHHHHHHLLLLLHHHHHHHHHHHHHHHHHLHHHHLHHHHLLLLLLLLEELL
Query YTDHCVKWYNVGLDKLRGSSYESWVNFNRYRREMTLTVLDLIALFPLYDVRLYPKEVKTE   238
ident | |||| ||  ||| | ||   || ||  || |||||| |||  || || || || | |
Sbjct YSDHCVQWYRTGLDRLKGSNAKQWVEYNRFRREMTLSVLDIMTLFPMYDMRTYPME       237
DSSP  HHHHHHHHHHHHHHLLLLLLHHHHHHHHHHHHHHHHHHLHHHHHLHHHHLLLLLLLLEELL DSSP  LLLEEEELLLLLLL----LLLLlLLLLLHHHHHLL-LLLLLLLEEEEEEEEEEEELLlLLL
Query LTRDVLTDPIVGV----NNLRgYGTTFSNIENY-IRKPHLFDYLHRIQFHTRFQPGyYGN   293
ident ||| |  ||||             |    ||  ||    |       |
Sbjct                                                                295
DSSP  LLLEEELLLLLLLlll1LHHH-LLLLHHHHHHhLLLLLLLEEEEEEEEEEEEEE-LLL DSSP  LLEEEEEEEEEEEELLllLLLEELlLEELLL---LLLLEEELLLEEEEEEEEEEEE
Query DSFNYWSGNYVSTRPSIgsNDIITSpFYGNKS---SEPVQNLEFNGEKVYRAVANTNLAV   350
ident   |    | |    |      |  | |  |       |   |     | |   |
Sbjct                                                                352
DSSP  EEEEEEEEEEEEEEELL--LLLEEE-EEELLLlllLLEEEEELLLEEEEEEEEEEEE DSSP  ELLEEEEEEEEEEEEEELLLLEEEEEEEELLLL-lLEEEEHHHLLLLLLLLLLLHHHHL
Query WPSAVYSGVTKVEFSQYNDQTDEASTQTYDSKRN-vGAVSWDSIDQLPPETTDEPLEKGY   409
ident   ||  || |            |  ||   ||    ||||| |   |
Sbjct                                                                412
DSSP  LLLLEEEEEEEEEEEELLLLLLEEEEELLLLLllEEEEEHHHLLLLLLLLLLHHHHL DSSP  LEEEEEEEEEELhhhlLEEEEEEEEEELLLLLLLEELLLLEEEEEHHHLEELllLEEE--
Query SHQLNYVMCFLMqgsrGTIPVLTWTHKSVDFFNMIDSKKITQLPLVKAYKLqsgASVV--   467
ident  | ||||           ||  ||| |   |    |||| |  |   |
Sbjct                                RTNTVYSDKITQIPVVKASDG---PKPSan   465
```

Figure 18

F2.  Sequence alignment: Cry8Ea1 and Cry3Aa (Query)

```
DSSP   LEEEEEEEEELL----LLEEEEEEEELLLLLLLEELLLLEEEEHHHLLLL---LLLLll

DSSP   LLLLLLLLLEEEELLLEEEEEEELEELLLLLEEEEEEEEEELLLEEEEEEELLEEEEEE
Query  AGPRFTGGDIIQCTENGSAATIYVTPDVSYSQKYRARIHYASTSQITFTLSLDGAPFNQY   527
ident   ||| |    ||  |       ||||| || | |            |  |
Sbjct  EVGHYLGGDPISFNSSGSTGVIRLNINSPLSQKYRVRIRYCSSVDFDLDVVRGGTTVNNG   525
DSSP   LHHHHLLLLLEEELLLEELLLEEEEELLLLLEEEEEEEEEELLLEEEEEEELLEEEEEE DSSP   EELLLLLLLL--LLLHHHLEEEELLLLEELLL--LEEEEEELLLLL---LLEEEEEEEE
Query  YFDKTINKGD--TLTYNSFNLASFSTPFELSG--NNLQIGVTGLSAG---DKVYIDKIEF   580
ident   | |          | | | ||||||       | |   |        |||| ||
Sbjct  RFNKSAPNVGwqSLKYENFKFASFSTPFTFNQaqDTLKISVRNFSSIvggSVVYIDRIEL   585
DSSP   EELLLLLLLLhhHLLHHHLEEEELLLLLLLLLeEEEEEEEELLLLLlllLLEEEEEEEE DSSP   EEEL
Query  IPVN   584
ident  ||||
Sbjct  IPVN   589
DSSP   EEEL
```

G1.  Sequence alignment: Cry10Aa and Cry3Aa (Query)

```
DSSP   llhhhhhhhhHHHHHHLLLLlLLLLHhhhHHHHHHHHHLLLL--HHHHHHHHHHHHHHL
Query  ttkdviqkgiSVVGDLLGVVgFPFGgalVSFYTNFLNTIWPS--EDPWKAFMEQVEALMD    58
ident            |      |     |          |  |
Sbjct  ----------TMLGAFAAPV-LAAG---IISFGTLLPIFWQGsdPANVWQDLLNIGGRPI    46
DSSP   ----------LHHHHHHLLL-LLLL---LHHHHHHHHHLLLLllHHHHHHHHHHHHLLLL DSSP   LLLLHHHHHHHHHHHHHHHHHHHHHHHHHHLlllLLHHHHHHHHHHHHHHHHHH
Query  QKIADYAKNKALAELQGLQNNVEDYVSALSSWQKNpvssRNPHSQGRIRELFSQAESHFR   118
ident   | |    |        |       |       |          || |
Sbjct  QEIDKNIINVLTSIVTPIKNQLDKYQEFFDKWEPA----RTHANAKAVHDLFTTLEPIID   102
DSSP   LLLLHHHHHHHHHHHHHHHHHHHHHHHHHHHLLL----LLHHHHHHHHHHHHHHHHHH DSSP   HHHHHHLLL-LLLLLLHHHHHHHHHHHHHHHHHHLLLLLLL-------HHHHHHHH
Query  NSMPSFAIS-GYEVLFLTTYAQAANTHLFLLKDAQIYGEEWGYE-------KEDIAEFYK   170
ident            |   |  ||| |  || ||| |    |
Sbjct  KDLDMLKNNaSYRIPTLPAYAQIATWHLNLLKHAATYYNIWLQNqginpstFNSSNYYQG   162
DSSP   HHHHHHLLLlLLHHHHHHHHHHHHHHHHHHHHHHHHHLHHHLHHhhhhhlLLHHHHHHH

DSSP   HHHHHHHHHHHHHHHHHHHHHHLLLLLHHHHHHHHHHHHHHHHHHHLHHHHLLHHHHLLLL
```

Figure 18

G2.    Sequence alignment: Cry10Aa and Cry3Aa (Query)

```
Query  RQLKLTQEYTDHCVKWYNVGLDKLRGSSYESWVNFNRYRREMTLTVLDLIALFPLYDVRL  230
ident  |||||  |   || ||     |      |  | ||  ||||||||||| || ||
Sbjct  YLKRKIQEYTDYCIQTYNAGLTMIRTNTNATWNMYNTYRLEMTLTVLDLIAIFPNYDPEK  222
DSSP   HHHHHHHHHHHHHHHHHHHHHLLLLHHHHHHHHHHHHHHHHLHHHHLLHHHHLLLL DSSP   LLLLEELLLLLEEELlLLLLLllLLLLLllLHHHHHLLLLLLLLLEEEEEEEEEEEELLL
Query  YPKEVKTELIRDVLTdPIVGvnNLRGygtTFSNIENYIRKPHLFDYLHRIQFHTRFQPGY  290
ident  ||  ||  ||   |  |               ||  ||        | ||
Sbjct  YPIG                                                          277
DSSP   LLLLEELLLLLEEEE-LHHH-hLLLL---LHHHHHLLLLLLLLEEEEEEEEEEEEEEL DSSP   LLLLLEEEEEEEEEEEEEELLLLLLLEELLLEELLLL-LLLEEEELLLLEEEEEEeeEEE
Query  YGNDSFNYWSGNYVSTRPSIGSNDIITSPFYGNKSS-EPVQNLEFNGEKVYRAVAhtNLA  349
ident          ||        ||    || |     |    |    |   |
Sbjct                                                                335
DSSP   LLLEEEEEEEEEEEEEEEHHHLLLLEELLLEELLLLlEEEEEEELLLLLEEEEEL--LEE DSSP   EELL------EEEEEEEEEEEEEellleEEEEEElllllleEEEEhhhlllllllLL
Query  VWPS-------AVYSGVTKVEFSQYndqtdeASTQTYDskrnvgaVSWDsidqlppettDE  403
ident                         |
Sbjct                                                                 380
DSSP   LLLLlllllLLEELLLLEEEEEL------LLLEEEL------lLLLL---lllllllLL DSSP   LHHHHLLEEEEEEEEEEELHH---HLLEEEEEEEEEELLLLLLLEELLLLEEEEEHHHLEE
Query  PLEKGYSHQLNYVMCFLMQG---SRGTIPVLTWTHKSVDFFNMIDSKKITQLPLVKAYKL  460
ident  |   |  |             ||| ||||  |  ||        |||         || |
Sbjct                                              FQNTIDLDNITQIHALKALKV  440
DSSP   LHHHHLLEEEEEEELLEELLL111LEEEELLEEEEELLLLLLLEELLLLEEEEHHHLLLL DSSP   LLLLEEELLLLLLLLLEEEElllEEEEEELEELLLLLLEEEEEEEEEELLLEEEEEEL
Query  QSGASVVAGPRFTGGDIIQCtengSAATIYVTPDVSYSQKYRARIHYASTSQITFTLSLD  520
ident  |    |  || ||||         |       |    | ||  |      |
Sbjct  SSDSKIVKGPGHTGGDLVIL---kDSMDFRVRFLKNVSRQYQVRIRYATNAPKTTVFLTG  497
DSSP   LLLLEEELLLLLLLLLEEEL---lLLLLEEEELLLLLLEEEEEEEELLLEEEEEEE DSSP   L---EEEEEEEELLLLLLLLLLHHHLEEEELLLLEELLL--LEEEEEELLL---LLLL
Query  G---APFNQYYFDKTINKGDTLTYNSFNLASFSTPFELSG--NNLQIGVTGLS---AGDK  572
ident               ||| |    |
Sbjct  IdtiSVELPSTTSRQNPNATDLTYADFGYVTFPRTVPNKTfeGEDTLLMTLYGtpnHSYN  557
DSSP   LllEEEEEEEELLLLLLLLHHHLEEEELLLLLLLLleEEEEEEELLLlllLLLL DSSP   EEEEEEEEEEL--
Query  VYIDKIEFIPVN--   584
ident  |||||||||
Sbjct  IYIDKIEFIPITqs   571
DSSP   EEEEEEEEELL11
```

Figure 18

H1. Sequence alignment: Cry11Aa and Cry3Aa (Query)

```
DSSP   llhhhhhhhhhhhhhhllllllllhhhhhhhhhHHHHHLLLL--HHHHHHHHHHHHHHHL
Query  ttkdviqkgisvvgdllgvvgfpfggalvsfytNFLNTIWPS--EDPWKAFMEQVEALMD    58
ident                                |  |            | |  |
Sbjct  --------------------------------KVLSLIFPGsqPATMEKVRTEVETLIN    27
DSSP   --------------------------------LHHHHLLLLlHHHHHHHHHHHHHHHHL DSSP   LLLLHHHHHHHHHHHHHHHHHHHHHHHHHHHHLlllllhHHHHhhHHHHHHHHHHHHHH
Query  QKIADYAKNKALAELQGLQNNVEDYVSALSSWQKNpvssrnpHSQGriRELFSQAESHFR   118
ident  ||       |  ||  |                                     |
Sbjct  QKLSQDRVNILNAEYRGIIEVSDVFDAYIKQPGFT-------PATA--KGYFLNLSGAII    78
DSSP   LLLLHHHHHHHHHHHHHHHHHHHHHHHHHHHHHHL-------LLLL--LLHHHHHHHHHH DSSP   HHHHHHLLLLLLLLLHHHHHHHHHHHHHHHHHHHHLLLLLLLHHHHHHHHHHHHHHHHH
Query  NSMPSFAISGYEVLFLTTYAQAANTHLFLLKDAQIYGEEWGYEKEDIAEFYKRQLKLTQE   178
ident   |    ||    |    ||  |  || ||||   | ||    |   | |
Sbjct  QRLPQFEVQTYEGVSIALFTQMCTLHLTLLKDGILAGSAWGFTQADVDSFIKLFNQKVLD   138
DSSP   HHHHHHLLLLLHHHHHHHHHHHHHHHHHHHHHHHHLHHHLLLHHHHHHHHHHHHHHHHHH DSSP   HHHHHHHHHHHHHHHHLLLLLhHHHHHhHHHHHHHHHHHLHHHHLLHHHHHLLLlLLLLEELL
Query  YTDHCVKWYNVGLDKLRGSSyeSWVNfNRYRREMTLTVLDLIALFPLYDVRlyPKEVKTE   238
ident  |        |           |   |       |   | |
Sbjct  YRTRLMRMYTEEFGRLCKVS--LKDG-LTFRNMCNLYVFPFAEAWSLMRYE--GLK       193
DSSP   HHHHHHHHHHHHHHHHHLLLL--LLLL-LHHHHHHHHHLHHHHLLHHHHLLL--LLLEELL DSSP   LLLEEEL1LLLLL--LLLLLL1l1LHHHHHLLLLLLLLLEEEEEEEEEEEELLLL---LL
Query  LTRDVLTdPIVG--VNNLRGygtTFSNIENYIRKPHLFDYLHRIQFHTRFQPGYY---GN   293
ident          | |           |            |          |
Sbjct                                                                 250
DSSP   LLLEEEE-LLLL1lLLLLLL--1LHHHHHHLLLLLLLLLEEEEEEEEEEEEEEEl1eEE DSSP   LLEEEEEEEEEEEEEELLLLLLLLEELLLEELLLL-LLLEEEELLLLEEEEEEEEEEEEEL
Query  DSFNYWSGNYVSTRPSIGSNDIITSPFYGNKSS-EPVQNLEFNGEKVYRAVANTNLAVWP   352
ident    |       |        |     |     |   |        |       |
Sbjct                                                                 310
DSSP   EEEEEEEEEEEEEEEEHHHLLLLEELLLEELLLL1EEEEEEELLLLEEEEEELEEEELLL DSSP   L------EEEEEEEEEEEEEE1l11EEEEEEEE1l11l1eEEEEHHHLLLLLLLLLL---
Query  S-------AVYSGVTKVEFSQYNdqtdEASTQTYDskrnvgaVSWDSIDQLPPETTDE---   403
ident                           |                      |   |
Sbjct                                                                 361
DSSP   L111111LLEEEELLEEEEEELL----LLLLEEEL-----1LLLEEHHHLLLLLLLLL111
```

Figure 18

H2. Sequence alignment: Cry11Aa and Cry3Aa (Query)

```
DSSP   -LHHHHLLEEEEEEEEELH----HHLLEEEEEEEELLLLLLLEE---LLLLEEEEEHH
Query  PLEKGYSHQLNYVMCFLMQ---GSRGTIPVLTWTHKSVDFFNMI---DSKKITQLPLV   455
ident    ||                |          |       | |
Sbjct                                            TENIIvgfAPDNTKDFYSK   421
DSSP   lLLLLLLLEEEEEELLEELLlllLLEEEELLEEEEELLLLLLLLHhhhLLLLEEEEHH DSSP   HLLEELLLLEEELLLLLLLLEEEEL---LLEEEEEEELEELLLLLLEEEEEEEEELLL
Query  KAYKLQSGASVVAGPRFTGGDIIQCT---ENGSAATIYVTPDVSYSQKYRARIHYASTSQ  512
ident    |    |    |    || | |      |       |           | |
Sbjct  KSHYLSNDSYVIPALQFTDGSIKFARtfiSNEAKYSIRLNTGFNTATRYKLIIRVRVPYR  481
DSSP   HLLEELLLEEEELLLLLLLLLEEEELlllLLEEEEEEEEELLLLLLLLEEEEEEELLLL DSSP   EEEEEEELLEEEEEEEELLLLLL---LLLL--LHHHLEEEELllLEELLL--LEEEEEEE
Query  ITFTLSLDGAPFNQYYFDKTINK---GDTL--TYNSFNLASFstPFELSG--NNLQIGVT  565
ident    |       |              |         |                |
Sbjct  LPAGIRVQSQNSGNNRMLGSFTAnanPEWVdfVTDAFTFNDL--GITTSStnALFSISSD  539
DSSP   EEEEEEELLEEEEEEEELLLLLLLhhHHHHhhHLLLLEEEEL--LLLLLLeEEEEEEEL DSSP   LLLLLLLEEEEEEEEEEL-
Query  GLSAGDKVYIDKIEFIPVN-    584
ident    |     |      |
Sbjct  SLNSGEEWYLSQLFLVKESa    559
DSSP   LLLLLLLLEEEEEEEEELLl
```

ENGINEERED CRY PROTEINS FOR DELIVERY OF THERAPEUTICS

RELATED APPLICATIONS

This application claims priority to U.S. Patent Application No. 62/834,605, filed Apr. 16, 2019, the contents of which are hereby incorporated by reference in the entirety for all purposes.

REFERENCE TO SUBMISSION OF A SEQUENCE LISTING AS A TEXT FILE

The Sequence Listing written in file 080015-1266923-027510US_SL.txt created on May 6, 2022, 129,751 bytes, machine format IBM-PC, MS-Windows operating system, is hereby incorporated by reference in its entirety for all purposes.

BACKGROUND OF THE INVENTION

In the past few decades, discoveries about the causes of various human diseases at molecular and cellular levels, combined with technical advances in genetic engineering and pharmaceutical sciences, have enabled treatment of many life-threatening illnesses by administering therapeutic proteins to patients. Depending on the target disease as well as the nature and mechanism of action of the therapeutic proteins, the delivery of therapeutic proteins to a targeted tissue or organ site varies dramatically in its specific routes, protein stability or bioavailability, and therefore its ultimate effectiveness, despite significant effort having been devoted to such research endeavors. To this date, effective delivery remains the major obstacle to achieve desired therapeutic outcome by administration of therapeutic proteins. Thus, there exists an urgent need for developing new and improved strategies for delivering therapeutic proteins for the purpose of medical treatment. This invention addresses this and other related needs.

BRIEF SUMMARY OF THE INVENTION

This invention provides a novel approach to achieve effective delivery of proteins of interest, e.g., therapeutic proteins. Thus, in a first aspect, this invention provides a modified Cry protein such as a polypeptide comprising the amino acid sequence shown in a modified SEQ ID NO:1, with two or more, three, four, five, six, seven, eight, nine, ten or more, or all of amino acids at residues 391, 395, 423, 430, 432, 433, 436, 461, 462, 463, and 466 of SEQ ID NO:1 replaced with charged residues such as lysine or arginine, and the polypeptide forms crystal upon being expressed in a host cell. Optionally, at least one, two, or three, amino acids at residues 533, 535, and 536 of SEQ ID NO:1 are further modified, for instance, substituted with alanine. Additionally, The polypeptide may comprise any three-domain Cry protein with a similar structure to Cry3Aa (SEQ ID NO:1), with two or more, three, four, five, six, seven, eight, nine, ten or more, or all of aspartic acid and glutamic acid residues in the region corresponding to the domain II of Cry3Aa replaced with lysine or arginine, and the polypeptide forms crystal upon being expressed in a host cells. This invention provides additional recombinant polypeptides for the same or similar uses by modifying other Cry proteins in the same or similar manner desribed above and herein. The aspartate and glutamate residues in other Cry proteins that can be modified (e.g., substituted with lysine or arginine) to achieve a similar charge profile are identified as follows:

Cry1Aa: residues 308, 332, 379, 384, 387, 409, 412, 418, 460 in SEQ ID NO:4;

Cry2Aa: residues 379, 383, 385, 396, 420, 436, 437, 451, 479 in SEQ ID NO:5;

Cry4Aa: residues 392, 408, 430, 436, 444, 455, 457, 468, 483, 495 in SEQ ID NO:6;

Cry5B: residues 375, 389, 397, 402, 425, 430, 433, 437, 473, 490 in SEQ ID NO:7;

Cry7Ca1: residues 389, 394, 430, 431, 451, 456, 459, 460, 465, 467, 468, 478, 482 in SEQ ID NO:8;

Cry8Ea1: 403, 430, 435, 449, 455, 457, 459, 461, 465, 468, 473, 489 in SEQ ID NO:9;

Cry10Aa: residues 396, 410, 413, 419, 422, 426, 435, 446, 453, 465, 466, 477, 486 in SEQ ID NO:10; and Cry11Aa: residues 381, 422, 443, 455, 457, 460, 469, 473, 484, 487, 498 in SEQ ID NO:11.

In addition, the polypeptide of this invention further includes a fragment of a modified Cry protein (e.g., a modified Cry3Aa protein) generally corresponding to its domain II, such as the 389-471 fragment of SEQ ID NO:2, which the present inventors have discovered to be a soluble peptide and act in a manner similar to that of a cell-penetrating peptide and therefore possesses the capability of effectively transporting its fusion partner, a protein of interest (e.g., a protein with a detectable label such as a fluorescent moiety or a biologically active protein such as a therapeutice protein) into target cells.

In some embodiments, the polypeptide of this invention is linked to a heterologous moiety. This moiety in some instances may be a peptide, such as a reporter protein (which is capable of generating a detectable signal, e.g., a fluorophore peptide such as mCherry), or a therapeutic protein (which is capable of conferring a therapeutic effect when administered), or a transcription factor (which is capable of modulating gene expression, e.g., OCT4 for cell reprogramming), or a gene-editing protein (which is capable of recognizing and cleaving specific DNA sequence, e.g., the RNA-guided CRISPR-associated (Cas) protein and Cre recombinase), or an enzyme (which is capable of recognizing and cleaving specific peptide sequence or structural element or synthetic substrate, such as sortase and cytosine deaminase), thus forming a fusion protein of the modified Cry protein (e.g., modified SEQ ID NO:1 such as SEQ ID NO:2 or a fragment thereof, for example, the 389-471 segment of SEQ ID NO:2) and the peptide, although in other instances the heterologous moiety may be a non-peptide moiety such as a detectable label (e.g., a composition comprising a radioisotope, fluorescent dye, or electron-dense reagent) or a solid substrate/support. In some embodiments, the polypeptide is a fusion protein comprising the modified SEQ ID NO:1 and the therapeutic protein, in which all amino acids at residues 391, 395, 423, 430, 432, 433, 436, 461, 462, 463, and 466 of SEQ ID NO:1 have been replaced with lysine. In some embodiments, the polypeptide as a fusion protein has additional modifications in SEQ ID NO:1, for example, mutations including insertions, deletions, or substitutions at one, optionally two or all three residues 533, 535, and 536. In some embodiments, the fusion protein includes the modified SEQ ID NO:1 comprising amino acids at residues 391, 395, 423, 430, 432, 433, 436, 461, 462, 463, and 466 having been replaced with lysine, and amino acids at residues 533, 535, and 536 having been replaced with alanine, plus a therapeutic protein, such as the p16 protein or the p53 protein. In some embodiments, the fusion protein includes a fragment of a modified Cry protein (e.g., the 389-471 segment of SEQ ID NO:2) and its fusion partner, a heterologous peptide, which may be a protein capable of exerting a detectable signal or a desired biological activity, exemplified above and herein.

In a second aspect, the present invention provides a polynucleotide sequence encoding the polypeptide or fusion protein of this invention as described above and herein. In some embodiments, the polynucleotide sequence is present in an expression cassette, which is typically a recombinantly produced nucleotide structure comprising a promoter (for example, a heterologous promoter) operably linked to the polynucleotide sequence encoding the polypeptide. In some embodiments, the expression cassette may be present in the form of a polynucleotide vector, such as a plasmid or a viral vector. In a related aspect, this invention provides a host cell comprising the polypeptide described above and herein, a host cell comprising the polynucleotide sequence encoding the polypeptide, and a host cell comprising the expression cassette or vector that contains the polynucleotide sequence encoding the polypeptide. In some cases, the host cell is a bacterial cell or one derived from a bacterium, especially a cell of a Bacillus sp. bacterium, such as Bacillus subtilis (Bs) or Bacillus thuringiensis (Bt) cell. In some embodiments, the bacterium is E. coli.

In a third aspect, the present invention provides a method for recombinantly producing the polypeptide or fusion protein of this invention. The method includes the steps of (i) introducing the polynucleotide sequence encoding the polypeptide of this invention as described above and herein into a host cell; and (ii) culturing the cell under conditions permissible for the expression of the polypeptide. The polynucleotide sequence encoding the polypeptide may be in the form of an expression cassette or a vector such as a plasmid. In some embodiments, the host cell expressing the polypeptide of this invention is a bacterial cell, especially of Bacillus sp. such as a Bacillus subtilis (Bs) cell or Bacillus thuringiensis (Bt) cell. Another bacterial strain, such as E. coli, may also be used. In some cases, the method of recombinantly producing the polypeptide further includes a step (iii) of purifying the polypeptide after it has been expressed by the host cell, for example, when the polypeptide is in the crystal form. Typically, the fusion protein assumes a crystalline form or crystalized form upon its expression within the host cells. It may be purified in the crystal form; or it may be purified and then solubilized if necessary.

In a fourth aspect, the present invention provides a composition comprising the polypeptide or fusion protein described above or herein and a mammalian cell. In some embodiments, the polypeptide is crystalized. In some embodiments, the fusion protein is a soluble protein comprising a segment of a modified Cry protein (e.g., the 389-471 segment of SEQ ID NO:2) and its fusion partner, a heterologous protein of desirable properties such as in detectability or a specific biological activity as described above and herein. In some embodiments, the mammalian cell is a cancer cell. In some embodiments, the mammalian cell is an epithelial cell, fibroblast cell, neuronal cell, or immune cell.

In a fifth aspect, the present invention provides a method for delivering an effector protein (such as a therapeutic protein) into a mammalian cell. The method includes the step of contacting the polypeptide or fusion protein of this invention as described above and herein with the mammalian cell, wherein the polypeptide is a fusion protein of a modified Cry protein (e.g., the modified SEQ ID NO:1) and the effector protein, and the polypeptide is crystalized. In the alternative, the fusion protein is a soluble protein comprising a segment of a modified Cry protein (e.g., the 389-471 segment of SEQ ID NO:2) and its fusion partner, a heterologous protein of desirable properties such as in the detectability or a specific biological activity as described above and herein, with the segment of modified Cry protein acting in a manner similar to that of a cell-penetrating peptide to facilitate and enhance the efficiency of transportation of the heterologous protein into target cells.

BRIEF DESCRIPTION OF THE DRAWINGS

FIG. 1. Cellular uptake of Cry3Aa crystals by A549 cells. Confocal images showing that Cry3Aa crystals cannot be taken up by non-phagocytic A549 cells. grey: Nucleus stained with Hoechst33342 dye; bright white: Alexa 660-labelled Cry3Aa crystals.

FIG. 2. Sequences of the domain II of Cry3Aa and Pos3Aa. Triangles indicate the mutated amino acids.

FIG. 3. Production of Pos3Aa protein crystals and the structure determination of Pos3Aa protein. (A) SDS-PAGE analysis of the purified Pos3Aa protein crystals. (B) SEM images showing the identical size and shape of Pos3Aa crystals to Cry3Aa crystals. (C) Structure of Pos3Aa protein. Mutated amino acids are highlighted with red. (D) Structural alignment of Cry3Aa and Pos3Aa. (E) The surface electrostatic potentials of Cry3Aa (upper panel) and Pos3Aa (lower panel). Dark grey: −10 kT/e; Black: +10 kT/e.

FIG. 4. The flexibility of lysine residues in domain II of Pos3Aa. (A) Low electron density of these lysine residues. (B) High B-factor of mutated lysine residues. Black: 16.53; Light grey: 104.96.

FIG. 5. Efficient cellular uptake of Pos3Aa crystals by non-phagocytic cells and the mechanism. (A) The structure of Pos3Aa crystals. The dotted circles indicate the clustered lysine residues. (B) Confocal images showing the cellular uptake of Pos3Aa crystals by A549, PPF and PC12 cells. (C) Confocal images and (D) flow cytometric analysis showing that no Pos3Aa uptake under 4° C. (E) The effects of different inhibitors on the uptake of Pos3Aa crystals by A549 cells. All three inhibitors for macropinocytosis can block the internalization of Pos3Aa crystals, indicating that the main pathway, by which the Pos3Aa crystals enter non-phagocytic cells is macropinocytosis.

FIG. 6. Endosomal escape of Pos3Aa protein crystals. (A) Representative confocal images showing the localization of Pos3Aa protein crystals (green) in different cells after internalization. (B) Representative confocal images showing the localization of Cry3AaTATHA2 protein crystals (green) in A549 cells after internalization. Fluorescence intensity profiles of the white line area of the merged images in (C) FIG. 5A and (D) FIG. 5B. Nucleus was stained with Hoechst 33342 (blue). Endo/lysosomes were stained with LysoTracker Red DND-99 (red). The bright white color indicates the overlap of protein crystals (green) with endo/lysosomes (red). The bright white color in merged images indicates protein crystals in the cytoplasm.

FIG. 7. Intracellular delivery of mCherry protein by Pos3Aa-mCherry protein crystals. (A) Representative confocal images showing cellular uptake of Pos3Aa-mCherry crystals by A549 cells. (B) Flow cytometric histogram and (C) fold change in mCherry fluorescence intensity of A549 cells showing the cellular uptake of mCherry, TAT-mCherry, R9-mCherry and Pos3Aa-mCherry. (D) Representative confocal images showing the subcellular location of internalized TAT-mCherry, R9-mCherry and Pos3Aa-mCherry in A549 cells, lysosomes were labelled with LysoTracker Green DND-26. (E-G) Fluorescent intensity profiles of the area marked with white boxes in 7D. (E) Pos3Aa-mCherry, (F) R9-mCherry, (G) TAT-mCherry.

Figure 8:
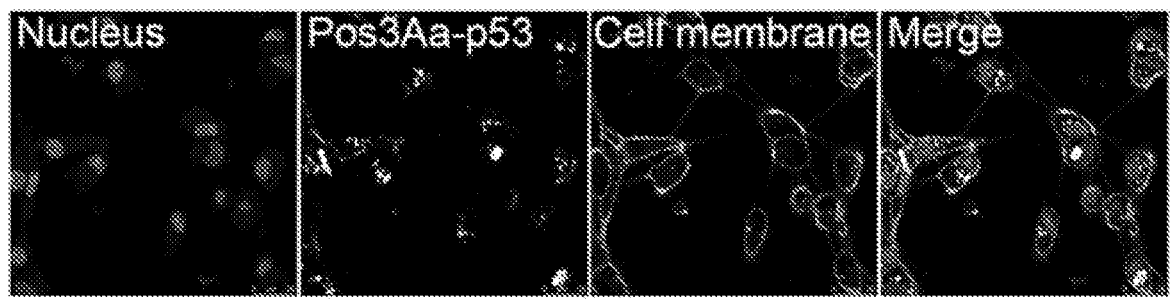

FIG. 8. Cellular uptake of Pos3Aa-p53 crystals by MDA-MB-231 cells. Blue: Nucleus stained with Hoechst 33342 dye. Green: Alexa 488-labelled Pos3Aa-p53 crystals. Red: Cell membrane.

Figure 9:
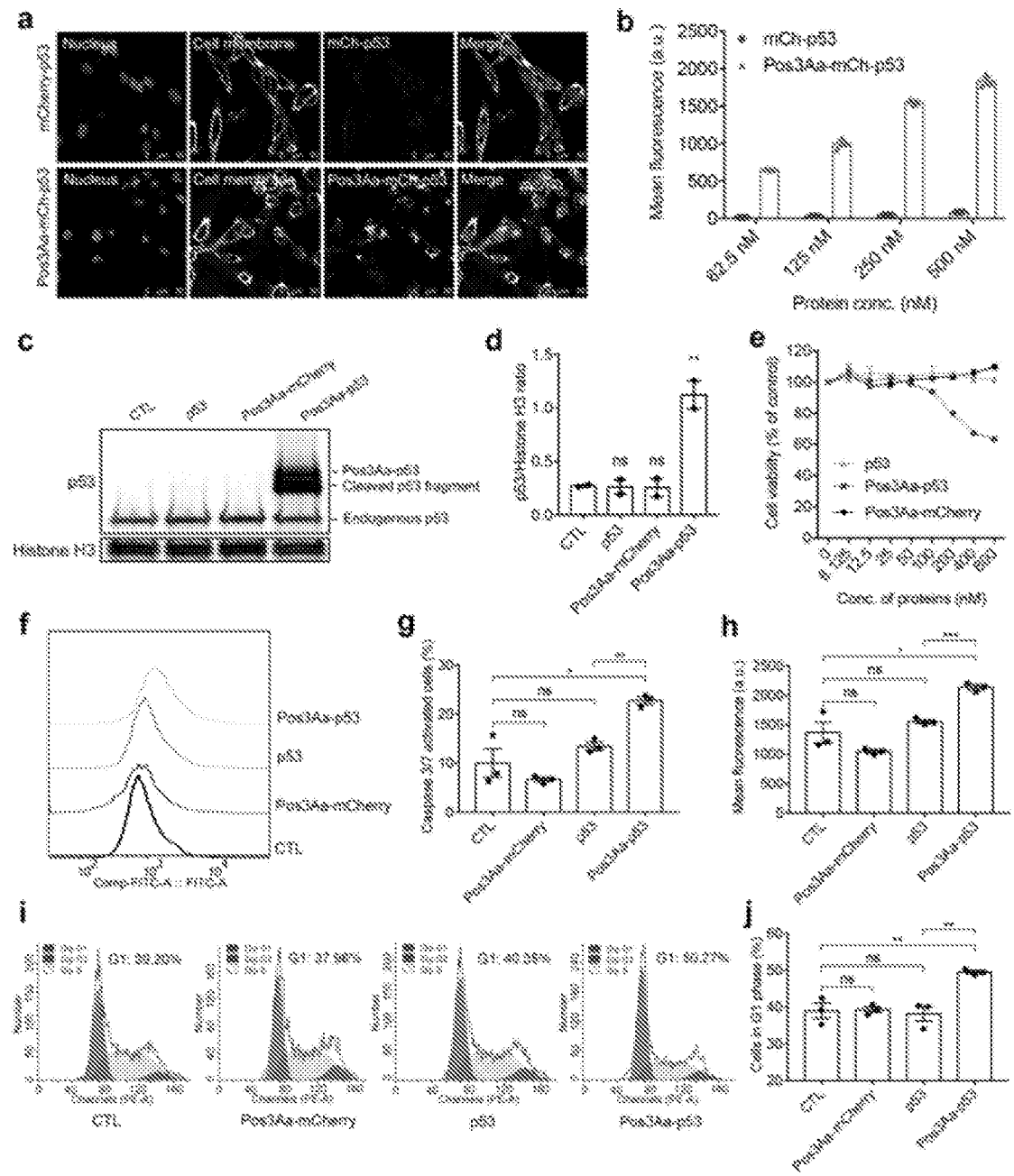

FIG. 9. Intracellular delivery of p53 protein by Pos3Aa-p53 protein crystals. (A) Representative confocal images showing cellular uptake of Pos3Aa-mCh-p53 crystals by MDA-MB-231 cells. (B) The mean mCherry fluorescence intensity of MDA-MB-231 cells after the treatment of mCh-p53 protein and Pos3Aa-mCh-p53 crystals showing the dose-dependent uptake of Pos3Aa-mCh-p53. (C) Western blot detection of the Pos3Aa-p53 delivered to the nucleus of MDA-MB-231 cells. (D) Quantitation of the delivered p53 protein in nucleus. (E) Pos3Aa-p53 treatment inhibited the growth of p53-deficient MDA-MB-231 cells. (G) % caspase-3/7 activated cells and (H) relative Caspase-3/7 green fluorescence intensities showing the increased caspase-3/7 activity of cells treated with Pos3Aa-p53 crystals. (I) Cell cycle distributions and (J) % cells in G1 phase showing that Pos3Aa-p53 crystals induced the G1 cell cycle arrest of MDA-MB-231 cells.

Figure 10:
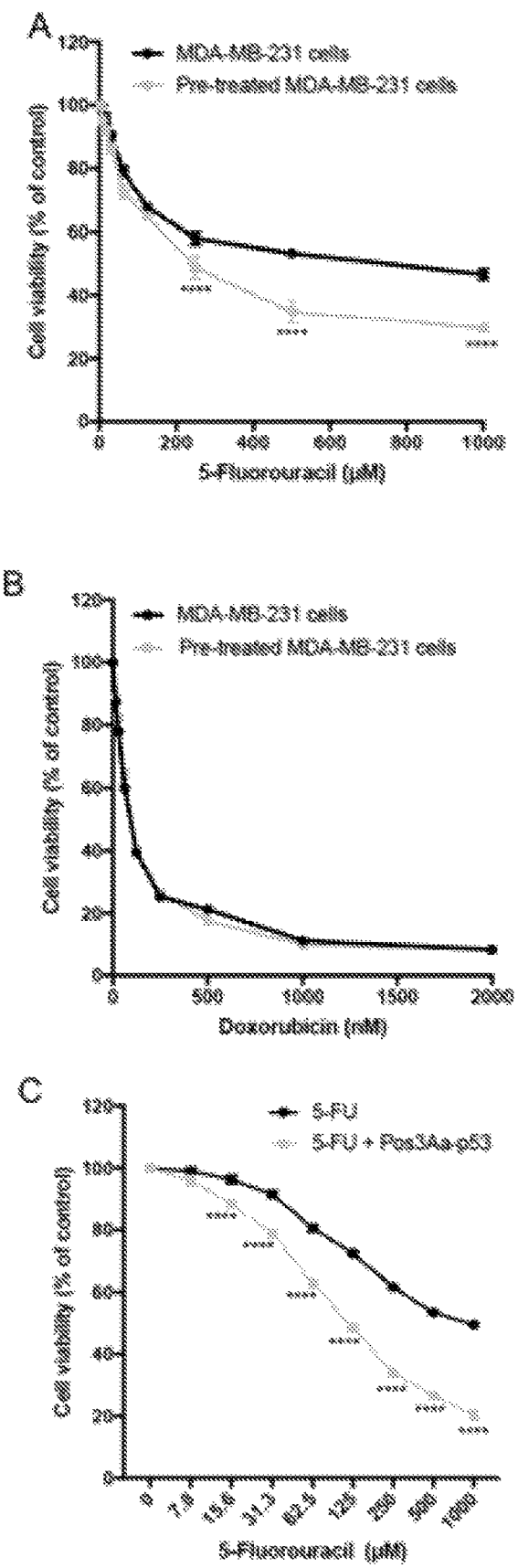

FIG. 10. Synergistic inhibition of Pos3Aa-p53 and 5-FU on the growth of MDA-MB-231 cells. MDA-MB-231 cells were pre-treated with 500 nM Pos3Aa-p53 crystals and re-seeded to 96 well plates. Cells with or without pre-treatment were then incubated with a graded dose of (A) 5-FU or (B) Dox for 3 days. (C) MDA-MB-231 cells were treated with 5-FU only or 5-FU and Pos3Aa-p53 crystals for 3 days. Cell viability was determined by MTS reagent.

Figure 11:
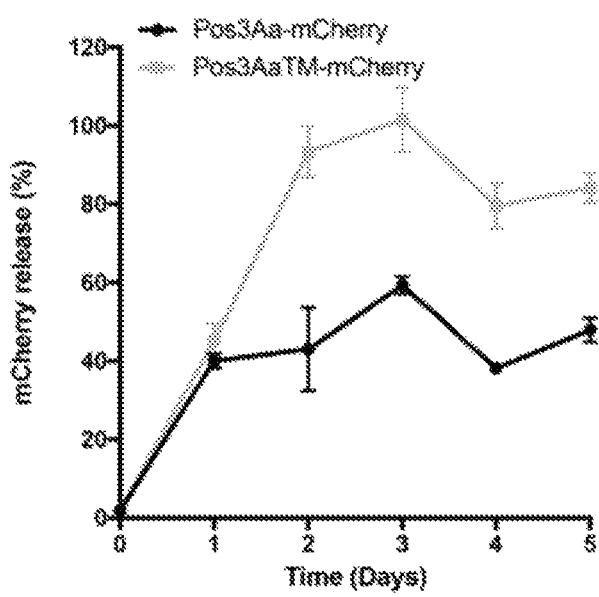

FIG. 11. Release of mCherry from Pos3Aa-mCherry and Pos3AaTM-mCherry crystals.

Figure 12:
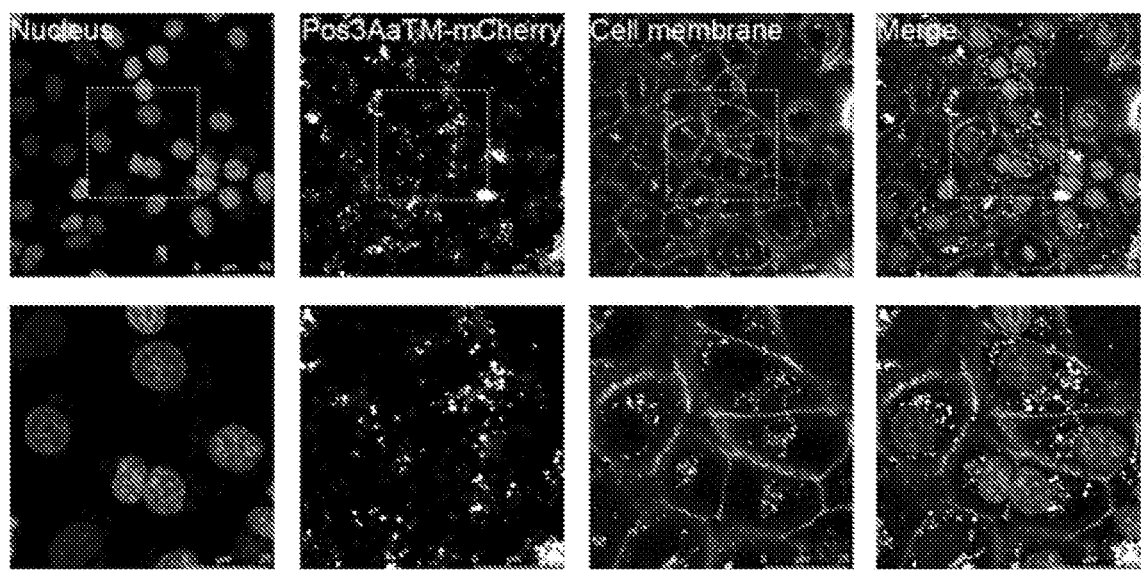

FIG. 12. Cellular uptake of Pos3AaTM-mCherry crystals by A549 cells. Blue: nucleus stained with Hoechst 33342 dye; Red: Pos3AaTM-mCherry crystals; Green: Cell membrane stained with the Wheat Germ Agglutinin Alexa 647 dye.

Figure 13:
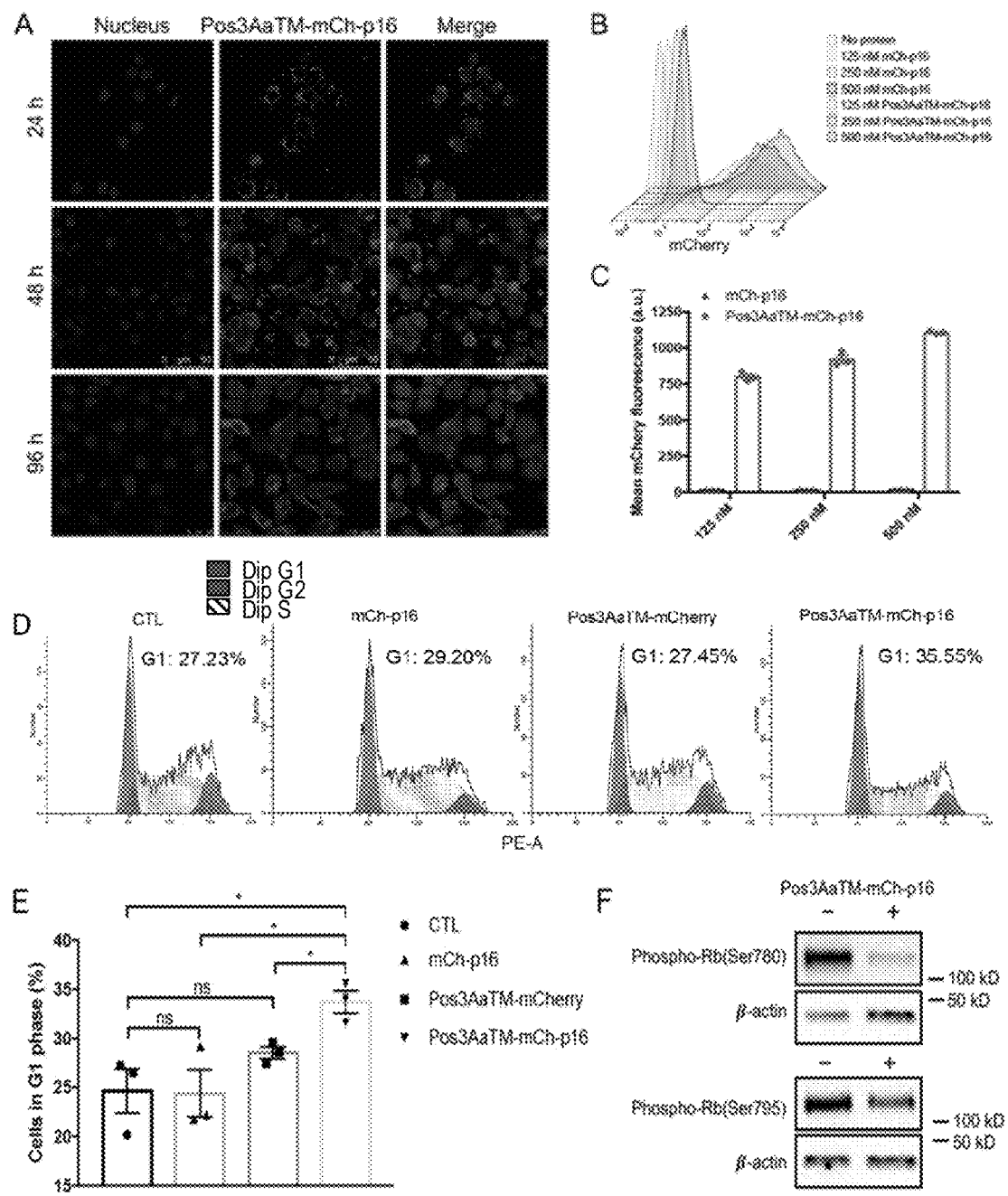

FIG. 13. Intracellular delivery of p16 protein by Pos3AaTM-mCh-p16 crystals. (A) Cellular uptake of Pos3AaTM-mCh-p16 crystals by UM-SCC-22A cells after 24 h, 48 h, and 96 h incubation. Diffused mCherry signal in both cytoplasm and nucleus indicate the released mCherry proteins. (B) Merged flow cytometric histogram and (C) mean mCherry fluorescence intensity showing the dose-dependent uptake of Pos3AaTM-mCh-p16 crystals by UM-SCC-22A cells. p16 dose-dependent cell cycle arrest of UM-SCC-22A cells. (D) Representative flow cytometric histograms of cell cycle alterations and (E) % cells in G1 phase of UM-SCC-22A cells treated with 500 nM mCh-p16 protein, Pos3AaTM-mCherry and Pos3AaTM-mCh-p16 crystals for 48 h. (F) Delivery of p16 protein reduced the level of phosphorylated Rb in UM-SCC-22A cells.

FIG. 14. The amino acid sequence of P3AP peptide.

Figure 15:
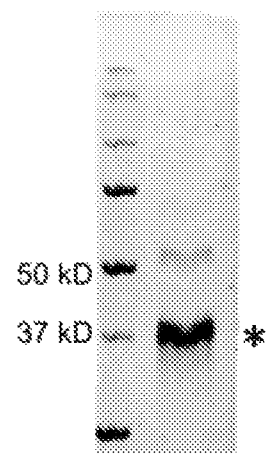

FIG. 15. SDS-PAGE analysis of purified P3AP-mCherry protein (indicated by asterisk).

Figure 16:
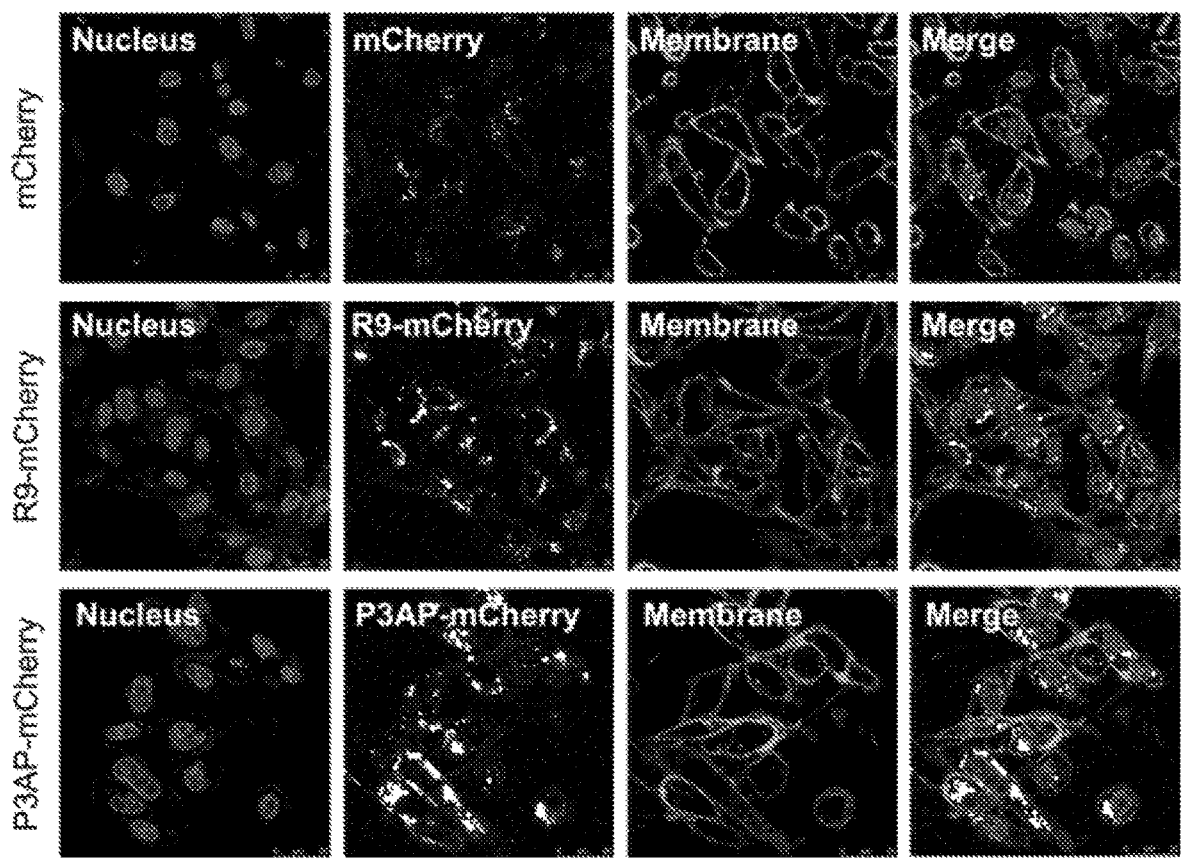

FIG. 16. Cellular uptake of mCherry, R9-mCherry and P3AP-mCherry proteins by MDA-MB-231 cells. Blue: nucleus stained with Hoechst 33342. Red: different proteins. Green: cell membrane stained with Wheat Germ Agglutinin, Alexa Fluor™ 647 Conjugate.

FIG. 17. Uptake efficiency and cytotoxicity of P3AP-mCherry. (A) Representative flow cytometric histograms showing the uptake of mCherry, R9-mCherry, TAT-mCherry and P3AP-mCherry proteins. (B) Quantitated mean mCherry fluorescence intensities. (C) Cell viabilities of MDA-MB-231 cells with different treatments. The inner bar graph shows the cell viabilities at 5 µM protein concentration.

FIG. 18. Structure-based sequence alignments of other three-domain Cry proteins to Cry3Aa protein. Domain II of Cry3Aa protein is highlighted in light grey. Residues in other Cry proteins corresponding to the domain II of Cry3Aa protein are highlighted in dark grey.

DEFINITIONS

The term "Cry protein," as used herein, refers to any one protein among a class of crystalline three-domain Cry proteins produced by strains of *Bacillus thuringiensis* (http://www.lifesci.sussex.ac.uk/home/Neil_Crickmore/Bt/). Some examples of "Cry proteins" include, but are not limited to, Cry1Aa, Cry2Aa, Cry3Aa, Cry4Aa, Cry5B, Cry7Ca1, Cry8Ea1, Cry10Aa, and Cry11Aa. Their amino acid sequences and polynucleotide coding sequences are known (set forth in SEQ ID NOs:1 and 4-11). Their GenBank Accession Numbers are:

| | |
|---|---|
| Cry1Aa | AAA22353.1 |
| Cry2Aa | AAA22335.1 |
| Cry3Aa | AAA22541.1 |
| Cry4Aa | CAA68485.1 |
| Cry5B | AAA68598.1 |
| Cry7Ca1 | ABR67863.1 |
| Cry8Ea1 | AY329081.1 |
| Cry10Aa | AAA22614.1 |
| Cry11Aa | AAA22352.1 |

In addition to the wild-type Cry proteins, the term "Cry protein" also encompasses functional variants, which (1) share an amino acid sequence identity of at least 80%, 81%, 82%, 83%, 84%, 88%, 89%, 90%, 91%, 92%, 93%, 94%, 95%, 96%, 97%, 98%, 99%, or 99.5% to the polypeptide sequence of any one of the three-domain Cry proteins listed in http://www.lifesci.sussex.ac.uk/home/Neil_Crickmore/Bt/; and (2) retain the ability to spontaneously form crystals within host cells as can be confirmed by known methods such as electron micrograph (see description in, e.g., Park et al., *Appl Environ Microbiol*, 1998, 64, 3932-3938; Schnepf et al., *Microbiol Mol Biol Rev*, 1998, 62, 775-806; Whiteley and Schnepf, *Annu Rev Microbiol*, 1986, 40, 549-576; and Nair et al., *PLoS One*, 2015, 10, e0127669).

The term "nucleic acid" or "polynucleotide" refers to deoxyribonucleic acids (DNA) or ribonucleic acids (RNA) and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions), alleles, orthologs, SNPs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., *Nucleic Acid Res*. 19:5081 (1991); Ohtsuka et al., *J. Biol. Chem*. 260:2605-2608 (1985); and Rossolini et al., *Mol. Cell. Probes* 8:91-98 (1994)). The term nucleic acid is used interchangeably with gene, cDNA, and mRNA encoded by a gene.

The term "gene" means the segment of DNA involved in producing a polypeptide chain. It may include regions preceding and following the coding region (leader and trailer) as well as intervening sequences (introns) between individual coding segments (exons).

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. "Amino acid mimetics" refers to chemical compounds having a structure that is different from the general chemical structure of an amino acid, but that functions in a manner similar to a naturally occurring amino acid.

There are various known methods in the art that permit the incorporation of an unnatural amino acid derivative or analog into a polypeptide chain in a site-specific manner, see, e.g., WO 02/086075.

Amino acids may be referred to herein by either the commonly known three letter symbols or by the one-letter symbols recommended by the IUPAC-IUB Biochemical Nomenclature Commission. Nucleotides, likewise, may be referred to by their commonly accepted single-letter codes.

"Conservatively modified variants" applies to both amino acid and nucleic acid sequences. With respect to particular nucleic acid sequences, "conservatively modified variants" refers to those nucleic acids that encode identical or essentially identical amino acid sequences, or where the nucleic acid does not encode an amino acid sequence, to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein that encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid that encodes a polypeptide is implicit in each described sequence.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles of the invention.

The following eight groups each contain amino acids that are conservative substitutions for one another:
1) Alanine (A), Glycine (G);
2) Aspartic acid (D), Glutamic acid (E);
3) Asparagine (N), Glutamine (Q);
4) Arginine (R), Lysine (K);
5) Isoleucine (I), Leucine (L), Methionine (M), Valine (V);
6) Phenylalanine (F), Tyrosine (Y), Tryptophan (W);
7) Serine (S), Threonine (T); and
8) Cysteine (C), Methionine (M)
(see, e.g., Creighton, *Proteins*, W. H. Freeman and Co., N.Y. (1984)).

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

In the present application, amino acid residues are numbered according to their relative positions from the left most residue, which is numbered 1, in an unmodified wild-type polypeptide sequence.

As used in herein, the terms "identical" or percent "identity," in the context of describing two or more polynucleotide or amino acid sequences, refer to two or more sequences or subsequences that are the same or have a specified percentage of amino acid residues or nucleotides that are the same (for example, a Cry protein or a modified Cry protein sequence of this invention has at least 80% identity, preferably 85%, 90%, 91%, 92%, 93, 94%, 95%, 96%, 97%, 98%, 99%, or 100% identity, to a reference sequence, e.g., the amino acid sequence of a corresponding wild-type Cry protein), when compared and aligned for maximum correspondence over a comparison window, or designated region as measured using one of the following sequence comparison algorithms or by manual alignment and visual inspection. Such sequences are then said to be "substantially identical." With regard to polynucleotide sequences, this definition also refers to the complement of a test sequence. Preferably, the identity exists over a region that is at least about 50 amino acids or nucleotides in length, or more preferably over a region that is 75-100 amino acids or nucleotides in length.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters. For sequence comparison of nucleic acids and proteins, the BLAST and BLAST 2.0 algorithms and the default parameters discussed below are used.

A "comparison window", as used herein, includes reference to a segment of any one of the number of contiguous positions selected from the group consisting of from 20 to 600, usually about 50 to about 200, more usually about 100 to about 150 in which a sequence may be compared to a reference sequence of the same number of contiguous positions after the two sequences are optimally aligned. Methods of alignment of sequences for comparison are well-known in the art. Optimal alignment of sequences for comparison can be conducted, e.g., by the local homology algorithm of Smith & Waterman, *Adv. Appl. Math.* 2:482 (1981), by the homology alignment algorithm of Needleman & Wunsch, *J. Mol. Biol.* 48:443 (1970), by the search for similarity method of Pearson & Lipman, *Proc. Nat'l. Acad. Sci. USA* 85:2444 (1988), by computerized implementations of these algorithms (GAP, BESTFIT, FASTA, and TFASTA in the Wisconsin Genetics Software Package, Genetics Computer Group, 575 Science Dr., Madison, WI), or by manual alignment and visual inspection (see, e.g., *Current Protocols in Molecular Biology* (Ausubel et al., eds. 1995 supplement)).

Examples of algorithms that are suitable for determining percent sequence identity and sequence similarity are the BLAST and BLAST 2.0 algorithms, which are described in Altschul et al., (1990) *J. Mol. Biol.* 215: 403-410 and Altschul et al. (1977) *Nucleic Acids Res.* 25: 3389-3402, respectively. Software for performing BLAST analyses is publicly available at the National Center for Biotechnology Information website, ncbi.nlm.nih.gov. The algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al., supra). These initial neighborhood word hits acts as seeds for initiating searches to find longer HSPs containing them. The word hits are then extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a word size (W) of 28, an expectation (E) of 10, M=1, N=−2, and a comparison of both strands. For amino acid sequences, the BLASTP program uses as defaults a word size (W) of 3, an expectation (E) of 10, and the BLOSUM62 scoring matrix (see Henikoff and Henikoff, *Proc. Natl. Acad. Sci. USA* 89:10915 (1989)).

The BLAST algorithm also performs a statistical analysis of the similarity between two sequences (see, e.g., Karlin and Altschul, *Proc. Nat'l. Acad. Sci. USA* 90:5873-5787 (1993)). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, more preferably less than about 0.01, and most preferably less than about 0.001.

An indication that two nucleic acid sequences or polypeptides are substantially identical is that the polypeptide encoded by the first nucleic acid is immunologically cross reactive with the antibodies raised against the polypeptide encoded by the second nucleic acid, as described below. Thus, a polypeptide is typically substantially identical to a second polypeptide, for example, where the two peptides differ only by conservative substitutions. Another indication that two nucleic acid sequences are substantially identical is that the two molecules or their complements hybridize to each other under stringent conditions, as described below. Yet another indication that two nucleic acid sequences are substantially identical is that the same primers can be used to amplify the sequence.

"Polypeptide," "peptide," and "protein" are used interchangeably herein to refer to a polymer of amino acid residues. All three terms apply to amino acid polymers in which one or more amino acid residue is an artificial chemical mimetic of a corresponding naturally occurring amino acid, as well as to naturally occurring amino acid polymers and non-naturally occurring amino acid polymers. As used herein, the terms encompass amino acid chains of any length, including full-length proteins, wherein the amino acid residues are linked by covalent peptide bonds.

The term "recombinant" when used with reference, e.g., to a cell, or a nucleic acid, protein, or vector, indicates that the cell, nucleic acid, protein or vector, has been modified by the introduction of a heterologous nucleic acid or protein or the alteration of a native nucleic acid or protein, or that the cell is derived from a cell so modified. Thus, for example, recombinant cells express genes that are not found within the native (non-recombinant) form of the cell or express native genes that are otherwise abnormally expressed, under expressed or not expressed at all.

A "promoter" is defined as an array of nucleic acid control sequences that direct transcription of a polynucleotide sequence. As used herein, a promoter includes necessary polynucleotide sequences near the start site of transcription, such as, in the case of a polymerase II type promoter, a TATA element. A promoter also optionally includes distal enhancer or repressor elements, which can be located as much as several thousand base pairs from the start site of transcription. A "constitutive" promoter is a promoter that is active under most environmental and developmental conditions. An "inducible" promoter is a promoter that is active under environmental or developmental regulation. The term "operably linked" refers to a functional linkage between a polynucleotide expression control sequence (such as a promoter, or array of transcription factor binding sites) and a second polynucleotide sequence, wherein the expression control sequence directs transcription of the polynucleotide sequence corresponding to the second sequence.

An "expression cassette" is a nucleic acid construct, generated recombinantly or synthetically, with a series of specified polynucleotide elements that permit transcription of a particular polynucleotide sequence in a host cell. An expression cassette may be part of a plasmid, viral genome, or nucleic acid fragment. Typically, an expression cassette includes a polynucleotide to be transcribed, operably linked to a promoter.

The term "heterologous" as used in the context of describing the relative location of two elements, refers to the two elements such as polynucleotide sequences (e.g., a promoter or a protein/polypeptide-encoding sequence) or polypeptide sequences (e.g., a modified Cry protein of this invention or a fusion protein comprising such a modified Cry protein) that are not naturally found in the same relative positions. Thus, a "heterologous promoter" of a gene refers to a promoter that is not naturally operably linked to that gene. Similarly, a "heterologous polypeptide" or "heterologous polynucleotide" to a modified Cry protein or its encoding sequence is one derived from an origin other than this particular Cry protein in the wild-type version, or one derived from the wild-type Cry protein but the fusion of a modified Cry protein (or its coding sequence) with a heterologous polypeptide (or polynucleotide sequence) does not result in a longer polypeptide or polynucleotide sequence that can be found naturally in the corresponding wild-type Cry protein (or its coding sequence).

A "label," "detectable label," or "detectable moiety" is a composition detectable by radiological, spectroscopic, photochemical, biochemical, immunochemical, chemical, or other physical means. For example, useful labels include radioisotopes such as $^{32}P$, fluorescent dyes, electron-dense reagents, enzymes (e.g., as commonly used in an ELISA), biotin, digoxigenin, or haptens and proteins that can be made detectable, e.g., by incorporating a radioactive component into a polypeptide or used to detect antibodies specifically reactive with the polypeptide. Typically a detectable label is a heterologous moiety attached to a probe or a molecule (e.g., a protein or nucleic acid) with defined binding characteristics (e.g., a polypeptide with a known binding specificity or a polynucleotide), so as to allow the presence of the probe/molecule (and therefore its binding target) to be readily detectable. The heterologous nature of the label ensures that it has an origin different from that of the probe or molecule that it labels, such that the probe/molecule attached with the detectable label does not constitute a naturally occurring composition.

A "host cell" is a cell that contains an expression vector and supports the replication or expression of the expression vector. Host cells may be prokaryotic cells such as *E. coli* or *Bacillus thuringiensis,* or eukaryotic cells such as yeast, insect, amphibian, or mammalian cells such as CHO, HeLa and the like, e.g., cultured cells, explants, and cells in vivo.

The term "about" as used herein denotes a range of +/−10% of a reference value. For examples, "about 10" defines a range of 9 to 11.

DETAILED DESCRIPTION OF THE INVENTION

I. Introduction

There has been growing interest in devising new and more effective methods for administration of therapeutic proteins for the purpose of treating medical conditions and disorders. By generating modified Cry proteins capable of self-crystallization and their fragments capable of enhancing protein intake across cell membrane, the present inventors have developed an innovative and effective strategy to deliver therapeutic proteins.

II. Production of Modified Cry Proteins and Their Fragments

A. General Recombinant Technology

Basic texts disclosing general methods and techniques in the field of recombinant genetics include Sambrook and Russell, *Molecular Cloning, A Laboratory Manual* (3rd ed. 2001); Kriegler, *Gene Transfer and Expression: A Laboratory Manual* (1990); and Ausubel et al., eds., *Current Protocols in Molecular Biology* (1994).

For nucleic acids, sizes are given in either kilobases (kb) or base pairs (bp). These are estimates derived from agarose or acrylamide gel electrophoresis, from sequenced nucleic acids, or from published DNA sequences. For proteins, sizes are given in kilodaltons (kDa) or amino acid residue numbers. Proteins sizes are estimated from gel electrophoresis, from sequenced proteins, from derived amino acid sequences, or from published protein sequences.

Oligonucleotides that are not commercially available can be chemically synthesized, e.g., according to the solid phase phosphoramidite triester method first described by Beaucage & Caruthers, *Tetrahedron Lett.* 22: 1859-1862 (1981), using an automated synthesizer, as described in Van Devanter et. al., *Nucleic Acids Res.* 12: 6159-6168 (1984). Purification of oligonucleotides is performed using any art-recognized strategy, e.g., native acrylamide gel electrophoresis or anion-exchange HPLC as described in Pearson & Reanier, *J. Chrom.* 255: 137-149 (1983).

The sequence of a gene of interest, such as the polynucleotide sequence encoding a modified Cry protein or fusion protein thereof, and synthetic oligonucleotides can be verified after cloning or subcloning using, e.g., the chain termination method for sequencing double-stranded templates of Wallace et al., *Gene* 16: 21-26 (1981).

B. Coding Sequence for a Modified Cry Protein

Polynucleotide sequences encoding modified Cry proteins, their fragments, or fusion proteins of this invention can be readily constructed by modifying a wild-type Cry protein to obtain a variant or fragment and optionally combining the coding sequences for the fusion partners, such as a Cry3Aa protein and p53 or p16 protein. The sequences for Cry proteins and enzymes are generally known and may be obtained from a commercial supplier.

In addition to the use of full length wild-type Cry proteins for constructing the modified Cry proteins or fusion proteins of this invention, fragments of Cry proteins and/or variants of Cry proteins may also be useful. A DNA sequence encoding a Cry protein can be modified to generate fragments or variants of the Cry protein. So long as the fragments and variants retain the ability to spontaneously form crystals when expressed in a host cell, especially a *Bacillus* bacterial cell, they can be used for producing the fusion proteins and render the fusion proteins the ability to undergo spontaneous crystallization. In some cases, soluble fragments corresponding to domain II of a Cry protein (including a modified version) such as P3AP are developed for use in the enhanced delivery of proteins having desired activity or function to target cells. Typically, the variants bear a high percentage of sequence identity (e.g., at least 80, 85, 90, 95, 97, 98, 99% or higher) to the wild-type Cry protein sequence, whereas the fragments may be substantially shorter than the full length Cry protein, such as having some amino acids (e.g., 10-300 or 20-200 or 50-100 amino acids) removed from the N- or C-terminus of the full length Cry protein. For example, a useful Cry3Aa fragment may be as short as the first 290 amino acids from the N-terminus, encompassing Domain I of the protein. Other examples of such fragments include a Cry protein fragment having its first 57 amino acids from N-terminus removed and a Cry protein fragment having its C-terminal 18 amino acids removed. The ability of a modified Cry protein or a fusion protein thereof to undergo spontaneous crystallization can be verified by electron micrograph, whereas the desired biological activity attributable to the fusion partner or the "cargo" protein (e.g., cancer-suppressing protein such as p53 or p16) can be confirmed by established assays for each specific "cargo" protein. Surprisingly, the present inventors discovered during their studies that the presence of a modified Cry protein having multiple lysines introduced into domain II in a fusion protein affords a significant increase in the cellular uptake and endosomal escape of the fusion protein, thus permitting more effective delivery of therapeutic proteins to target cells (e.g., cancer cells). The inventors further revealed that modification to the Cry protein in domain III is able to confer to the fusion protein significantly enhanced solubility, providing additional enhancement to therapeutic efficacy of the "cargo" protein.

In addition, the present inventors discovered that a fragment of a modified Cry3Aa protein, such as a fragment of Pos3Aa (SEQ ID NO:2) generally corresponding to domain II of the protein, i.e., starting at residue 374, 375, 376, 377, 378, 379, 380, 381, 382, 383, 384, 385, 386, 387, 388, 389, 390, 391, 392, 393, or 394 and ending at residue 466, 467, 468, 469, 470, 471, 472, 473, 474, 475, 476, 477, 478, 479, 480, 481, 482, 483, 484, 485, or 486 of SEQ ID NO:2, although a soluble peptide, is capable of efficiently crossing cell membrane and therefore can be used to effectively deliver a protein of interest (e.g., a protein with desired biological function or activity) into target cells when peptide is fused to the protein. P3AP, the 389-471 segment of SEQ ID NO:2, is an exemplary peptide of the present invention useful for such applications.

In some cases, a peptide linker or spacer is used between the coding sequences for the modified Cry protein or its fragment and its fusion partner, a heterologous protein or an effector protein. Such heterologous protein may be of any nature and any size, although in some cases it is one within the molecular weight range of about 2-200 kDa, or about 5-100 or 10-100 kDa, or about 15-75 kDa. In particular, proteins that are hard to produce (e.g., p16 protein) or easy to aggregate when produced in *E. coli* or any other protein production system (e.g., p53 protein) may still suitable for use in this delivery method. One purpose is to ensure the proper reading frame for the fusion protein such that the coding sequences for both modified Cry protein or fragment and the heterologous protein are in frame. Another purpose is to provide appropriate spatial relationship between the modified Cry protein and the heterologous protein, such that each may retain its original functionality: the modified Cry protein is able to cause self-crystallization of the fusion protein, and the heterologous protein remains active in its desirable biological activity (e.g., cancer-suppressing capacity). Also, one or more linkers may be placed at the very beginning and/or the very end of the open reading frame, so as to facilitate proper start and termination of the coding sequence translation. Such linkage amino acid sequences are usually shorts and typically no longer than 100 or 50 amino acids, such as between 1 to 100, 1 or 2 to 50, 2 or 3 to 25, 3 or 4 to 10 amino acids.

C. Sequence Modification for Preferred Codon Usage in a Host Organism

The polynucleotide sequence encoding a modified Cry protein or a fragment thereof or fusion protein of this invention can be further altered to coincide with the preferred codon usage of a particular host. For example, the preferred codon usage of one strain of bacterial cells can be used to derive a polynucleotide that encodes a recombinant polypeptide of the invention and includes the codons favored by this strain. The frequency of preferred codon usage exhibited by a host cell can be calculated by averaging frequency of preferred codon usage in a large number of genes expressed by the host cell (e.g., calculation service is available from web site of the Kazusa DNA Research Institute, Japan). This analysis is preferably limited to genes that are highly expressed by the host cell.

At the completion of modification, the coding sequences are verified by sequencing and are then subcloned into an appropriate expression vector for recombinant production of a modified Cry protein or its fragment or a fusion protein thereof.

III. Expression and Purification of Modified Cry Proteins or Fusion Proteins

Following verification of the coding sequence, a modified Cry protein/its fragment or fusion protein of this invention can be produced using routine techniques in the field of recombinant genetics, relying on the polynucleotide sequences encoding the modified Cry protein/its fragment or fusion protein disclosed herein.

A. Expression Systems

To obtain high level expression of a nucleic acid encoding a recombinant protein of this invention, one typically subclones a polynucleotide encoding the protein in the correct reading frame into an expression vector that contains a strong promoter to direct transcription, a transcription/translation terminator and a ribosome binding site for translational initiation. Suitable bacterial promoters are well known in the art and described, e.g., in Sambrook and Russell, supra, and Ausubel et al., supra. Bacterial expression systems for expressing the polypeptide are available in, e.g., *E. coli, Bacillus* sp., *Salmonella,* and *Caulobacter.* Kits for such expression systems are commercially available.

The promoter used to direct expression of a heterologous nucleic acid depends on the particular application. The promoter is optionally positioned about the same distance from the heterologous transcription start site as it is from the transcription start site in its natural setting. As is known in the art, however, some variation in this distance can be accommodated without loss of promoter function. In some cases, a constitutive promoter is used, whereas in other cases an inducible promoter rather than a constitutive promoter is preferred.

In addition to the promoter, the expression vector typically includes a transcription unit or expression cassette that contains all the additional elements required for the expression of the polypeptide of this invention in host cells. A typical expression cassette thus contains a promoter operably linked to the nucleic acid sequence encoding the recombinant protein and signals required for efficient polyadenylation of the transcript, ribosome binding sites, and translation termination. The nucleic acid sequence encoding the recombinant protein may be linked to a cleavable signal peptide sequence to promote secretion of the polypeptide by the transformed cell. Such signal peptides include, among others, the signal peptides from tissue plasminogen activator, insulin, and neuron growth factor, and juvenile hormone esterase of *Heliothis virescens.* Additional elements of the cassette may include enhancers and, if genomic DNA is used as the structural gene, introns with functional splice donor and acceptor sites.

In addition to a promoter sequence, the expression cassette should also contain a transcription termination region downstream of the coding sequence to provide for efficient termination. The termination region may be obtained from the same gene as the promoter sequence or may be obtained from different genes.

The particular expression vector used to transport the genetic information into the cell is not particularly critical. Any of the conventional vectors used for expression in eukaryotic or prokaryotic cells may be used, especially those suitable for expression in cells of *Bacillus* sp. such as Bt and Bs. Standard bacterial expression vectors include plasmids such as pBR322 based plasmids, pSKF, pET23D, and fusion expression systems such as GST and LacZ.

The elements that are typically included in expression vectors also include a replicon that functions in bacteria such as *Bacillus* sp. and *E. coli,* a gene encoding antibiotic resistance to permit selection of bacteria that harbor recombinant plasmids, and unique restriction sites in nonessential regions of the plasmid to allow insertion of coding sequences. The particular antibiotic resistance gene chosen is not critical, any of the many resistance genes known in the art are suitable. Similar to antibiotic resistance selection markers, metabolic selection markers based on known metabolic pathways may also be used as a means for selecting transformed host cells.

B. Transfection Methods

Standard transfection methods are used to produce bacterial, mammalian, yeast, insect, or plant cell lines that express large quantities of a recombinant protein of this invention, which are then purified using standard techniques (see, e.g., Colley et al., *J. Biol. Chem.* 264: 17619-17622 (1989); *Guide to Protein Purification,* in *Methods in Enzymology,* vol. 182 (Deutscher, ed., 1990)). Transformation of eukaryotic and prokaryotic cells are performed according to standard techniques (see, e.g., Morrison, *J. Bact.* 132: 349-351 (1977); Clark-Curtiss & Curtiss, *Methods in Enzymology* 101: 347-362 (Wu et al., eds, 1983).

Any of the well-known procedures for introducing foreign nucleotide sequences into host cells may be used. These include the use of calcium phosphate transfection, polybrene, protoplast fusion, electroporation, liposomes, microinjection, plasma vectors, viral vectors and any of the other well-known methods for introducing cloned genomic DNA, cDNA, synthetic DNA, or other foreign genetic material into a host cell (see, e.g., Sambrook and Russell, supra). It is only necessary that the particular genetic engineering procedure used be capable of successfully introducing at least one gene into the host cell capable of expressing the recombinant protein of this invention.

C. Purification of Modified Cry Proteins and Fusion Proteins

Once the expression of a modified Cry protein or its fragment or a fusion protein thereof in transfected host cells is confirmed, e.g., via electron micrograph for detecting protein crystals or an immunoassay such as Western blotting analysis, the host cells are then cultured in an appropriate scale for the purpose of purifying the recombinant protein.

When the Cry fusion proteins or fusion proteins of the present invention are produced recombinantly by transformed bacteria in large amounts, for example after promoter induction, the proteins are present in crystalline form or insoluble aggregates within the host cells. Thus, one can readily isolate the crystals from the cell lysate based on their distinct density by utilizing techniques such as centrifugation and density gradient separation followed by one or more rinsing steps to further remove contaminants from the protein crystals.

There are several protocols that are suitable for purification of protein inclusion bodies. For example, purification of aggregate proteins (hereinafter referred to as inclusion bodies) typically involves the extraction, separation and/or purification of inclusion bodies by disruption of bacterial cells, e.g., by incubation in a buffer of about 100-150 µg/ml lysozyme and 0.1% Nonidet P40, a non-ionic detergent. The cell suspension can be ground using a Polytron grinder (Brinkman Instruments, Westbury, NY). Alternatively, the cells can be sonicated on ice. Additional methods of lysing bacteria are described in Ausubel et al. and Sambrook and Russell, both supra, and will be apparent to those of skill in the art.

The cell suspension is generally centrifuged and the pellet containing the inclusion bodies resuspended in buffer which does not dissolve but washes the inclusion bodies, e.g., 20 mM Tris-HCl (pH 7.2), 1 mM EDTA, 150 mM NaCl and 2% Triton-X 100, a non-ionic detergent. It may be necessary to repeat the wash step to remove as much cellular debris as possible. The remaining pellet of inclusion bodies may be resuspended in an appropriate buffer (e.g., 20 mM sodium phosphate, pH 6.8, 150 mM NaCl). Other appropriate buffers will be apparent to those of skill in the art.

Following the washing step, the inclusion bodies are solubilized by the addition of a solvent that is both a strong hydrogen acceptor and a strong hydrogen donor (or a combination of solvents each having one of these properties). The proteins that formed the inclusion bodies may then be renatured by dilution or dialysis with a compatible buffer. Suitable solvents include, but are not limited to, urea (from about 4 M to about 8 M), formamide (at least about 80%, volume/volume basis), and guanidine hydrochloride (from about 4 M to about 8 M). Some solvents that are capable of solubilizing aggregate-forming proteins, such as SDS (sodium dodecyl sulfate) and 70% formic acid, may be inappropriate for use in this procedure due to the possibility of irreversible denaturation of the proteins, accompanied by a lack of immunogenicity and/or activity. Although guanidine hydrochloride and similar agents are denaturants, this denaturation is not irreversible and renaturation may occur upon removal (by dialysis, for example) or dilution of the denaturant, allowing re-formation of the immunologically and/or biologically active protein of interest. After solubilization, the protein can be separated from other bacterial proteins by standard separation techniques. For further description of purifying recombinant polypeptides from bacterial inclusion body, see, e.g., Patra et al., *Protein Expression and Purification* 18: 182-190 (2000).

While the Cry fusion protein crystals tend to remain insoluble at lower or neutral pHs, placing them in alkaline solutions with pH at or greater than 10 or 11 can often effectively dissolve the protein. Once dissolved, the protein can then be analyzed by gel separation (e.g., on an SDS gel) and immunoassays to confirm its identity based on the appropriate molecular weight and immunoreactivity.

D. Crosslinking Cry Fusion Proteins

Crosslinking is a commonly used technique for a broad ranges of goals, such as to stabilize protein tertiary and quaternary structure for analysis; to capture and identify unknown protein interactors or interaction domains; to conjugate an enzyme or tag to an antibody or other purified protein; to immobilize antibodies or other proteins for assays or affinity-purification; and to attach peptides to larger "carrier" proteins to facilitate handling/storage. The present inventors have observed that crosslinking tends to further enhance the desirable properties of the Cry fusion protein crystals such as thermostability and tolerance to organic solvents. Thus, in some cases there is a preference to further crosslink a Cry fusion protein upon its recombinant production and purification.

Despite the complexity of protein structure, including composition with 20 different amino acids, only a small number of protein functional groups comprise selectable targets for practical crosslinking methods. In fact, just four protein chemical targets account for the vast majority of crosslinking and chemical modification techniques: (1) primary amines (—NH2): this group exists at the N-terminus of each polypeptide chain and in the side chain of lysine (Lys, K) residues; (2) carboxyls (—COOH): this group exists at the C-terminus of each polypeptide chain and in the side chains of aspartic acid (Asp, D) and glutamic acid (Glu, E); (3) sulfhydryls (—SH): this group exists in the side chain of cysteine (Cys, C). Often, as part of a protein's secondary or tertiary structure, cysteines are joined together between their side chains via disulfide bonds (—S—S—); and (4) carbonyls (—CHO): these aldehyde groups can be created by oxidizing carbohydrate groups in glycoproteins. For each of these protein functional-group targets, there exist one to several types of reactive groups that are capable of targeting them and have been used as the basis for synthesizing crosslinking and modification reagents. Crosslinkers are selected on the basis of their chemical reactivities (i.e., specificity for particular function groups) and other chemical properties that facilitate their use in different specific applications.

After a fusion protein of the present invention, e.g., a Pos3Aa-p53 fusion protein, is recombinantly produced in host cells (such as *Bacillus subtilis* cells or *Bacillus thuringiensis* cells) in a crystalline form and then properly purified, it can then be chemically crosslinked to further increase the level of enhancement in the protein's properties such as thermosstability and tolerance to organic solvents. Well-known chemical crosslinking reagents can be used for this purpose in accordance with the established procedures. Some examples of suitable crosslinking reagents include glutaraldehyde, bis(sulfosuccinimidyl)suberate (BS3), phenol-formaldehyde, Lys to lys cross-linking: DSG (disuccinimidyl glutarate), Lys to cys cross-linking: Sulfo-EMCS (N-ε-maleimidocaproyl-oxysulfosuccinimide ester), Cys to cys cross-linking, and BMH (bismaleimidohexane).

IV. Pharmaceutical Compositions and Administration

The present invention also provides pharmaceutical compositions comprising an effective amount of a modified Cry fusion protein for achieving the intended effect by the biological activity attributable to the fusion partner or "cargo" protein of the modified Cry protein or a fragment thereof (e.g., P3AP), therefore useful in both prophylactic and therapeutic applications depending on the specific target disease and therapeutic protein. Pharmaceutical compositions of the invention are suitable for use in a variety of drug delivery systems. Suitable formulations for use in the present invention are found in *Remington's Pharmaceutical Sciences,* Mack Publishing Company, Philadelphia, PA, 17th ed. (1985). For a brief review of methods for drug delivery, see, Langer, *Science* 249: 1527-1533 (1990).

The pharmaceutical compositions of the present invention can be administered by various routes, e.g., oral, subcutaneous, transdermal, transnasal, intramuscular, intravenous, or intraperitoneal. The routes of administering the pharmaceutical compositions include systemic or local delivery to a subject suffering from a neurodegenerative disease at daily doses of about 0.01-5000 mg, preferably 5-500 mg, of a Cry fusion protein for a 70 kg adult human per day. The appropriate dose may be administered in a single daily dose or as divided doses presented at appropriate intervals, for example as two, three, four, or more subdoses per day.

For preparing pharmaceutical compositions containing a Cry fusion protein, inert and pharmaceutically acceptable carriers are used. The pharmaceutical carrier can be either solid or liquid. Solid form preparations include, for example, powders, tablets, dispersible granules, capsules, cachets, and suppositories. A solid carrier can be one or more substances that can also act as diluents, flavoring agents, solubilizers, lubricants, suspending agents, binders, or tablet disintegrating agents; it can also be an encapsulating material.

In powders, the carrier is generally a finely divided solid that is in a mixture with the finely divided active component, e.g., a Cry fusion protein comprising a therapeutic protein such as p53 or p16. In tablets, the active ingredient (the Cry fusion protein) is mixed with the carrier having the necessary binding properties in suitable proportions and compacted in the shape and size desired.

For preparing pharmaceutical compositions in the form of suppositories, a low-melting wax such as a mixture of fatty acid glycerides and cocoa butter is first melted and the active ingredient is dispersed therein by, for example, stirring. The molten homogeneous mixture is then poured into convenient-sized molds and allowed to cool and solidify.

Powders and tablets preferably contain between about 5% to about 70% by weight of the active ingredient. Suitable carriers include, for example, magnesium carbonate, magnesium stearate, talc, lactose, sugar, pectin, dextrin, starch, tragacanth, methyl cellulose, sodium carboxymethyl cellulose, a low-melting wax, cocoa butter, and the like.

The pharmaceutical compositions can include the formulation of the active ingredient of a Cry fusion protein with encapsulating material as a carrier providing a capsule in which the recombinant polypeptide (with or without other carriers) is surrounded by the carrier, such that the carrier is thus in association with the polypeptide. In a similar manner, cachets can also be included. Tablets, powders, cachets, and capsules can be used as solid dosage forms suitable for oral administration.

Liquid pharmaceutical compositions include, for example, solutions suitable for oral or parenteral administration, suspensions, and emulsions suitable for oral administration. Sterile water solutions of the active component (e.g., a Cry fusion protein) or sterile solutions of the active component in solvents comprising water, buffered water, saline, PBS, ethanol, or propylene glycol are examples of liquid compositions suitable for parenteral administration. The compositions may contain pharmaceutically acceptable auxiliary substances as required to approximate physiological conditions, such as pH adjusting and buffering agents, tonicity adjusting agents, wetting agents, detergents, and the like.

Sterile solutions can be prepared by dissolving the active component (e.g., a Cry fusion protein) in the desired solvent system, and then passing the resulting solution through a membrane filter to sterilize it or, alternatively, by dissolving the sterile compound in a previously sterilized solvent under sterile conditions. The resulting aqueous solutions may be packaged for use as is, or lyophilized, the lyophilized preparation being combined with a sterile aqueous carrier prior to administration. The pH of the preparations typically will be between 3 and 11, more preferably from 5 to 9, and most preferably from 7 to 8.

The pharmaceutical compositions containing the Cry fusion protein can be administered for prophylactic and/or therapeutic treatments. In therapeutic applications, compositions are administered to a patient already suffering from a target condition/disease in an amount sufficient to prevent, cure, reverse, or at least partially slow or arrest the symptoms of the condition and its complications. An amount adequate to accomplish this is defined as a "therapeutically effective dose." Amounts effective for this use will depend on the severity of the disease or condition and the weight and general state of the patient, but generally range from about 0.1 mg to about 2,000 mg of the recombinant polypeptide per day for a 70 kg patient, with dosages of from about 5 mg to about 500 mg of the recombinant polypeptide per day for a 70 kg patient being more commonly used.

In prophylactic applications, pharmaceutical compositions containing a Cry fusion protein are administered to a patient susceptible to or otherwise at risk of developing a target disease or disorder in an amount sufficient to delay or prevent the onset of the symptoms. Such an amount is defined to be a "prophylactically effective dose." In this use, the precise amounts of the recombinant polypeptide again depend on the patient's state of health and weight, but generally range from about 0.1 mg to about 2,000 mg of the recombinant polypeptide for a 70 kg patient per day, more commonly from about 5 mg to about 500 mg for a 70 kg patient per day.

Single or multiple administrations of the compositions can be carried out with dose levels and pattern being selected by the treating physician. In any event, the pharmaceutical formulations should provide a quantity of a Cry fusion protein sufficient to effectively achieve the intended therapeutic effects, e.g., inhibit cancer cell proliferation, invasion and/or metastasis in the patient, either therapeutically or prophylactically.

V. Kits

The invention also provides kits for prophylactic or therapeutic applications by administering a Cry fusion protein according to the method of the present invention. The kits typically include a first container that contains a pharmaceutical composition having an effective amount of a Cry fusion protein, for example, having a therapeutic protein with anti-cancer activity as the fusion partner with a modified Cry protein or a fragment thereof, optionally with a second container containing a second therapeutically active agent, for example, another anti-cancer agent. In some cases, the kits will also include informational material containing instructions on how to dispense the pharmaceutical composition, including description of the type of patients who may be treated (e.g., a person suffering from a condition or disease suitable for treatment by the fusion partner or "cargo" protein in the Cry fusion protein of this invention), the schedule (e.g., administration dose and frequency), route of administration, and the like.

EXAMPLES

The following examples are provided by way of illustration only and not by way of limitation. Those of skill in the art will readily recognize a variety of non-critical parameters that could be changed or modified to yield essentially the same or similar results.

BACKGROUND

Proteins perform essential biological functions in cells, such as gene regulation, signal transduction and enzyme catalysis, making them potential candidates/targets for drug research and development. Highlighting the tremendous potential of the protein therapeutics market, seven of the top ten drugs sold globally in 2018 were monoclonal antibodies, with numerous other proteins being explored for the treatment of various diseases. While almost all current approved protein-based drugs in the market act on extracellular targets, many diseases are caused by the dysfunction of intracellular proteins. The lack of protein-based therapeutics in the clinic is due in large part to the instability and low cell penetration efficiency of these therapeutics into cells. Moreover, entrapment by endosomes and lysosomes after cell entry can dramatically hinder the efficacy of these proteins. To address these issues, multiple strategies, including cell membrane deformation, hypertonic buffer treatment, cell penetrating peptides and nano/micro-carriers, have been explored to mediate the internalization of protein therapeutics into mammalian cells. Considering the protection to cargo proteins and the versatility for in vivo application, nano/micro-carriers are arguably one of the most promising approaches for protein delivery. Various materials, like cationic polymers, lipids, inorganic materials and proteins, have been utilized to manufacture nano/micro-carriers with different chemical and physical properties. Compared to other materials, protein-based particles have distinct features well suited for intracellular drug delivery, including good biocompatibility, biodegradability, ease of modification.

It was previously reported the development of a novel protein delivery platform based on Cry3Aa protein that naturally forms sub-micrometer-sized protein crystals within the bacterium *Bacillus thuringiensis* (Bt). In mouse studies, the purified Cry3Aa crystals exhibited great biocompatibility and biodegradability, and minimal toxicity. More importantly, this platform appears to stabilize its cargo proteins in the form of Cry3Aa-cargo fusion protein crystals as demonstrated by the extended lifetime of the protein compared to free protein. It was further shown that these protein crystals could be specifically taken up by phagocytic macrophages. As proof of concept, an antimicrobial peptide has been encapsulated in high loading efficiency into Cry3Aa crystals and successfully delivered to macrophages for treating intracellular parasites infection in a mouse model of cutaneous leishmaniasis. To expand the application of this platform on other non-phagocytic cells, a positively-charged mutant of Cry3Aa (Pos3Aa), which retains its crystal-forming ability in Bt cells, was identified. In this disclosure, the Pos3Aa protein crystals are demonstrated to be readily taken up by various types of non-phagocytic cells, such as cancer cells and fibroblasts, with high efficiency of endosomal escape. Successful intracellular delivery of a fluorescent mCherry protein and two tumor suppressor proteins p53 and p16 was achieved via this Pos3Aa platform. Significantly, Pos3Aa-mediated p53 and p16 delivery restored their anti-cancer activities in p53 or p16-deficient cancer cells, indicating that Pos3Aa-based protein crystals can be an effective platform for intracellular protein delivery.

RESULTS

1. Design and Structure of Pos3Aa Protein

Figure 3:
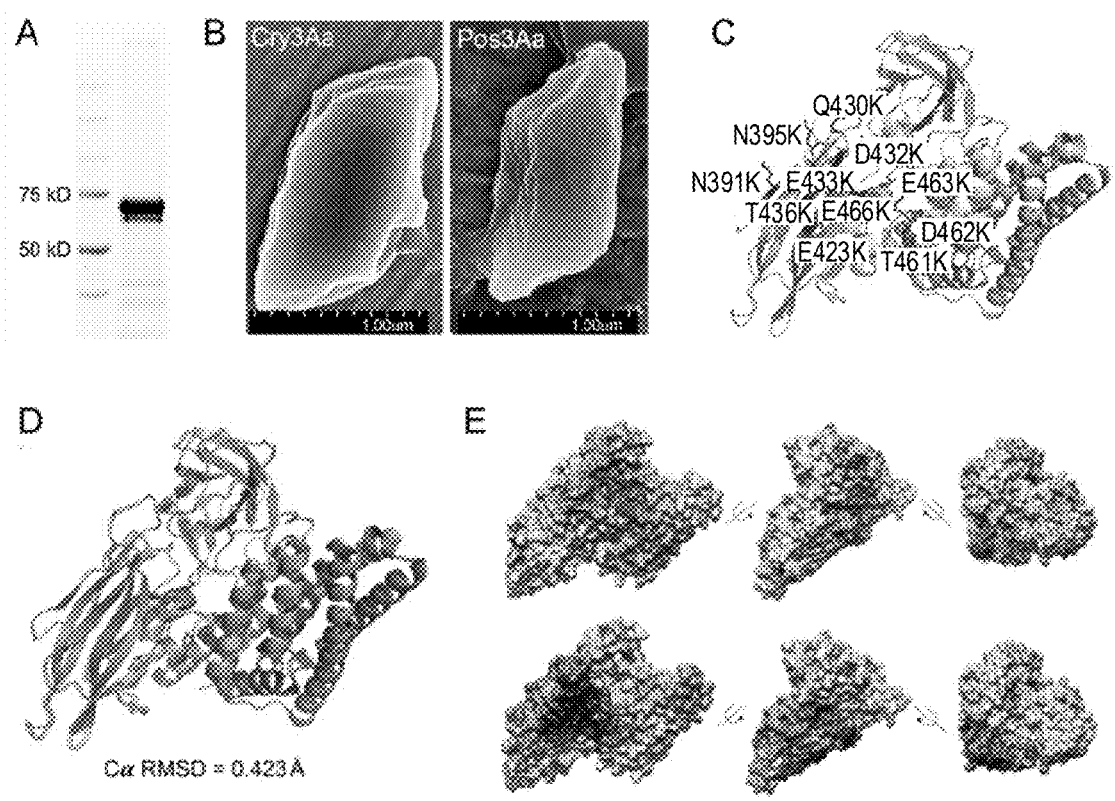
Figure 4:
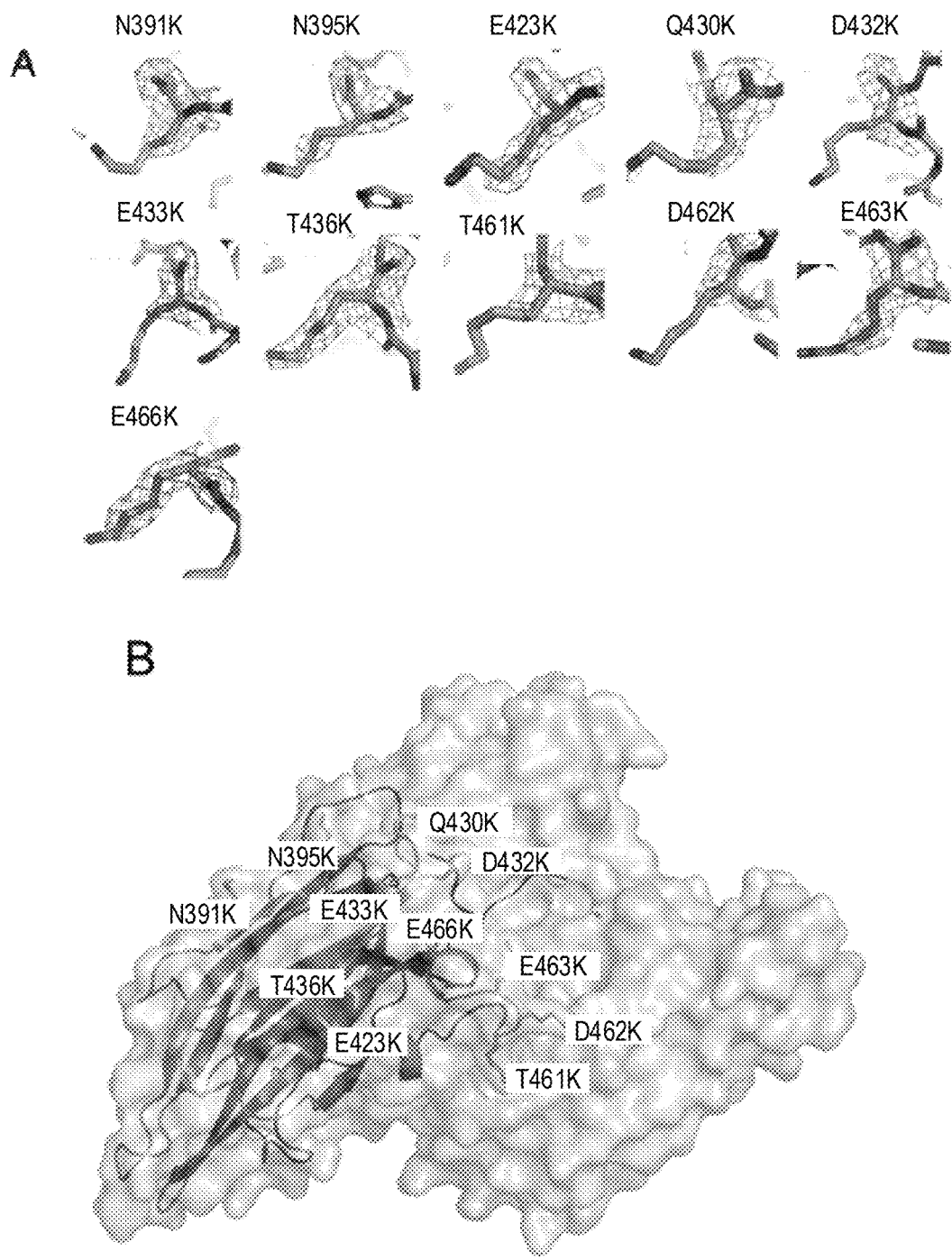
Figure 5:
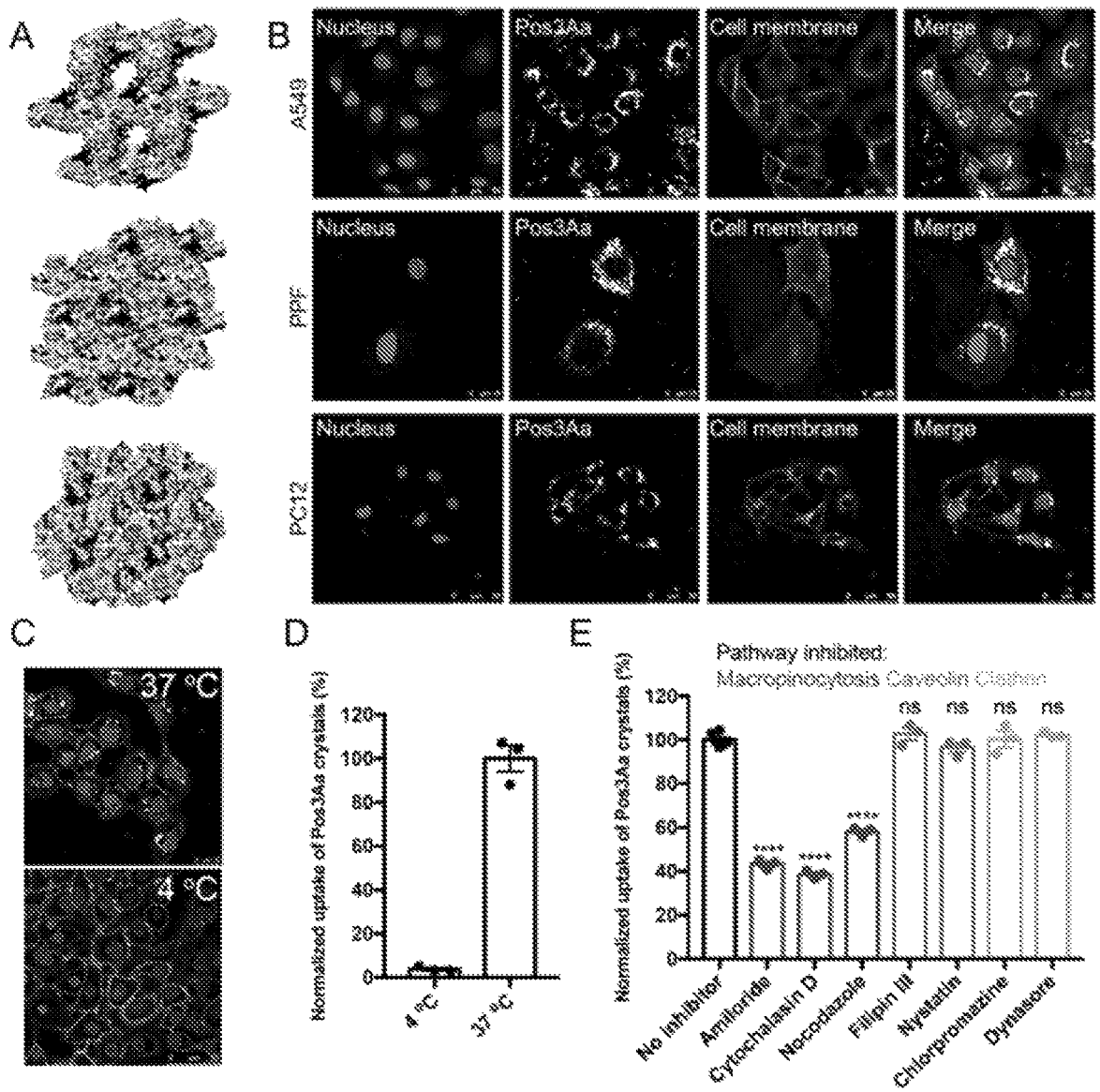
Figure 6:
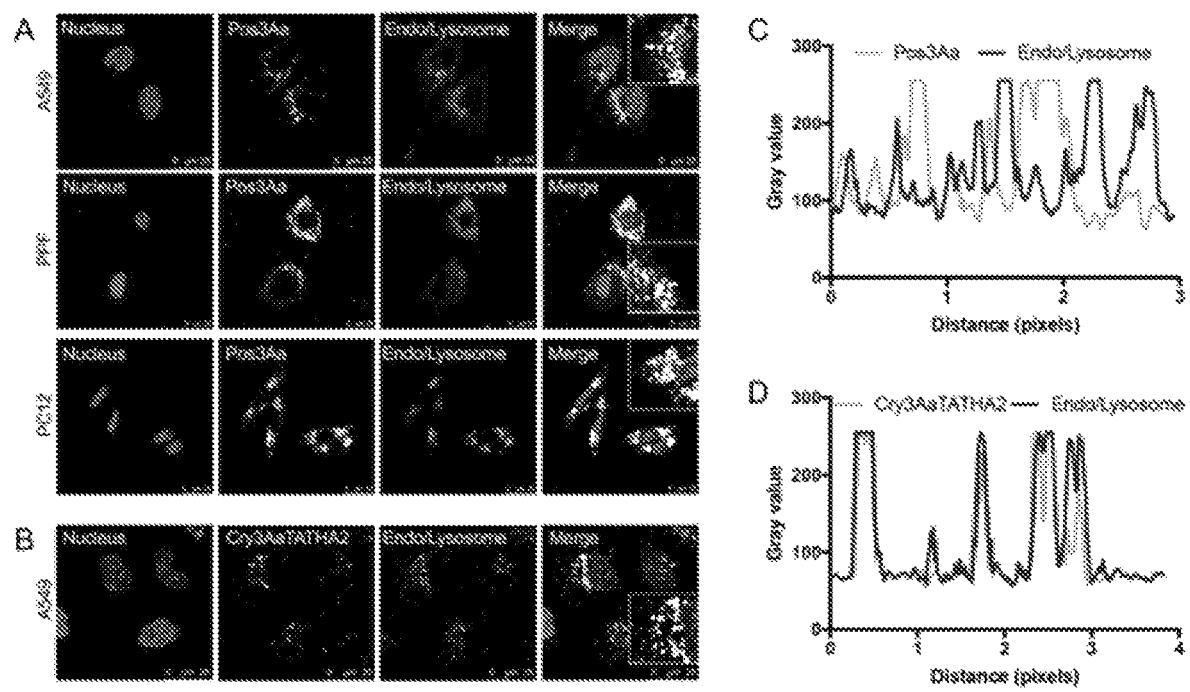
Figure 7:
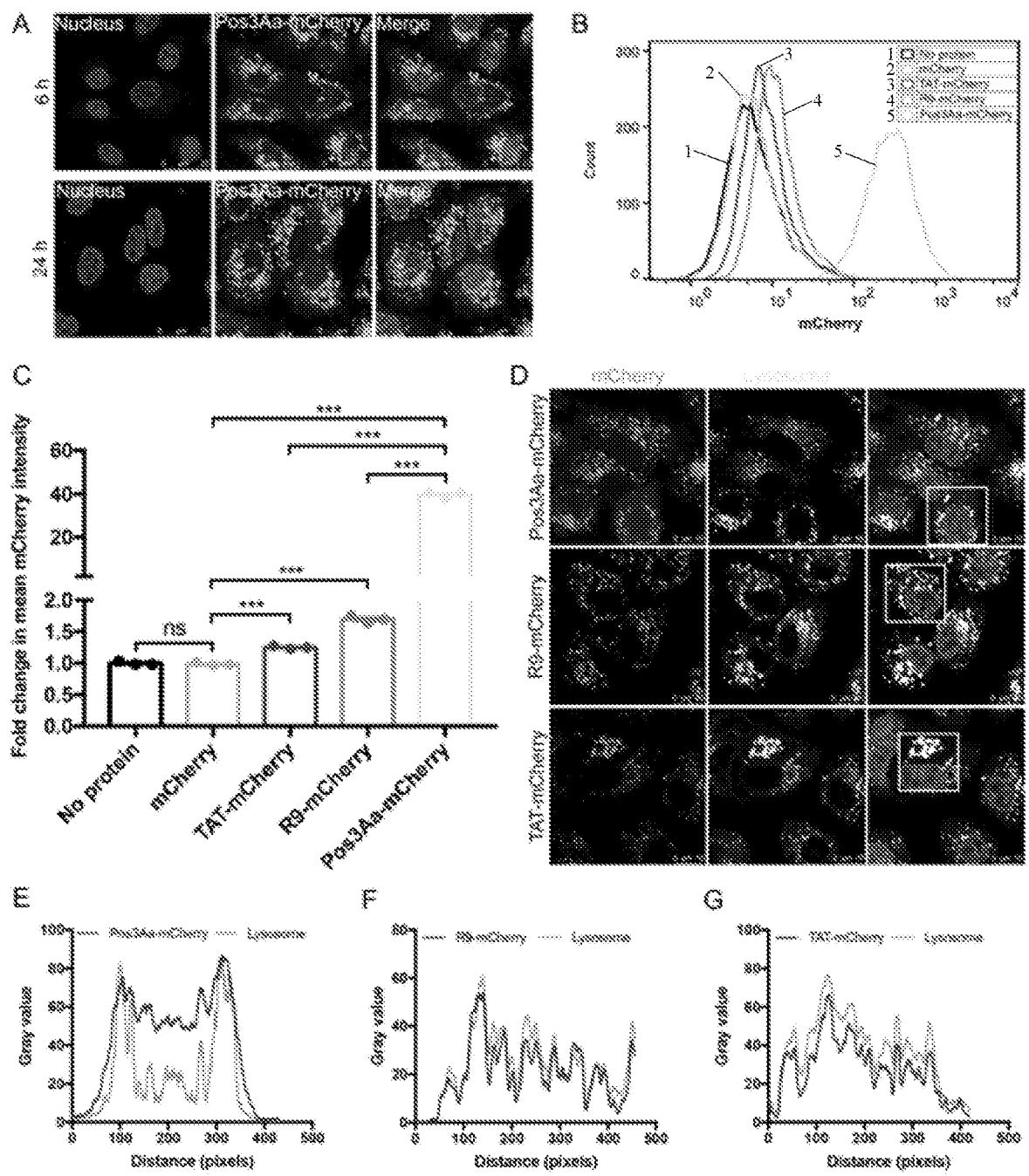

Positively charged amino acids (lysine and arginine) are proven to be crucial for the efficient cellular uptake of cell-penetrating peptides or supercharged proteins by mammalian cells. As above-mentioned, it was discovered that wildtype Cry3Aa protein harbor a large proportion of negatively charged surface residues in the domain II, which is presumably correlated to the poor internalization of Cry3Aa protein crystals into non-phagocytic cells (FIG. 1). It was accordingly hypothesized that the substitutions of these surface-exposed glutamic acid (E), aspartic acid (D) or other polar amino acids to lysine might improve the uptake efficiency of Cry3Aa crystals by non-phagocytic cells. Hence, eleven solvent-exposed amino acids with flexible residues in domain II were identified based on the structure of Cry3Aa protein and mutated to lysine (FIG. 2). The resultant Cry3Aa mutant protein, named Pos3Aa, still formed protein crystals with identical size and morphology to wildtype Cry3Aa when expressed in Bt cells (FIG. 3A, B), suggesting that these mutations may not affect the protein folding and crystal packing. To confirm this, the in vitro formed crystals of Pos3Aa protein were obtained using sitting drop vapor diffusion crystallization and its structure was determined using X-ray crystallography. Pos3Aa crystal shared the same space group ($C222_1$) as Cry3Aa, and Pos3Aa protein maintained the typical three domains structure of Cry toxins (FIG. 3C). Alignment of Pos3Aa to Cry3Aa showed a Cα RMSD value of 0.423 Å, revealing a high structural similarity (FIG. 3D). While the lysine mutations did not abolish the native structure of Cry3Aa protein, the dramatic change in surface electrostatic potential from negative to positive in domain II region was observed consistent with our expectation (FIG. 3E). Moreover, it was discovered that these lysine residues formed three protruding lysine clusters with excessive flexibility, which is reflected in their low electron density and high B-factor (FIG. 4). Previous studies have shown that flexible and clustered lysine residues are critical for the phospholipid binding and membrane permeability, supporting the notion that Pos3Aa protein crystals might be able to interact with the cell membrane and be internalized by non-phagocytic cells.

2. Cellular Uptake of Pos3Aa Crystals and its Mechanism

Pos3Aa protein crystals were produced in Spo⁻ 407-OA Bt cells, purified by sucrose gradient centrifugation and characterized for the subsequent experiments. Interestingly, Pos3Aa crystals hold a zeta potential value of −14.9 mV, indicating a near-neutral surface of these crystals instead of a positively charged one. One possible explanation, based on the structure of Pos3Aa crystals, is that the lysine clusters are regularly distributed on the limited regions of the crystal surface due to the crystal packing, and meanwhile other regions are still neutral or negatively charged (FIG. 5A).

To evaluate the cellular uptake efficiency of Pos3Aa protein crystals, Alexa488-labeled Pos3Aa crystals (Alexa488-Pos3Aa) were incubated with A549 cells, primary pulmonary fibroblasts (PPFs) and PC12 cells for 24 h and the internalization of crystals was examined using fluorescent confocal microscopy. As indicated in FIG. 5B, Pos3Aa protein crystals were readily taken up by different type of non-phagocytic cells, which wild type Cry3Aa crystals cannot enter, confirming the importance of the clustered lysine residues on determining the cellular uptake potency. To further understand the mechanisms by which Pos3Aa crystals enter these cells, 500 nM Alexa488-Pos3Aa crystals were incubated with A549 cells at 37° C. and 4° C., respectively, for 6 h before being subjected to confocal imaging and flow cytometry analysis. It was speculated that the uptake of these crystals might involve an active transport mechanism, which can be inhibited by low temperature, since Pos3Aa protein crystals are too large to diffuse through the cell membrane. As expected, 4° C. incubation completely abolished the uptake of Pos3Aa crystals whereas significant uptake could be observed under 37° C. (FIG. 5C, D). Given that extracellular particles can be internalized via different endocytic pathways, such as clathrin/caveolae-mediated endocytosis and macropinocytosis, a collection of known endocytic inhibitors was therefore applied to identify which pathways play dominant roles in the uptake of Pos3A crystals. A549 cells were pretreated with each inhibitor for 30 min prior to 6 h incubation with 500 nM Alexa488-Pos3Aa crystals. Uptake of Pos3Aa crystals was determined based on the percentage of Alexa488-Pos3Aa-positive cells obtained from flow cytometry analysis. Filipin III and nystatin, two inhibitors of caveolae-dependent endocytosis, resulted in no recognizable impact on the uptake of Pos3Aa crystals (FIG. 5E). Likewise, no obvious inhibition of Pos3Aa uptake was observed on the cells pretreated with chlorpromazine and dynasore, inhibitors of clathrin-mediated endocytosis (FIG. 5E). In contrast, all three inhibitors of macropinocytosis (amiloride, cytochalasin D, and nocodazole) blocked the uptake of Pos3Aa crystals by 57%, 61% and 42%, respectively (FIG. 5E). Taken together, these findings indicated that the efficient uptake of Pos3Aa protein crystals by non-phagocytic cells is mediated primarily via the macropinocytosis pathway.

3. Endosomal Escape of Pos3Aa Protein Crystals

Genetic fusion of cargo proteins to cell penetrating peptides is one of the most commonly used method to mediate the intracellular protein delivery. Despite the typically efficient endocytic uptake of CPPs, it appears that CPP-tagged proteins frequently fail to exhibit significant cellular activities. Arguably the major obstacle is the inefficient endosomal escape, which is also a challenge to micro/nano-carriers, leading to the entrapment of delivered proteins in the intracellular vesicles. To assess the ability of Pos3Aa protein crystals to escape from endo/lysosomes, A549 cells, PPFs and PC12 cells were incubated with Alexa488-Pos3Aa crystals for 24 hours and subsequently stained with LysoTracker Red DND-99 to visualize the endocytic vesicles. The co-localization analysis indicated that a large percentage of Pos3Aa crystals were localized in the cytoplasm, suggesting the occurrence of endosomal escape (FIG. 6A). To compare Pos3Aa crystals with CPPs, a cell-penetrating fusion peptide TATHA2 was fused to the C-terminus of wildtype Cry3Aa protein. Unlike Cry3Aa crystals, the resultant Cry3AaTATHA2 protein crystals can be taken up by A549 cells with the help of TATHA2 peptide (FIG. 6B). However, most of the Cry3AaTATHA2 crystals were co-localized with intracellular vesicles (FIG. 6B), indicating the incapability of TATHA2 peptide to mediate the endosomal escape. This observation is consistent with the studies on gold nanoparticles, which showed that TATHA2 peptide can only facilitate the cellular uptake but not the cytosolic localization of these particles. The near-complete colocalization of Cry3AaTATHA2 crystals with endo/lysosomes is further supported by the correlated intensity profiles of labeled crystals and LysoTrack staining, whereas the profile of Alexa488-Pos3Aa crystals displayed a distinct pattern from endo/lysosomes (FIG. 6C, D). These data provide the first evidence that Pos3Aa protein crystals have the potential as a platform for mediating the efficient cytosolic delivery of proteins.

4. Intracellular Delivery of Fluorescent mCherry Protein

To evaluate the possibility of applying Pos3Aa crystal as a carrier for protein delivery, the ability of Pos3Aa to deliver a model cargo protein, mCherry, into mammalian cells was explored. mCherry protein was genetically fused to the C-terminus of Pos3Aa, and the corresponding Pos3Aa-mCherry fusion protein crystals were produced in Bt cells and purified for subsequent experiments. Two CPP-tagged mCherry proteins, TAT-mCherry and polyarginine(R9)-mCherry, were also produced for comparison. As shown in the confocal images, Pos3Aa-mCherry crystals revealed highly efficient cellular uptake by A549 cells (FIG. 7A). The delivery efficiency was then quantified using flow cytometry. Cells treated with Pos3Aa-mCherry crystals exhibited 40-fold change in the mean mCherry fluorescence intensity, whereas the treatment of TAT-mCherry and R9-mCherry proteins only caused 1.25-fold and 1.7-fold changes, respectively (FIG. 7B, C). More importantly, significant mCherry signal was observed in the cytoplasm of cells treated with only 100 nM Pos3Aa-mCherry crystals, indicating the extremely high cellular uptake and endosomal escape efficiency of these crystals (FIG. 7D-G). Both TAT-mCherry and R9-mCherry proteins, however, were entrapped inside the endo/lysosomes, even when used in 10-fold higher concentration (1 µM) than Pos3Aa-mCherry crystals. All these results further support the suitability of Pos3Aa protein crystal as an effective platform to mediate intracellular protein delivery.

5. Intracellular Delivery of Transcription Factor p53 Protein

Given the promising results of mCherry delivery, delivery of bioactive proteins that hold potentials to be valuable therapeutics was then tested. Transcription factors are a class of key regulatory proteins controlling the eukaryotic gene expression in many biological processes, such as development and tumorigenesis. The dysfunction of transcription factors is a driver of numerous diseases, and these proteins are therefore considered to be attractive therapeutic targets. One typical example is p53 protein, whose encoding gene TP53 is found mutated or deleted in nearly half of human cancers. p53 is activated upon cellular stress signals, like oncogenic stress and DNA damage, resulting in the expression of downstream genes involved in cell-cycle arrest, DNA repair and apoptosis. Restoring p53 functions in cancer cells could be a potent alternative to cancer therapy, while the poor stability and low cell penetration efficiency of native p53 protein limit its direct intracellular delivery.

Herein, the successful delivery of p53 protein using the Pos3Aa platform is reported. Pos3Aa-p53 fusion protein was expressed in Bt Spo⁻ 407OA cells, and the resultant Pos3Aa-p53 fusion protein crystals were purified by sucrose gradient centrifugation. Live cell imaging showed that Pos3Aa-p53 crystals can be readily internalized by the p53-deficient breast cancer MDA-MB-231 cells (FIG. 8). To verify the improved uptake efficiency of p53-contained crystals in comparation with free p53 protein, a mCherry tag was utilized for visualization. As shown in FIG. 9A, obvious uptake of Pos3Aa-mCherry-p53 (Pos3Aa-mCh-p53) fusion protein crystals can be observed whereas free mCherry-p53 (mCh-p53) protein was rarely found inside MDA-MB-231 cells. Flow cytometric analysis also validated that Pos3Aa-mCh-p53 crystals were efficiently taken up by MDA-MB-231 cells in a dose-dependent manner (FIG. 9B). Given that the p53-mediated gene transcription occurs in nucleus, western blot analysis was performed to examine the nuclear localization of delivered Pos3Aa-p53 protein. As expected, Pos3Aa-p53 protein, as well as the cleaved fragment, was detected in the nuclear fraction of treated MDA-MD-231 cells (FIG. 9C, D).

The anticancer activity of Pos3Aa-p53 protein crystals was then tested using MTS assay. As indicated in FIG. 9E, Pos3Aa-p53 crystals revealed a dose-dependent inhibition of cell growth on MDA-MB-231 cells, whereas Pos3Aa-mCherry crystals or free p53 protein had no effect on the cell viability (FIG. 9E). Membrane blebbing, a defined feature of apoptosis, was observed from the Pos3Aa-p53-treated cells, supporting that p53 delivery by Pos3Aa-p53 crystals induced the apoptosis of MDA-MB-231 cells. Moreover, caspase-3/7 activity was examined using Caspase-3/7 Green Reagent, which can generate a green fluorescence upon the activation of caspase-3/7, to confirm the apoptotic activity of Pos3Aa-p53 crystals. MDA-MB-231 cells treated with 500 nM Pos3Aa-p53 crystals showed significantly higher percentage of caspase-3/7 activated cells and relative caspase-3/7 activity than cells treated with free p53 protein or Pos3Aa-mCherry crystals (FIG. 9F-H). Given that cell cycle arrest is another noticeable outcome of p53 activation, cell cycle analysis was carried out to further validate the successful delivery of p53 protein. As indicated in FIGS. 9I and J, a meaningful G1 phase arrest of MDA-MB-231 cells was observed after 48 h treatment of 500 nM Pos3Aa-p53 crystals, whereas free p53 protein and Pos3Aa-mCherry crystals had no effect on the cell cycle. All these data suggest that bioactive p53 protein was effectively delivered into mammalian cells in the form of Pos3Aa-p53 fusion protein crystal.

One consequence of the p53 deficiency in cancer cells is their resistance to anticancer drugs that induce p53-dependent apoptosis. It is thus hypothesized that the restoration of p53 function by Pos3Aa-p53 crystals might be able the increase the cellular sensitivity to these anticancer drugs. To confirm this, two classic drugs, fluorouracil (5-FU) and doxorubicin (Dox) were chosen as model compounds for the subsequent validation. It has been demonstrated that loss of p53 function significantly reduces the susceptibility of cancer cells to 5-FU, whereas a p53-independent mechanism is involved in the Dox-induced cell death. It was expected that Pos3Aa-p53 treatment would make the p53-deficienct MDA-MB-231 cells more sensitive to 5-FU but not Dox. A pre-treatment experiment was first performed. Cells were pre-delivered with 500 nM Pos3Aa-p53 crystals for 24 h. After that, cells with or without pretreatment were seeded into 96-well plates at same seeding concentration, and treated with graded doses of 5-FU or Dox. As shown in FIGS. 10A and 10B, pre-treated cells (with wildtype p53) exhibited better response to 5-FU than normal MDA-MD-231 cells (with mutant p53). However, no major difference in the sensitivity to Dox was observed—supporting the success of Pos3Aa-p53-mediated delivery of wildtype p53 protein. Furthermore, combined treatment of the cells with 5-FU and Pos3Aa-p53 crystals inhibited approximately 80% of the cell growth at the highest concentration tested, while only 50% inhibition was observed for 5-FU alone (FIG. 10C). The combination index (CI) was calculated using the CompuSyn software and revealed that the CI values for 5-FU and Pos3Aa-p53 crystals at ED50, ED75, ED90 and ED95 are 0.44, 0.53, 0.66, and 0.79, indicating synergistic inhibition of cacern cell growth.

6. Intracellular Delivery of Tumor Suppressor p16 Protein

Given that the release of cargo proteins from the Cry-cargo fusion protein crystals is based on the solubilization of these crystals, a triple mutant of Pos3Aa (T533A, G535A, D536A) protein (Pos3AaTM) was generated to improve the solubility of Pos3Aa-cargo protein crystals. When compared with Pos3Aa-mCherry crystals, Pos3AaTM-mCherry protein crystals exhibited better solubility (more crystals can be solubilized) (FIG. 11). Confocal microscopy imaging showed that Pos3AaTM-mCherry crystals remain the ability to enter non-phagocytic mammalian cells (FIG. 12).

This Pos3Aa triple mutant protein was then applied to deliver another tumor suppressor protein—p16. Frequent deletions or mutations of the INK4 gene, which encodes the cyclin-dependent kinase inhibitor p16 protein, have been reported in around half of human cancers. p16 protein contributes to the regulation of cell cycle progression by binding to CDK4/6, inhibiting cyclin D-CDK4/6 complex formation and CDK4/6-mediated phosphorylation of Rb family members. The resultant hypophosphorylated Rb family members binds to E2Fs, a family of transcription factors controlling the proliferation-associated genes, prevents them from nuclear import, and consequently leads to G1 cell cycle arrest. It was hypothesized that direct delivery of p16 protein into p16-deficienct cancer cells might arrest the cells at G1 phase and thus inhibit the cell growth. To evaluate this possibility, Pos3AaTM-mCherry-p16 (Pos3AaTM-mCh-p16) fusion protein crystals were produced in Bt cells and purified using sucrose gradient centrifugation. A mCherry-tagged p16 protein (mCh-p16) was produced at the same time for comparison. p16-Deficient squamous carcinoma UM-SCC-22A cells were incubated with Pos3AaTM-mCh-p16 crystals for 24, 48 and 96 h to assess the cellular uptake of those crystals. As indicated in FIG. 13A, obvious mCherry fluorescence can still be observed after 96 h incubation. Moreover, diffused mCherry signal was clearly displayed in both cytoplasm and nucleus after 24 h (FIG. 13A), suggesting that mCherry-p16 part was successfully escaped from intracellular vesicles and released from the Pos3AaTM-mCh-p16 crystals. Flow cytometric analyses showed a dose-dependent uptake of these crystals and an much higher efficiency than free mCh-p16 protein (FIG. 13B, C). Cell cycle arrest assay was then performed to investigate if the delivered p16 protein is functional inside UM-SCC-22A cells. While 500 nM free mCh-p16 protein or Pos3AaTM-mCherry crystals had no effect on the cell cycle compared to no treatment control, more cells were arrested in G1 phase when delivered with 500 nM Pos3AaTM-mCh-p16 crystals (FIG. 13D, E). To confirm the G1 cell cycle arrest is indeed due to the restoration of p16 protein, anti-phosphorylated Rb antibodies were used to determine the level of phosphorylated Rb in UM-SCC-22A cells. Western blot results indicated that he treatment of Pos3AaTM-mCh-p16 crystals dramatically reduced the phosphorylated Rb level in UM-SCC-22A cells (FIG. 13F), demonstrating the intracellular bioactivity of delivered p16 proteins. Taken together, these findings suggest that efficient and effective delivery of p16 protein into cancer cells can be achieved by the Pos3AaTM platform.

7. Intracellular Delivery of mCherry Protein by a Pos3Aa-Derived Peptide

It is shown that Pos3Aa crystal platform has its own advantages in intracellular delivery of functional proteins and their sustained release. Some applications, such as delivery of Cas9 protein for gene editing, however, require transient and fast action of these bioactive proteins. Hence, inspired by the rapid action of cell-penetrating peptides, a peptide derived from the domain II of Pos3Aa protein was identified and named as P3AP (FIG. 14). To test whether it can still mediate the intracellular delivery of proteins, a cargo fluorescent mCherry protein was genetically fused to the C-terminus of P3AP peptide. The soluble P3AP-mCherry protein was successfully expressed and purified from E. coli (FIG. 15). To compare its uptake efficiency with cell-penetrating peptides, the MDA-MB-231 cells were treated with 5 μM mCherry, R9-mCherry or P3AP-mCherry protein, and incubated at 37° C. for 24 h. At the end of incubation period, cells with different treatments were washed and imaged under same laser power and gain using confocal fluorescent microscopy. As shown in FIG. 16, significant internalization of mCherry by MDA-MB-231 cells was mediated by P3AP, and the efficiency was better than cell-penetrating R9 peptide. Consistently, flow cytometric analysis indicated that P3AP-mCherry exhibited the highest uptake in comparation with R9-mCherry and TAT-mCherry (FIG. 17A, B).

The abilities of cell-penetrating peptides to translocate through cell membranes is generally accompanied by cytotoxicity. To assess the cytotoxicity of P3AP peptide, MDA-MB-231 cells were incubated with different concentrations of mCherry, TAT-mCherry, R9-mCherry, and P3AP-mCherry for 72 h, and the cell viabilities were determined by MTS/PMS reagent. As indicated in FIG. 17C, P3AP-mCherry had no effect on the cell viability whereas the cell growth was significantly inhibited by R9-mCherry in a dose-dependent manner. Taken together, these results have validated that the P3AP peptide can mediate a much more efficient cellular delivery of proteins than cell-penetrating peptide with no cytotoxicity on targeted cells.

SUMMARY

Proteins are potential candidates/targets for drug research and development. While almost all current approved protein-based drugs in the market act on extracellular targets, many diseases are caused by the dysfunction of intracellular proteins. The instability and low cell penetration efficiency of proteins, however, limit the development of protein-based therapeutics. Moreover, entrapment by endo/lysosomes dramatically hinders the efficacy of protein therapeutics. To overcome these issues, the present inventors have developed a protein delivery platform based on an engineered Cry3Aa protein (Pos3Aa) with noted advantages: first, efficient endosomal escape. It has been demonstrated that a large percentage of Pos3Aa protein crystals were localized in the cytoplasm after the cellular uptake by A549 cells, primary fibroblasts (PPFs) and PC12 cells, indicating the occurrence of endosomal escape. Second, much more efficient cellular uptake than conventional cell-penetrating peptides. It has been demonstrated that cells treated with Pos3Aa-mCherry crystals exhibited 40-fold increase in the mean mCherry fluorescence intensity, whereas the treatment of TAT-mCherry and R9-mCherry proteins only caused 1.25-fold and 1.7-fold changes, respectively. Third, capability of delivering bio-functional proteins. It is further demonstrated that two tumor suppressor proteins, p53 and p16, can be efficiently delivered into cancer cells by this Pos3Aa platform. Significantly, Pos3Aa-mediated p53 and p16 delivery restored their anti-cancer activities in p53/p16-deficient cancer cells. Lastly, intracelluar delivery of proteins by a new Pos3Aa-derived peptide—P3AP. Latest results indicate that, in addition to Pos3A crystals, a P3AP peptide derived from the domain II of Pos3Aa protein can be used to efficiently deliver proteins into cells with minimal cytotoxicity.

All patents, patent applications, and other publications, including GenBank Accession Numbers, cited in this application are incorporated by reference in the entirety for all purposes.

```
SEQUENCE LISTING
amino acid sequence of wild-type Cry3Aa protein
                                                            SEQ ID NO: 1
MNPNNRSEHDTIKTTENNEVPTNHVQYPLAETPNPTLEDLNYKEFLRMTADNNTEALDSSTTKDVIQKGISVVGD

LLGVVGFPFGGALVSFYTNFLNTIWPSEDPWKAFMEQVEALMDQKIADYAKNKALAELQGLQNNVEDYVSALSSW

QKNPVSSPNPHSQGRIPELFSQAESHFRNSMPSFAISGYEVLFLTTYAQAANTHLFLLKDAQIYGEEWGYEKEDI

AESYKRQLKLTQEYTDHCVKWYNVGLDKLRGSSYESWVNFNRYRREMTLTVLDLIALFPLYDVPLYPKEVKTELT

RDVLTDPIVGVNNLPGYGTTFSNLENYERKPHLFDYLHPIQFHTRFQPGYYGNDSSNYWSGNYVSTRPSIGSNDI
```

-continued
```
ITSPFYGNKSSEPVQNLEFNGEKVYRAVANTNLAVWPSAVYSGVTKVEFSQYNDQTDEASTQTYDSKRNVGAVSW

DSIDQLPPETTDEPLEKGYSHQLNYVMCFLMQGSRGTIPVLTWTHKSVDFFNMIDSKKITQLPLVKAYKLQSGAS

VVAGPRFTGGDIIQCTENGSAATIYVTPDVSYSQKYRARIHYASTSQITFTLSLDGAPFNQYYFDKTINKGDTLT

YNSFNLASFSTPFELSGNNLQIGVTGLSAGDKVYIDKIEFIPVN
``` amino acid sequence of Pos3Aa protein
(underlined portion is P3AP sequence)

SEQ ID NO: 2
```
MNPNNRSEHDTIKTTENNEVPTNHVQYPLAETPNPTLEDLNYKEFLRMTADNNTEALDSSTTKDVIQKGISVVGD

LLGVVGFPFGGALVSFYTNFLNTIWPSEDPWKAFMEQVEALMDQKIADYAKNKALAELQGLQNNVEDYVSALSSW

QKNPVSSPNPHSQGRIPELFSQAESHFRNSMPSFAISGYEVLFLTTYAQAANTHLFLLKDAQIYGEEWGYEKEDI

AESYKRQLKLTQEYTDHCVKWYNVGLDKLRGSSYESWVNFNRYRREMTLTVLDLIALFPLYDVPLYPKEVKTELT

RDVLTDPIVGVNNLPGYGTTFSNLENYERKPHLFDYLHPIQFHTRFQPGYYGNDSSNYWSGNYVSTRPSIGSNDI

ITSPFYGNKSSEPVQLEFKGEKVYRAVANANTNLAVWPSAVYSGVTKVKFSQYNDTKKASKQTYDSKRNVGAVSW

DSIDQLPPETKKKPLKKGYSHQLNYVMCFLMQGSRGTIPVLTWTHKSVDFFNMIDSKKITQLPLVKAYKLQSGAS

VVAGPRFTGGDIIQCTENGSAATIYVTPDVSYSQKYRARIHYASTSQITFTLSLDGAPFNQYYFDKTINKGDTLT

YNSFNLASFSTPFELSGNNLQIGVTGLSAGDKVYIDKIEFIPVN
``` amino acid sequence of Pos3AaTM protein

SEQ ID NO: 3
```
MNPNNRSEHDTIKTTENNEVPTNHVQYPLAETPNPTLEDLNYKEFLRMTADNNTEALDSSTTKDVIQKGISVVGD

LLGVVGFPFGGALVSFYTNFLNTIWPSEDPWKAFMEQVEALMDQKIADYAKNKALAELQGLQNNVEDYVSALSSW

QKNPVSSPNPHSQGRIPELFSQAESHFRNSMPSFAISGYEVLFLTTYAQAANTHLFLLKDAQIYGEEWGYEKEDI

AESYKRQLKLTQEYTDHCVKWYNVGLDKLRGSSYESWVNFNRYRREMTLTVLDLIALFPLYDVPLYPKEVKTELT

RDVLTDPIVGVNNLPGYGTTFSNLENYERKPHLFDYLHPIQFHTRFQPGYYGNDSSNYWSGNYVSTRPSIGSNDI

ITSPFYGNKSSEPVQLEFKGEKVYRAVANANTNLAVWPSAVYSGVTKVKFSQYNDTKKASKQTYDSKRNVGAVSW

DSIDQLPPETKKKPLKKGYSHQLNYVMCFLMQGSRGTIPVLTWTHKSVDFFNMIDSKKITQLPLVKAYKLQSGAS

VVAGPRFTGGDIIQCTENGSAATIYVTPDVSYSQKYRARIHYASTSQITFTLSLDGAPFNQYYFDKTINKGDTLT

YNSFNLASFSTPFELSGNNLQIGVTGLSAGDKVYIDKIEFIPVN
``` amino acid sequence of CryIAa

SEQ ID NO: 4
```
  1 MDNNPNINEC IPYNCLSNPE VEVLGGERIE TGYTPIDISL SLTQFLLSEF VPGAGFVLGL

61 VDIIWGIFGP SQWLAFPVQI EQLINQPIEE FARNQAISRL EGLSNLYQIY AESFREWEAD

121 PTNPALREEM RIQFNDMNSA LTTAIPLLAV QNYQVPLLSV YVQAANLHLS VLRDVSVFGQ

181 PWGFDAATIN SRYNDLTRLI GNYTDYAVRW YNTGLERVWG PDSRDWVRYN QFRPELTLTV

241 LDIVALFSNY DSRRYPIRTV SQLTREIYTN PVLENFDGSF RGMAQRIEQN IPQPHLMDIL

301 NSITIYTDVH RGFNYESGHQ ITASPVGFSG PEFAFPLFGN AGNAAPPVLV SLTGLGIFPT

361 LSSPLYRRII LGSGPNNQEL FVLDGTEFSF ASLTTNLPST IYRQRGTVDS LDVIPPQDNS

421 VPPRAGFSHR LSHVTMLSQA AGAVYTLRAP TFSWQHRSAE FNNIIPSSQI TQIPLTKGTN

481 LGSGTSVVKG PGFTGGDILR RTSPGQISTL RVNITAPLSQ RYRVRIPYAS TTNLQFNTSI

541 DGRPINQGNF SATMSSGSNL QSGSFRTVGF TTPFNFSNGS SVFTLSAHVF NSGNEVYIDR

601 IEFVPAEVTF EAEYDLERAQ KAVNELFTSS NQIGLKTDVT DYHIDQVSNL VECLSDEFCL

661 DEKQELSEKV KHAKPLSDER NLLQDPNFRG INRQLDRGWR GSTDITIQGG DDVFKENYVT

721 LLGTFDECYP TYLYQKIDES KLKAYTRYQL RGYIEDSQDL EIYLIRYNAK HETVNVPGTG

781 SLWPLSAQSP IGKCGEPNRC APHLEWNPDL DCSCPDGEKC AHHSHHFSLD IDVGCTDLNE

841 DLGVWVIFKI KTQDGHARLG NLEFLEEKPL VGEALARVKR AEKKWRDKPE KLEWETNIVY
```

-continued

901 KEAKESVDAL FVNSQYDQLQ ADTNIAMIHA ADKRVHSIRE AYLPELSVIP GVNAAIFEEL

961 EGRIFTAFSL YDARNVIKNG DFNNGLSCWN VKGHVDVEEQ NNQRSVLVLP EWEAEVSQEV

1021 RVCPGRGYIL RVTAYKEGYG EGCVTIHEIE NNTDELKFSN CVEEEIYPNN TVTCNDYTVN

1081 QEEYGGAYTS RNRGYNEAPS VPSFYSDVYE EKSYTDGRRE NPCEFNRGYR DYTPLPVGYV

1141 TKELEYFPET DKVWIEIGET EGTFIVDGVE LLLMEE amino acid sequence of Cry2Aa

SEQ ID NO: 5

1 MNNVLNGGRT TICDAYNVVA HDPFSFEHKS LDTIQKEWME WKPTDHSLYV APVVGTVSGF

61 LLKKVGSLIG KRILSELWGI IFPSGSTNLM QDILRETEQF LNQRLNTDTL ARVNAELIGL

121 QANIREFNQQ VDNFLNPTQN PVPLSITSSV NTMQQLFLNP LPQFQIQGYQ LLLLPLFAQA

181 ANMHLSFIRD VILNSFEWGI SAATLRTYRD YLRNYTRDYS NYCINTYQYQ FRGLNTRLHD

241 MLEFRTYMFL NVFEYVSIWS LFKYQSLMVS SGANLYAGGS GPQQTQSFTA QNWPFLYSLF

301 QVNSNYILSG ISGTRLSITF PNIGGLPGGT TTHSLNSARV NYSGGVSSGL IGATNLNHNP

361 NCSTVLPPLS TPFVRSWLDS GTDREGVATS TNWQTESFQT TLSLRCGAFS ARGNSNYFPD

421 YFIPNISGVP LVIRNEDLTP PLHYNQIRNI ESPSGTPGGA PAYLVSVHNR KNNIYAANEN

481 GTMIHLAPED YTGFTISPIH ATQVNNQTRT FIGEKFGNQG DSLRFEQSNT TARTTLRGNG

541 NSYNLYLPVS SIGNSTIRVT INGRVYTVSN VNTTTNNDGV NDNGARFSDI NIGINVASDN

601 TNVTLDINVT LNSGTPFDLM NIMFVPTNLP PLY amino acid sequence of Cry4Aa

SEQ ID NO: 6

1 MNPYQNKNEY ETLNASQKKL NISNNYTRYP IENSPKQLLQ STNYKDWLNM CQQNQQYGGD

61 FETFIDSGEL SAYTIVVGTV LTGFGFTTPL GLALIGFGTL IPVLFPAQDQ SNTWSDFITQ

121 TKNIIKKEIA STYISNANKI LMRSFNVIST YHNHLKTWEN NPNPQNTQDV RTQIQLVHYH

181 FQNVIPELVN SCPPNPSDCD YYNILVLSSY AQAANLHLTV LNQAVKFEAY LKNNRQFDYL

241 EPLPTAIDYY PVLTKAIEDY TRYCVTTYKK GLNLIKTTPD SNLDGNINWN TYNTYRTKMT

301 TAVLDAVVLF PNYDVGKYPI GVQSELTREI YQVLNFEESP YKYYDFQYQE DSLTRRPHLF

361 TWLDSLNFYE KAQTTPNNFF TSHYNMFHYT LDNISQKSSV FGNHNVTDKL KSLGLATNIY

421 IFLLNVISLD NKYLNDYNNI GKMDFFITNG TRLLEKELTA GSGQITYDVN KNIFGLPILK

481 RRENQGNPTL FPTYDNYSHI LSFIKSLSIP ATYKTQVYTF AWTHSSVDPK NTIYTH1TTQ

541 IPAVKANSLG TASKVVQGPG HTGGDLIDFK DHFKITCQHS NFQQSYFIRI RYASNGSANT

601 PAVINLSIPG VAELGMALNP TFSGTDYTNL KYKDFQYLEF SNEVKFAPNQ NISLVFNRSD

661 VYTNTTVLID KIEFLPITPS IREDREKQKL ETVQQIINTF YANPIKHTLQ SELTDYDIDQ

721 AANLVECISE ELYPKEKMLL LDEVKNAKQL SQSRNVLQKG DFESATLGWT TSDNITIQED

781 DPIFKGHYLH MSGARDILGT IFPTYIFQKI DESKLKPYTR YLVPGFVGSS KDVELVVSRY

841 GEEIDAIMNV FADLNYLYPS TFDCEGSNRC ETSAVPANIG NTSDMLYSCQ YDTGKKHVVC

901 QDSHQFSFTI DTGALDTNEN IGVWVMFKIS SPDGYASLDN LEVIEEGPID GEALSPVKHM

961 EKKWNDQMEA KRSETQQAYD VAKQAIDALF TNVQDEALQF DTTLAQIQYA EYLVQSIPYV

1021 YNDWLSDVPG MRYDIYVELD APVAQARYLY DIRNIIKNGD FTQGVMGWHV TGNADVQQID

-continued

1081 GVSVLVLSNW SAGVSQNVHL QHNHGYVLGV IAKKEGPGNG YVTLMDWEEN QEKLTFTSCE

1141 EGYITKTVDV FPDTDRVPIE IGETEGSFYI ESIELICMNE amino acid sequence of Cry5B

SEQ ID NO: 7

1 MATINELYPV PYNVLAHPIK EVDDPYSWSN LLKGIQEGWE EWGKTGQKKL FEDHLTIAWN

61 LYKTGKLDYE ALTKASTSLI GFTPGAEAAV PFINMFVDFV WPKLFGANTE GKDQQLFNAI

121 MDAVNKMVDN KFLSYNLSTL NKTIEGLQGN LGLFQNAIQV AICQGSTPER VNFDQNCTPC

181 NPNQPCKDDL DRVASRFDTA NSQFTQHLPE FKNPWSDENS TQEFKPTSVE LTLPMYTTVA

241 TLHLLLYEGY IEFMTKWNFH NEQYLNNLKV ELQQLIHSYS ETVRTSFLQF LPTLNNPSKS

301 SVNAYNRYVR NMTVNCLDIA ATWPTFDTHN YHQGGKLDLT RIILSDTAGP IEEYTTGDKT

361 SGPEHSNITP NNILDTPSPT YQHSFVSVDS IVYSRKELQQ LDIATYSTNN SNNCHPYGLP

421 LSYTDGSRYD YGDNQPDFTT SNNNYCHNSY TAPITLVNAR HLYNAKGSLQ NVESLVVSTV

481 NGGSGSCICD AWINYLRPPQ TSKNESPPDQ KINVLYPITE TVNKGTGGNL GVISAYVPME

541 LVPENVIGDV NADTKLPLTQ LKGFPFEKYG SEYNNRGISL VPEWINGNNA VKLSNSQSVG

601 IQITNQTKQK YEIRCRYASK GDNNVYFNVD LSENPFPNSI SFGSTESSVV GVQGENGRYI

661 LKSITTVEIP AGSFYVHITN QGSSDLFLDR IEPVPKIQFQ FCDNNNLHCD CNNPVDTDCT

721 FCCVCTSLTD CDCNNPRGLD CTLCCQVENQ LPSFVTLTDL QNITTQVNAL VASSEHDTLA

781 TDVSDYEIEE VVLKVDALSG EVFGKEKKAL RKLVNHTKRL SKARNLLIGG NFDNLDAWYR

841 GRNVVNVSDH ELFKSDHVLL PPPTLYSSYM FQKVEESKLK ANTRYTVSGF IAHAEDLEIV

901 VSRYGQEVKK VVQVPYGEAF PLTSPGAICC PPRSTSNGKP ADPHFFSYSI DVGTLLVEAN

961 PGIELGLRIV ERTGMARVSN LEIREDPPLK KNELRNVQRA ARNWRTATDQ ERAEVTALIQ

1021 PVLNQINALY ENEDWNGAIP SGVSYHDLEA IVLPTLPKLN HWFMSDMLGE QGSILAQFQE

1081 ALDRATTQLE ESTILHNGHF TTDAANWTIE GDAHHAILED GRRVLRLPDW SSSVSQTIEI

1141 ENFDPDKEYQ LVFHAQGEGT VSLQHGEEGE YVETHPRKSA NFTTSHRQGV TFETNKVTVE

1201 ITSEDGEFLV DHIALVEAPL PTDDQSSDGN TTSNTNSNTS MMNNQ amino acid sequence of Cry7Ca1

SEQ ID NO: 8

1 MDKQNDSGII KATLNEDFSN SIQRYPLVTD QTINYKDFLN MNEEIAPYAS SKDVIFSSIS

61 IIRTEMGFAG HGTAGGIIGL FTEVLRLLWP NKQMDLWESF MNEVEALINQ EITEAVVSKA

121 LSELEGLPNA LEGYTSALEA WQNNRSDKLK QLLVYERFVS TENLFKFAMP SFRSVGFEGF

181 LLTVYAQAAN LHLFLLKNAE LFGAEWGMQQ YEIDLFYNEQ KGYVEEYTDR CVKWYKEGLN

241 KLKNASGVKG KVWENYNRFP REMTIMVLDL LPLFPIYDAR TYPMETVTEL TRQIFTDPIG

301 LTGINETKYP DWYGAASSEF VLIENPAIPK PGLFQWLTKI NVRARVVEPN DRFAIWTRHS

361 VVTQCTKSTT ENTFNYGTSS GSTLSHTFDL LSKDIYQTYS IAAANKSATW YQAVPLLRLY

421 GINSSNVLSE DAFSFSNNIP SSKCKSTYSS DQLPIELLDE PIYGDLEEYG RRLSYVSEIF

481 KETGSGTIPV LGWTHVSVRP DNKLYPDKIT QIPAVKAFET NTAGVEIIDS ASTGGPILKI

541 VNNNLPSNQV FPMPLSFSEP QKTKVRVRYA ATGDGVMSFS GIAHDEYFTA TMKEGEALKY

601 SYLTMGNDYA GTAAELSMIY TTKANTSNCT IYIDKIEEIP VDENYNNRVQ LEKAQRAVNT

661 LFTAGRNALQ KDVTDFKVDQ VSILVDCVSG ELYPNEKREL LSLVKYAKPL SYSRNLLLLP

721 TFDSINSSEE NGWNGSNGIA IGSGDFVFKG NYLIFSGTND EQYPTYLYQK IDESKLKEYT

781 PYKLRGFIES SQDLEAYVIR YDAKHETLDV SMNLLPDIPP VNACGEPNRC AALQYLDENP

841 KLECSSIQDG ILSDSHSFSL HIDTGSIDFN ENVGIWVLFK ISTPEGYAKF GNLEVIEDGP

901 VIGEALARVK RQETKWRNKL TQLRTETQAI YTRAKQALDN LFTDAQDSHL KIGATFAAIV

```
 961 AARKIVQSIR EAYMSWLSDV PGLNYPIFTE LNDRVQRAFQ LYDVQNVVRN GRFLNGVLLW
1021 IVTSDVRVQE GNGNNVLVLS GWDAQVLQCL NLYQNRGYIL RVTARKEGLG EGYITITDEE
1081 GNTDQLTFGS CENIDSSNSF VSTGYITKEL EFFPDTDQIQ IEIGETEGTF QVESVELFLM
1141 ENLC
``` amino acid sequence of Cry8Ea1      SEQ ID NO: 9

MSPNNQNEYEIIDMAPSTSVSNDSNRYPFASDPTNALQNMNYKEYLRMSEGYDSEYSGSP
EVLISERDAVKTAISLVGTILGKLGVPLVGPIVSLYSTLIDVLWPGGKSQWEIFMEQVEA
LINQKIAEYARAKALAELEGLGNNYQLYLTALEEWQENPSSTRVLRDVPNRFEILDSLFT
QYMPSFRVTGYEVPLLSVYAQAANLHLLLLKDASIFGEEWGFSTTAINNYYNRQMSLIAQ
YSDHCVQWYRTGLDRLKGSNEKQWVEYNRFPREMTLSVLDIMTLFPMYDMRTYPMETKAQ
LTREVYTDPIGAIGAQGSWYDSAPSFNTLESTSIRGKHLFDFITRLSIYTGRSSSSASNY
YYGVSKVVFDAIYPDNKYKTTFTYNPGGEGIGAQEKDSEVELPPETLDQPNYEATSHRLN
YVTFIRNPDVPVFSWTHPSADRTNTVYSDKITQIPVVKASDGPKPSANEVGHYLGGDPIS
FNSSGSTGVIRLNINSPLSQKYRVRIRYCSSVDFDLDVVPGGTTVNNGPFNKSAPNVGWQ
SLKYENFKFASFSTPFTFNQAQDTLKISVRNFSSIVGGSVVYIDRIELIPVNATYEAEQD
LDSAKKAVNTLFTNTKDGLRPGVTDYEVNQAANLVECLSDDLYPNEKRLLFDAVKEAKRL
SEAPNLLQDPDFQEINGENGWTASTGIEVVEGDALFKGRYLRLPGAREMDTETYPTYLYQ
KVEEGVLKPYTRYRLRGFVGSSQGLEISTIRHQTNRIVKNVPDDLLPDVPPVNSDGRINR
CSEQKYVNSRLEGERGLPNGNRSAEAHEFSLPIDIGELDYNENAGIWVGFKITDPEGYAT
LGNLELVEEGPLSGDALERLQREEQQWKLQMTKRREETDRKYTAAKQAVDRKYADYDDQQ
LNPNVEITDITAAQNLIQSIPYVYNEMFPEIQGMNYTKYTELTNRLQQAWGLYDQPNAIP
NGDFPNELSNWNTTSGVNVQQINNTSVLVMPNWDGQVSQQFTVQPNQRYVLRVTARKEGV
GNGYVSIRDGGNQTETLTFSASDYNTDSVYNTQVSNTNGLYNEQTGYTTKTVTFIPYTDQ
VWIEMSETGFMFYIESVELIVDVE amino acid sequence of Cry10Aa      SEQ ID NO: 10

MYPYQNKNEYEIFNAPSNGFSKSNNYSPYPLANKPNQPLKNTNYKDWLNVCQDNQQYGNN
AGNFASSETIVGVSAGIIVVGTMLGAFAAPVLAAGIISFGTLLPIFWQGSDPANVWQDLL
NIGGRPIQEIDKNIINVLTSIVTPIKNQLDKYQEFFDKWEPARTHANAKAVHDLFTTLEP
IIDKDLDMLKNNASYRIPTLPAYAQIATWHLNLLKHAATYYNIWLQNQGINPSTFNSSNY
YQGYLKRKIQEYTDYCIQTYNAGLTMIRTNTNATWNMYNTYRLEMTLTVLDLIAIFPNYD
PEKYPIGVKSELIREVYTNVNSDTFRTITELENGLTRNPTLFTWINQGRFYTPNSRDILD
PYDIFSFTGNQMAFTHTNDDPNIIWGAVHGNIISQDTSKVFPFYRNKPIDKVEIVRHREY
SDIIYEMIFFSNSSEVFRYGGNSTIENNYKRTDSYMIPKQTWKNEEYGHTLSYIKTDNYI
FSVVRERRPVAFSWTHTSVDFQNTIDLLNITQIHALKALKVSSDSKIVKGPGHTGGDLVI
LKDSMDFRVRFLKNVSRQYQVRIRYATNAPKTTVFLTGIDTISVELPSTTSRQNPNATDL
TYADFGYVTFPPTVPNKTFEGEDTLLMTLYGTPNHSYNIYIDKIEFIPITQSVLDYTEKQ
NIEKTQKIVNDLFVN amino acid sequence of Cry11Aa      SEQ ID NO: 11

MEDSSLDTLSIVNETDFPLYNNYTEPTIAPALIAVAPIAQYLATAIGKWAAKAAFSKVLS
LIFPGEQPATMEKVRTEVETLIEQKLSQERVNILNAEYRGIIEVSDVFDAYIKQPGFTPA

-continued

```
VDSFIKLFNQKVLDYRTRLMRMYTEEFGRLCKVSLKDGLTFRNMCNLYVFPPFAEAWSLMR

YELGLKLSQSSLWDYVGVSIPVNYVEWGGLVYKLLMGEVNQRLTTVKFNYSFTNEPADIP

ARENIRGVHPIYDPSSGLTGWIGNGRTNNFNFADNNGNEIMEVRTQTFYQNPNNEPIAPR

DIINQILTAPAPADLFFKNADINVKFTQWFQSTLYGWNIKLGTQTVLSSRTGTIPPNYLA

YDGYYIRAISACPRGVSLAYNHDLTTLTYNRIEYDSPTTENIIVGFAPDNTKDFYSKKSH

YLSETNDSYVIPALQFAEVSDRSFLEDTPDQATDGSIKFARTFISNEAKYSIRLNTGFNT

ATRYKLIIRVRVPYRLPAGIRVQSQNSGNNRMLGSFTANANPEWVDFVTDAFTFNDLGIT

TSSTNALFSISSDSLNSGEEWYLGQLFLVKEGAFTTQINPLLK
```

---

What is claimed is:

1. A polypeptide comprising a modified SEQ ID NO:1, with two or more of amino acids at residues 391, 395, 423, 430, 432, 433, 436, 461, 462, 463, and 466 of SEQ ID NO:1 replaced with lysine, wherein the polypeptide forms crystal upon being expressed in a host cell.

2. The polypeptide of claim 1, wherein all amino acids at residues 391, 395, 423, 430, 432, 433, 436, 461, 462, 463, and 466 of SEQ ID NO:1 have been replaced with lysine.

3. The polypeptide of claim 2, wherein the modified SEQ ID NO:1 further comprises mutations at residues 533, 535, and 536.

4. The polypeptide of claim 3, wherein the modified SEQ ID NO:1 comprises amino acids at residues 391, 395, 423, 430, 432, 433, 436, 461, 462, 463, and 466 having been replaced with lysine, and amino acids at residues 533, 535, and 536 having been replaced with alanine.

5. The polypeptide of claim 1, which is linked to a heterologous moiety.

6. The polypeptide of claim 5, which is a fusion protein, wherein the heterologous moiety is a reporter protein or a therapeutic protein.

7. The polypeptide of claim 6, which is a fusion protein comprising the modified SEQ ID NO:1 and the therapeutic protein.

8. A nucleic acid comprising a polynucleotide sequence encoding the polypeptide of claim 1.

9. An expression cassette comprising a promoter operably linked to a polynucleotide sequence encoding the polypeptide of claim 1.

10. A vector comprising the expression cassette of claim 9.

11. A host cell comprising the polypeptide of claim 1.

12. The host cell of claim 11, which is a bacterial cell.

13. The host cell of claim 12, which is a *Bacillus subtilis* (Bs) or *Bacillus thuringiensis* (Bt) cell or an *E. coli* cell.

14. A method for producing the polypeptide of claim 1, comprising the steps of (i) introducing a nucleic acid comprising a polynucleotide sequence encoding the polypeptide, or an expression cassette comprising a promoter operably linked to a polynucleotide sequence encoding the polypeptide, or a vector comprising the expression cassette into a host cell; and (ii) culturing the cell under conditions permissible for the expression of the polypeptide.

15. The method of claim 14, wherein the host cell is a bacterial cell.

16. The method of claim 15, wherein the host cell is a *Bacillus subtilis* (Bs) or *Bacillus thuringiensis* (Bt) cell or an *E. coli* cell.

17. The method of claim 14, further comprising step (iii) of purifying the fusion protein.

18. A composition comprising the polypeptide of claim 1 and a mammalian cell.

19. The composition of claim 18, wherein the polypeptide is crystallized.

20. The composition of claim 18, wherein the mammalian cell is a cancer cell, epithelial cell, fibroblast cell, neuronal cell, or immune cell.

21. A method delivering a therapeutic protein into a mammalian cell, comprising the step of contacting the polypeptide of claim 1 with the mammalian cell, wherein the polypeptide is a fusion protein of the modified SEQ ID NO:1 and the therapeutic protein, and the polypeptide is crystallized.

22. The method of claim 21, wherein the mammalian cell is a cancer cell, epithelial cell, fibroblast cell, neuronal cell, or immune cell.

23. The method of claim 21, wherein the mammalian cell is within a patient's body.

\* \* \* \* \*

SEQUENCE LISTING

<160> NUMBER OF SEQ ID NOS: 22

<210> SEQ ID NO 1
<211> LENGTH: 644
<212> TYPE: PRT
<213> ORGANISM: Bacillus thuringiensis

<400> SEQUENCE: 1

```
Met Asn Pro Asn Asn Arg Ser Glu His Asp Thr Ile Lys Thr Thr Glu
1               5                   10                  15

Asn Asn Glu Val Pro Thr Asn His Val Gln Tyr Pro Leu Ala Glu Thr
                20                  25                  30

Pro Asn Pro Thr Leu Glu Asp Leu Asn Tyr Lys Glu Phe Leu Arg Met
            35                  40                  45

Thr Ala Asp Asn Asn Thr Glu Ala Leu Asp Ser Ser Thr Thr Lys Asp
        50                  55                  60

Val Ile Gln Lys Gly Ile Ser Val Val Gly Asp Leu Leu Gly Val Val
65                  70                  75                  80

Gly Phe Pro Phe Gly Gly Ala Leu Val Ser Phe Tyr Thr Asn Phe Leu
                85                  90                  95

Asn Thr Ile Trp Pro Ser Glu Asp Pro Trp Lys Ala Phe Met Glu Gln
                100                 105                 110

Val Glu Ala Leu Met Asp Gln Lys Ile Ala Asp Tyr Ala Lys Asn Lys
            115                 120                 125

Ala Leu Ala Glu Leu Gln Gly Leu Gln Asn Asn Val Glu Asp Tyr Val
        130                 135                 140

Ser Ala Leu Ser Ser Trp Gln Lys Asn Pro Val Ser Ser Arg Asn Pro
145                 150                 155                 160

His Ser Gln Gly Arg Ile Arg Glu Leu Phe Ser Gln Ala Glu Ser His
                165                 170                 175

Phe Arg Asn Ser Met Pro Ser Phe Ala Ile Ser Gly Tyr Glu Val Leu
                180                 185                 190

Phe Leu Thr Thr Tyr Ala Gln Ala Ala Asn Thr His Leu Phe Leu Leu
            195                 200                 205

Lys Asp Ala Gln Ile Tyr Gly Glu Glu Trp Gly Tyr Glu Lys Glu Asp
        210                 215                 220

Ile Ala Glu Phe Tyr Lys Arg Gln Leu Lys Leu Thr Gln Glu Tyr Thr
225                 230                 235                 240

Asp His Cys Val Lys Trp Tyr Asn Val Gly Leu Asp Lys Leu Arg Gly
                245                 250                 255

Ser Ser Tyr Glu Ser Trp Val Asn Phe Asn Arg Tyr Arg Arg Glu Met
                260                 265                 270
```

Thr Leu Thr Val Leu Asp Leu Ile Ala Leu Phe Pro Leu Tyr Asp Val
            275                 280                 285

Arg Leu Tyr Pro Lys Glu Val Lys Thr Glu Leu Thr Arg Asp Val Leu
        290                 295                 300

Thr Asp Pro Ile Val Gly Val Asn Asn Leu Arg Gly Tyr Gly Thr Thr
305                 310                 315                 320

Phe Ser Asn Ile Glu Asn Tyr Ile Arg Lys Pro His Leu Phe Asp Tyr
                325                 330                 335

Leu His Arg Ile Gln Phe His Thr Arg Phe Gln Pro Gly Tyr Tyr Gly
            340                 345                 350

Asn Asp Ser Phe Asn Tyr Trp Ser Gly Asn Tyr Val Ser Thr Arg Pro
        355                 360                 365

Ser Ile Gly Ser Asn Asp Ile Ile Thr Ser Pro Phe Tyr Gly Asn Lys
370                 375                 380

Ser Ser Glu Pro Val Gln Asn Leu Glu Phe Asn Gly Glu Lys Val Tyr
385                 390                 395                 400

Arg Ala Val Ala Asn Thr Asn Leu Ala Val Trp Pro Ser Ala Val Tyr
                405                 410                 415

Ser Gly Val Thr Lys Val Glu Phe Ser Gln Tyr Asn Asp Gln Thr Asp
            420                 425                 430

Glu Ala Ser Thr Gln Thr Tyr Asp Ser Lys Arg Asn Val Gly Ala Val
        435                 440                 445

Ser Trp Asp Ser Ile Asp Gln Leu Pro Pro Glu Thr Thr Asp Glu Pro
450                 455                 460

Leu Glu Lys Gly Tyr Ser His Gln Leu Asn Tyr Val Met Cys Phe Leu
465                 470                 475                 480

Met Gln Gly Ser Arg Gly Thr Ile Pro Val Leu Thr Trp Thr His Lys
                485                 490                 495

Ser Val Asp Phe Phe Asn Met Ile Asp Ser Lys Lys Ile Thr Gln Leu
            500                 505                 510

Pro Leu Val Lys Ala Tyr Lys Leu Gln Ser Gly Ala Ser Val Val Ala
        515                 520                 525

Gly Pro Arg Phe Thr Gly Gly Asp Ile Ile Gln Cys Thr Glu Asn Gly
530                 535                 540

Ser Ala Ala Thr Ile Tyr Val Thr Pro Asp Val Ser Tyr Ser Gln Lys
545                 550                 555                 560

Tyr Arg Ala Arg Ile His Tyr Ala Ser Thr Ser Gln Ile Thr Phe Thr
                565                 570                 575

Leu Ser Leu Asp Gly Ala Pro Phe Asn Gln Tyr Tyr Phe Asp Lys Thr
            580                 585                 590

Ile Asn Lys Gly Asp Thr Leu Thr Tyr Asn Ser Phe Asn Leu Ala Ser
        595                 600                 605

Phe Ser Thr Pro Phe Glu Leu Ser Gly Asn Asn Leu Gln Ile Gly Val
610                 615                 620

Thr Gly Leu Ser Ala Gly Asp Lys Val Tyr Ile Asp Lys Ile Glu Phe
625                 630                 635                 640

Ile Pro Val Asn

<210> SEQ ID NO 2
<211> LENGTH: 644
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 2

```
Met Asn Pro Asn Asn Arg Ser Glu His Asp Thr Ile Lys Thr Thr Glu
 1               5                  10                  15

Asn Asn Glu Val Pro Thr Asn His Val Gln Tyr Pro Leu Ala Glu Thr
             20                  25                  30

Pro Asn Pro Thr Leu Glu Asp Leu Asn Tyr Lys Glu Phe Leu Arg Met
         35                  40                  45

Thr Ala Asp Asn Asn Thr Glu Ala Leu Asp Ser Ser Thr Thr Lys Asp
     50                  55                  60

Val Ile Gln Lys Gly Ile Ser Val Val Gly Asp Leu Leu Gly Val Val
 65                  70                  75                  80

Gly Phe Pro Phe Gly Gly Ala Leu Val Ser Phe Tyr Thr Asn Phe Leu
                 85                  90                  95

Asn Thr Ile Trp Pro Ser Glu Asp Pro Trp Lys Ala Phe Met Glu Gln
            100                 105                 110

Val Glu Ala Leu Met Asp Gln Lys Ile Ala Asp Tyr Ala Lys Asn Lys
        115                 120                 125

Ala Leu Ala Glu Leu Gln Gly Leu Gln Asn Asn Val Glu Asp Tyr Val
    130                 135                 140

Ser Ala Leu Ser Ser Trp Gln Lys Asn Pro Val Ser Ser Arg Asn Pro
145                 150                 155                 160

His Ser Gln Gly Arg Ile Arg Glu Leu Phe Ser Gln Ala Glu Ser His
                165                 170                 175

Phe Arg Asn Ser Met Pro Ser Phe Ala Ile Ser Gly Tyr Glu Val Leu
            180                 185                 190

Phe Leu Thr Thr Tyr Ala Gln Ala Ala Asn Thr His Leu Phe Leu Leu
        195                 200                 205

Lys Asp Ala Gln Ile Tyr Gly Glu Glu Trp Gly Tyr Glu Lys Glu Asp
    210                 215                 220

Ile Ala Glu Phe Tyr Lys Arg Gln Leu Lys Leu Thr Gln Glu Tyr Thr
225                 230                 235                 240

Asp His Cys Val Lys Trp Tyr Asn Val Gly Leu Asp Lys Leu Arg Gly
                245                 250                 255

Ser Ser Tyr Glu Ser Trp Val Asn Phe Asn Arg Tyr Arg Arg Glu Met
            260                 265                 270

Thr Leu Thr Val Leu Asp Leu Ile Ala Leu Phe Pro Leu Tyr Asp Val
        275                 280                 285

Arg Leu Tyr Pro Lys Glu Val Lys Thr Glu Leu Thr Arg Asp Val Leu
    290                 295                 300

Thr Asp Pro Ile Val Gly Val Asn Asn Leu Arg Gly Tyr Gly Thr Thr
305                 310                 315                 320

Phe Ser Asn Ile Glu Asn Tyr Ile Arg Lys Pro His Leu Phe Asp Tyr
                325                 330                 335

Leu His Arg Ile Gln Phe His Thr Arg Phe Gln Pro Gly Tyr Tyr Gly
            340                 345                 350

Asn Asp Ser Phe Asn Tyr Trp Ser Gly Asn Tyr Val Ser Thr Arg Pro
        355                 360                 365

Ser Ile Gly Ser Asn Asp Ile Ile Thr Ser Pro Phe Tyr Gly Asn Lys
    370                 375                 380

Ser Ser Glu Pro Val Gln Lys Leu Glu Phe Lys Gly Glu Lys Val Tyr
385                 390                 395                 400
```

Arg Ala Val Ala Asn Thr Asn Leu Ala Val Trp Pro Ser Ala Val Tyr
                    405                 410                 415

Ser Gly Val Thr Lys Val Lys Phe Ser Gln Tyr Asn Asp Lys Thr Lys
                420                 425                 430

Lys Ala Ser Lys Gln Thr Tyr Asp Ser Lys Arg Asn Val Gly Ala Val
                435                 440                 445

Ser Trp Asp Ser Ile Asp Gln Leu Pro Pro Glu Thr Lys Lys Lys Pro
450                 455                 460

Leu Lys Lys Gly Tyr Ser His Gln Leu Asn Tyr Val Met Cys Phe Leu
465                 470                 475                 480

Met Gln Gly Ser Arg Gly Thr Ile Pro Val Leu Thr Trp Thr His Lys
                485                 490                 495

Ser Val Asp Phe Phe Asn Met Ile Asp Ser Lys Lys Ile Thr Gln Leu
                500                 505                 510

Pro Leu Val Lys Ala Tyr Lys Leu Gln Ser Gly Ala Ser Val Val Ala
                515                 520                 525

Gly Pro Arg Phe Thr Gly Gly Asp Ile Ile Gln Cys Thr Glu Asn Gly
                530                 535                 540

Ser Ala Ala Thr Ile Tyr Val Thr Pro Asp Val Ser Tyr Ser Gln Lys
545                 550                 555                 560

Tyr Arg Ala Arg Ile His Tyr Ala Ser Thr Ser Gln Ile Thr Phe Thr
                565                 570                 575

Leu Ser Leu Asp Gly Ala Pro Phe Asn Gln Tyr Tyr Phe Asp Lys Thr
                580                 585                 590

Ile Asn Lys Gly Asp Thr Leu Thr Tyr Asn Ser Phe Asn Leu Ala Ser
                595                 600                 605

Phe Ser Thr Pro Phe Glu Leu Ser Gly Asn Asn Leu Gln Ile Gly Val
                610                 615                 620

Thr Gly Leu Ser Ala Gly Asp Lys Val Tyr Ile Asp Lys Ile Glu Phe
625                 630                 635                 640

Ile Pro Val Asn

<210> SEQ ID NO 3
<211> LENGTH: 644
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

Met Asn Pro Asn Asn Arg Ser Glu His Asp Thr Ile Lys Thr Thr Glu
1               5                   10                  15

Asn Asn Glu Val Pro Thr Asn His Val Gln Tyr Pro Leu Ala Glu Thr
                20                  25                  30

Pro Asn Pro Thr Leu Glu Asp Leu Asn Tyr Lys Glu Phe Leu Arg Met
                35                  40                  45

Thr Ala Asp Asn Asn Thr Glu Ala Leu Asp Ser Ser Thr Thr Lys Asp
                50                  55                  60

Val Ile Gln Lys Gly Ile Ser Val Val Gly Asp Leu Leu Gly Val Val
65                  70                  75                  80

Gly Phe Pro Phe Gly Gly Ala Leu Val Ser Phe Tyr Thr Asn Phe Leu
                85                  90                  95

Asn Thr Ile Trp Pro Ser Glu Asp Pro Trp Lys Ala Phe Met Glu Gln
                100                 105                 110

-continued

```
Val Glu Ala Leu Met Asp Gln Lys Ile Ala Asp Tyr Ala Lys Asn Lys
            115                 120                 125

Ala Leu Ala Glu Leu Gln Gly Leu Gln Asn Asn Val Glu Asp Tyr Val
130                 135                 140

Ser Ala Leu Ser Ser Trp Gln Lys Asn Pro Val Ser Ser Arg Asn Pro
145                 150                 155                 160

His Ser Gln Gly Arg Ile Arg Glu Leu Phe Ser Gln Ala Glu Ser His
            165                 170                 175

Phe Arg Asn Ser Met Pro Ser Phe Ala Ile Ser Gly Tyr Glu Val Leu
            180                 185                 190

Phe Leu Thr Thr Tyr Ala Gln Ala Ala Asn Thr His Leu Phe Leu Leu
            195                 200                 205

Lys Asp Ala Gln Ile Tyr Gly Glu Glu Trp Gly Tyr Glu Lys Glu Asp
210                 215                 220

Ile Ala Glu Phe Tyr Lys Arg Gln Leu Lys Leu Thr Gln Glu Tyr Thr
225                 230                 235                 240

Asp His Cys Val Lys Trp Tyr Asn Val Gly Leu Asp Lys Leu Arg Gly
            245                 250                 255

Ser Ser Tyr Glu Ser Trp Val Asn Phe Asn Arg Tyr Arg Arg Glu Met
            260                 265                 270

Thr Leu Thr Val Leu Asp Leu Ile Ala Leu Phe Pro Leu Tyr Asp Val
            275                 280                 285

Arg Leu Tyr Pro Lys Glu Val Lys Thr Glu Leu Thr Arg Asp Val Leu
            290                 295                 300

Thr Asp Pro Ile Val Gly Val Asn Asn Leu Arg Gly Tyr Gly Thr Thr
305                 310                 315                 320

Phe Ser Asn Ile Glu Asn Tyr Ile Arg Lys Pro His Leu Phe Asp Tyr
            325                 330                 335

Leu His Arg Ile Gln Phe His Thr Arg Phe Gln Pro Gly Tyr Tyr Gly
            340                 345                 350

Asn Asp Ser Phe Asn Tyr Trp Ser Gly Asn Tyr Val Ser Thr Arg Pro
            355                 360                 365

Ser Ile Gly Ser Asn Asp Ile Ile Thr Ser Pro Phe Tyr Gly Asn Lys
370                 375                 380

Ser Ser Glu Pro Val Gln Lys Leu Glu Phe Lys Gly Glu Lys Val Tyr
385                 390                 395                 400

Arg Ala Val Ala Asn Thr Asn Leu Ala Val Trp Pro Ser Ala Val Tyr
            405                 410                 415

Ser Gly Val Thr Lys Val Lys Phe Ser Gln Tyr Asn Asp Lys Thr Lys
            420                 425                 430

Lys Ala Ser Lys Gln Thr Tyr Asp Ser Lys Arg Asn Val Gly Ala Val
            435                 440                 445

Ser Trp Asp Ser Ile Asp Gln Leu Pro Pro Glu Thr Lys Lys Lys Pro
450                 455                 460

Leu Lys Lys Gly Tyr Ser His Gln Leu Asn Tyr Val Met Cys Phe Leu
465                 470                 475                 480

Met Gln Gly Ser Arg Gly Thr Ile Pro Val Leu Thr Trp Thr His Lys
            485                 490                 495

Ser Val Asp Phe Phe Asn Met Ile Asp Ser Lys Lys Ile Thr Gln Leu
            500                 505                 510

Pro Leu Val Lys Ala Tyr Lys Leu Gln Ser Gly Ala Ser Val Val Ala
            515                 520                 525

Gly Pro Arg Phe Ala Gly Ala Ala Ile Ile Gln Cys Thr Glu Asn Gly
```

```
          530                 535                 540
Ser Ala Ala Thr Ile Tyr Val Thr Pro Asp Val Ser Tyr Ser Gln Lys
545                 550                 555                 560

Tyr Arg Ala Arg Ile His Tyr Ala Ser Thr Ser Gln Ile Thr Phe Thr
                565                 570                 575

Leu Ser Leu Asp Gly Ala Pro Phe Asn Gln Tyr Tyr Phe Asp Lys Thr
                580                 585                 590

Ile Asn Lys Gly Asp Thr Leu Thr Tyr Asn Ser Phe Asn Leu Ala Ser
            595                 600                 605

Phe Ser Thr Pro Phe Glu Leu Ser Gly Asn Asn Leu Gln Ile Gly Val
            610                 615                 620

Thr Gly Leu Ser Ala Gly Asp Lys Val Tyr Ile Asp Lys Ile Glu Phe
625                 630                 635                 640

Ile Pro Val Asn

<210> SEQ ID NO 4
<211> LENGTH: 1176
<212> TYPE: PRT
<213> ORGANISM: Bacillus thuringiensis

<400> SEQUENCE: 4

Met Asp Asn Asn Pro Asn Ile Asn Glu Cys Ile Pro Tyr Asn Cys Leu
1               5                   10                  15

Ser Asn Pro Glu Val Glu Val Leu Gly Gly Glu Arg Ile Glu Thr Gly
                20                  25                  30

Tyr Thr Pro Ile Asp Ile Ser Leu Ser Leu Thr Gln Phe Leu Leu Ser
            35                  40                  45

Glu Phe Val Pro Gly Ala Gly Phe Val Leu Gly Leu Val Asp Ile Ile
    50                  55                  60

Trp Gly Ile Phe Gly Pro Ser Gln Trp Asp Ala Phe Pro Val Gln Ile
65                  70                  75                  80

Glu Gln Leu Ile Asn Gln Arg Ile Glu Glu Phe Ala Arg Asn Gln Ala
                85                  90                  95

Ile Ser Arg Leu Glu Gly Leu Ser Asn Leu Tyr Gln Ile Tyr Ala Glu
            100                 105                 110

Ser Phe Arg Glu Trp Glu Ala Asp Pro Thr Asn Pro Ala Leu Arg Glu
        115                 120                 125

Glu Met Arg Ile Gln Phe Asn Asp Met Asn Ser Ala Leu Thr Thr Ala
    130                 135                 140

Ile Pro Leu Leu Ala Val Gln Asn Tyr Gln Val Pro Leu Leu Ser Val
145                 150                 155                 160

Tyr Val Gln Ala Ala Asn Leu His Leu Ser Val Leu Arg Asp Val Ser
                165                 170                 175

Val Phe Gly Gln Arg Trp Gly Phe Asp Ala Ala Thr Ile Asn Ser Arg
            180                 185                 190

Tyr Asn Asp Leu Thr Arg Leu Ile Gly Asn Tyr Thr Asp Tyr Ala Val
        195                 200                 205

Arg Trp Tyr Asn Thr Gly Leu Glu Arg Val Trp Gly Pro Asp Ser Arg
    210                 215                 220

Asp Trp Val Arg Tyr Asn Gln Phe Arg Arg Glu Leu Thr Leu Thr Val
225                 230                 235                 240

Leu Asp Ile Val Ala Leu Phe Ser Asn Tyr Asp Ser Arg Arg Tyr Pro
                245                 250                 255

Ile Arg Thr Val Ser Gln Leu Thr Arg Glu Ile Tyr Thr Asn Pro Val
```

```
                260                 265                 270
Leu Glu Asn Phe Asp Gly Ser Phe Arg Gly Met Ala Gln Arg Ile Glu
                275                 280                 285

Gln Asn Ile Arg Gln Pro His Leu Met Asp Ile Leu Asn Ser Ile Thr
                290                 295                 300

Ile Tyr Thr Asp Val His Arg Gly Phe Asn Tyr Trp Ser Gly His Gln
305                 310                 315                 320

Ile Thr Ala Ser Pro Val Gly Phe Ser Gly Pro Glu Phe Ala Phe Pro
                325                 330                 335

Leu Phe Gly Asn Ala Gly Asn Ala Ala Pro Val Leu Val Ser Leu
                340                 345                 350

Thr Gly Leu Gly Ile Phe Arg Thr Leu Ser Ser Pro Leu Tyr Arg Arg
                355                 360                 365

Ile Ile Leu Gly Ser Gly Pro Asn Asn Gln Glu Leu Phe Val Leu Asp
                370                 375                 380

Gly Thr Glu Phe Ser Phe Ala Ser Leu Thr Thr Asn Leu Pro Ser Thr
385                 390                 395                 400

Ile Tyr Arg Gln Arg Gly Thr Val Asp Ser Leu Asp Val Ile Pro Pro
                405                 410                 415

Gln Asp Asn Ser Val Pro Pro Arg Ala Gly Phe Ser His Arg Leu Ser
                420                 425                 430

His Val Thr Met Leu Ser Gln Ala Ala Gly Ala Val Tyr Thr Leu Arg
                435                 440                 445

Ala Pro Thr Phe Ser Trp Gln His Arg Ser Ala Glu Phe Asn Asn Ile
                450                 455                 460

Ile Pro Ser Ser Gln Ile Thr Gln Ile Pro Leu Thr Lys Ser Thr Asn
465                 470                 475                 480

Leu Gly Ser Gly Thr Ser Val Val Lys Gly Pro Gly Phe Thr Gly Gly
                485                 490                 495

Asp Ile Leu Arg Arg Thr Ser Pro Gly Gln Ile Ser Thr Leu Arg Val
                500                 505                 510

Asn Ile Thr Ala Pro Leu Ser Gln Arg Tyr Arg Val Arg Ile Arg Tyr
                515                 520                 525

Ala Ser Thr Thr Asn Leu Gln Phe His Thr Ser Ile Asp Gly Arg Pro
                530                 535                 540

Ile Asn Gln Gly Asn Phe Ser Ala Thr Met Ser Ser Gly Ser Asn Leu
545                 550                 555                 560

Gln Ser Gly Ser Phe Arg Thr Val Gly Phe Thr Thr Pro Phe Asn Phe
                565                 570                 575

Ser Asn Gly Ser Ser Val Phe Thr Leu Ser Ala His Val Phe Asn Ser
                580                 585                 590

Gly Asn Glu Val Tyr Ile Asp Arg Ile Glu Phe Val Pro Ala Glu Val
                595                 600                 605

Thr Phe Glu Ala Glu Tyr Asp Leu Glu Arg Ala Gln Lys Ala Val Asn
                610                 615                 620

Glu Leu Phe Thr Ser Ser Asn Gln Ile Gly Leu Lys Thr Asp Val Thr
625                 630                 635                 640

Asp Tyr His Ile Asp Gln Val Ser Asn Leu Val Glu Cys Leu Ser Asp
                645                 650                 655

Glu Phe Cys Leu Asp Glu Lys Gln Glu Leu Ser Glu Lys Val Lys His
                660                 665                 670

Ala Lys Arg Leu Ser Asp Glu Arg Asn Leu Leu Gln Asp Pro Asn Phe
                675                 680                 685
```

```
Arg Gly Ile Asn Arg Gln Leu Asp Arg Gly Trp Arg Gly Ser Thr Asp
    690                 695                 700
Ile Thr Ile Gln Gly Gly Asp Asp Val Phe Lys Glu Asn Tyr Val Thr
705                 710                 715                 720
Leu Leu Gly Thr Phe Asp Glu Cys Tyr Pro Thr Tyr Leu Tyr Gln Lys
                725                 730                 735
Ile Asp Glu Ser Lys Leu Lys Ala Tyr Thr Arg Tyr Gln Leu Arg Gly
            740                 745                 750
Tyr Ile Glu Asp Ser Gln Asp Leu Glu Ile Tyr Leu Ile Arg Tyr Asn
        755                 760                 765
Ala Lys His Glu Thr Val Asn Val Pro Gly Thr Gly Ser Leu Trp Pro
770                 775                 780
Leu Ser Ala Gln Ser Pro Ile Gly Lys Cys Gly Glu Pro Asn Arg Cys
785                 790                 795                 800
Ala Pro His Leu Glu Trp Asn Pro Asp Leu Asp Cys Ser Cys Arg Asp
                805                 810                 815
Gly Glu Lys Cys Ala His His Ser His Phe Ser Leu Asp Ile Asp
            820                 825                 830
Val Gly Cys Thr Asp Leu Asn Glu Asp Leu Gly Val Trp Val Ile Phe
        835                 840                 845
Lys Ile Lys Thr Gln Asp Gly His Ala Arg Leu Gly Asn Leu Glu Phe
850                 855                 860
Leu Glu Glu Lys Pro Leu Val Gly Glu Ala Leu Ala Arg Val Lys Arg
865                 870                 875                 880
Ala Glu Lys Lys Trp Arg Asp Lys Arg Glu Lys Leu Glu Trp Glu Thr
                885                 890                 895
Asn Ile Val Tyr Lys Glu Ala Lys Glu Ser Val Asp Ala Leu Phe Val
            900                 905                 910
Asn Ser Gln Tyr Asp Gln Leu Gln Ala Asp Thr Asn Ile Ala Met Ile
        915                 920                 925
His Ala Ala Asp Lys Arg Val His Ser Ile Arg Glu Ala Tyr Leu Pro
930                 935                 940
Glu Leu Ser Val Ile Pro Gly Val Asn Ala Ala Ile Phe Glu Glu Leu
945                 950                 955                 960
Glu Gly Arg Ile Phe Thr Ala Phe Ser Leu Tyr Asp Ala Arg Asn Val
                965                 970                 975
Ile Lys Asn Gly Asp Phe Asn Asn Gly Leu Ser Cys Trp Asn Val Lys
            980                 985                 990
Gly His Val Asp Val Glu Glu Gln Asn Asn Gln Arg Ser Val Leu Val
        995                 1000                1005
Leu Pro Glu Trp Glu Ala Glu Val Ser Gln Glu Val Arg Val Cys
    1010                1015                1020
Pro Gly Arg Gly Tyr Ile Leu Arg Val Thr Ala Tyr Lys Glu Gly
    1025                1030                1035
Tyr Gly Glu Gly Cys Val Thr Ile His Glu Ile Glu Asn Asn Thr
    1040                1045                1050
Asp Glu Leu Lys Phe Ser Asn Cys Val Glu Glu Glu Ile Tyr Pro
    1055                1060                1065
Asn Asn Thr Val Thr Cys Asn Asp Tyr Thr Val Asn Gln Glu Glu
    1070                1075                1080
Tyr Gly Gly Ala Tyr Thr Ser Arg Asn Arg Gly Tyr Asn Glu Ala
    1085                1090                1095
```

```
Pro  Ser  Val  Pro  Ala  Asp  Tyr  Ala  Ser  Val  Tyr  Glu  Glu  Lys  Ser
    1100                1105                1110

Tyr  Thr  Asp  Gly  Arg  Arg  Glu  Asn  Pro  Cys  Glu  Phe  Asn  Arg  Gly
    1115                1120                1125

Tyr  Arg  Asp  Tyr  Thr  Pro  Leu  Pro  Val  Gly  Tyr  Val  Thr  Lys  Glu
    1130                1135                1140

Leu  Glu  Tyr  Phe  Pro  Glu  Thr  Asp  Lys  Val  Trp  Ile  Glu  Ile  Gly
    1145                1150                1155

Glu  Thr  Glu  Gly  Thr  Phe  Ile  Val  Asp  Ser  Val  Glu  Leu  Leu  Leu
    1160                1165                1170

Met  Glu  Glu
    1175

<210> SEQ ID NO 5
<211> LENGTH: 633
<212> TYPE: PRT
<213> ORGANISM: Bacillus thuringiensis

<400> SEQUENCE: 5

Met  Asn  Asn  Val  Leu  Asn  Ser  Gly  Arg  Thr  Thr  Ile  Cys  Asp  Ala  Tyr
1                 5                   10                  15

Asn  Val  Val  Ala  His  Asp  Pro  Phe  Ser  Phe  Glu  His  Lys  Ser  Leu  Asp
                20                  25                  30

Thr  Ile  Gln  Lys  Glu  Trp  Met  Glu  Trp  Lys  Arg  Thr  Asp  His  Ser  Leu
            35                  40                  45

Tyr  Val  Ala  Pro  Val  Val  Gly  Thr  Val  Ser  Ser  Phe  Leu  Leu  Lys  Lys
        50                  55                  60

Val  Gly  Ser  Leu  Ile  Gly  Lys  Arg  Ile  Leu  Ser  Glu  Leu  Trp  Gly  Ile
65                  70                  75                  80

Ile  Phe  Pro  Ser  Gly  Ser  Thr  Asn  Leu  Met  Gln  Asp  Ile  Leu  Arg  Glu
                85                  90                  95

Thr  Glu  Gln  Phe  Leu  Asn  Gln  Arg  Leu  Asn  Thr  Asp  Thr  Leu  Ala  Arg
            100                 105                 110

Val  Asn  Ala  Glu  Leu  Ile  Gly  Leu  Gln  Ala  Asn  Ile  Arg  Glu  Phe  Asn
        115                 120                 125

Gln  Gln  Val  Asp  Asn  Phe  Leu  Asn  Pro  Thr  Gln  Asn  Pro  Val  Pro  Leu
    130                 135                 140

Ser  Ile  Thr  Ser  Ser  Val  Asn  Thr  Met  Gln  Gln  Leu  Phe  Leu  Asn  Arg
145                 150                 155                 160

Leu  Pro  Gln  Phe  Gln  Ile  Gln  Gly  Tyr  Gln  Leu  Leu  Leu  Pro  Leu
                165                 170                 175

Phe  Ala  Gln  Ala  Ala  Asn  Met  His  Leu  Ser  Phe  Ile  Arg  Asp  Val  Ile
            180                 185                 190

Leu  Asn  Ala  Asp  Glu  Trp  Gly  Ile  Ser  Ala  Ala  Thr  Leu  Arg  Thr  Tyr
        195                 200                 205

Arg  Asp  Tyr  Leu  Arg  Asn  Tyr  Thr  Arg  Asp  Tyr  Ser  Asn  Tyr  Cys  Ile
    210                 215                 220

Asn  Thr  Tyr  Gln  Thr  Ala  Phe  Arg  Gly  Leu  Asn  Thr  Arg  Leu  His  Asp
225                 230                 235                 240

Met  Leu  Glu  Phe  Arg  Thr  Tyr  Met  Phe  Leu  Asn  Val  Phe  Glu  Tyr  Val
                245                 250                 255

Ser  Ile  Trp  Ser  Leu  Phe  Lys  Tyr  Gln  Ser  Leu  Met  Val  Ser  Ser  Gly
            260                 265                 270

Ala  Asn  Leu  Tyr  Ala  Ser  Gly  Ser  Gly  Pro  Gln  Gln  Thr  Gln  Ser  Phe
        275                 280                 285
```

Thr Ala Gln Asn Trp Pro Phe Leu Tyr Ser Leu Phe Gln Val Asn Ser
    290                 295                 300

Asn Tyr Ile Leu Ser Gly Ile Ser Gly Thr Arg Leu Ser Ile Thr Phe
305                 310                 315                 320

Pro Asn Ile Gly Gly Leu Pro Gly Ser Thr Thr His Ser Leu Asn
            325                 330                 335

Ser Ala Arg Val Asn Tyr Ser Gly Gly Val Ser Ser Gly Leu Ile Gly
            340                 345                 350

Ala Thr Asn Leu Asn His Asn Phe Asn Cys Ser Thr Val Leu Pro Pro
            355                 360                 365

Leu Ser Thr Pro Phe Val Arg Ser Trp Leu Asp Ser Gly Thr Asp Arg
    370                 375                 380

Glu Gly Val Ala Thr Ser Thr Asn Trp Gln Thr Glu Ser Phe Gln Thr
385                 390                 395                 400

Thr Leu Ser Leu Arg Cys Gly Ala Phe Ser Ala Arg Gly Asn Ser Asn
                405                 410                 415

Tyr Phe Pro Asp Tyr Phe Ile Arg Asn Ile Ser Gly Val Pro Leu Val
            420                 425                 430

Ile Arg Asn Glu Asp Leu Thr Arg Pro Leu His Tyr Asn Gln Ile Arg
            435                 440                 445

Asn Ile Glu Ser Pro Ser Gly Thr Pro Gly Gly Ala Arg Ala Tyr Leu
450                 455                 460

Val Ser Val His Asn Arg Lys Asn Asn Ile Tyr Ala Ala Asn Glu Asn
465                 470                 475                 480

Gly Thr Met Ile His Leu Ala Pro Glu Asp Tyr Thr Gly Phe Thr Ile
                485                 490                 495

Ser Pro Ile His Ala Thr Gln Val Asn Asn Gln Thr Arg Thr Phe Ile
            500                 505                 510

Ser Glu Lys Phe Gly Asn Gln Gly Asp Ser Leu Arg Phe Glu Gln Ser
            515                 520                 525

Asn Thr Thr Ala Arg Tyr Thr Leu Arg Gly Asn Gly Asn Ser Tyr Asn
530                 535                 540

Leu Tyr Leu Arg Val Ser Ser Ile Gly Asn Ser Thr Ile Arg Val Thr
545                 550                 555                 560

Ile Asn Gly Arg Val Tyr Thr Val Ser Asn Val Asn Thr Thr Thr Asn
                565                 570                 575

Asn Asp Gly Val Asn Asp Asn Gly Ala Arg Phe Ser Asp Ile Asn Ile
            580                 585                 590

Gly Asn Ile Val Ala Ser Asp Asn Thr Asn Val Thr Leu Asp Ile Asn
            595                 600                 605

Val Thr Leu Asn Ser Gly Thr Pro Phe Asp Leu Met Asn Ile Met Phe
    610                 615                 620

Val Pro Thr Asn Leu Pro Pro Leu Tyr
625                 630

<210> SEQ ID NO 6
<211> LENGTH: 1180
<212> TYPE: PRT
<213> ORGANISM: Bacillus thuringiensis

<400> SEQUENCE: 6

Met Asn Pro Tyr Gln Asn Lys Asn Glu Tyr Glu Thr Leu Asn Ala Ser
1               5                   10                  15

Gln Lys Lys Leu Asn Ile Ser Asn Asn Tyr Thr Arg Tyr Pro Ile Glu

```
                20                  25                  30
Asn Ser Pro Lys Gln Leu Leu Gln Ser Thr Asn Tyr Lys Asp Trp Leu
            35                  40                  45
Asn Met Cys Gln Gln Asn Gln Gln Tyr Gly Gly Asp Phe Glu Thr Phe
        50                  55                  60
Ile Asp Ser Gly Glu Leu Ser Ala Tyr Thr Ile Val Val Gly Thr Val
65                  70                  75                  80
Leu Thr Gly Phe Gly Phe Thr Thr Pro Leu Gly Leu Ala Leu Ile Gly
                85                  90                  95
Phe Gly Thr Leu Ile Pro Val Leu Phe Pro Ala Gln Asp Gln Ser Asn
            100                 105                 110
Thr Trp Ser Asp Phe Ile Thr Gln Thr Lys Asn Ile Ile Lys Lys Glu
        115                 120                 125
Ile Ala Ser Thr Tyr Ile Ser Asn Ala Asn Lys Ile Leu Asn Arg Ser
        130                 135                 140
Phe Asn Val Ile Ser Thr Tyr His Asn His Leu Lys Thr Trp Glu Asn
145                 150                 155                 160
Asn Pro Asn Pro Gln Asn Thr Gln Asp Val Arg Thr Gln Ile Gln Leu
            165                 170                 175
Val His Tyr His Phe Gln Asn Val Ile Pro Glu Leu Val Asn Ser Cys
            180                 185                 190
Pro Pro Asn Pro Ser Asp Cys Asp Tyr Asn Ile Leu Val Leu Ser
            195                 200                 205
Ser Tyr Ala Gln Ala Ala Asn Leu His Leu Thr Val Leu Asn Gln Ala
        210                 215                 220
Val Lys Phe Glu Ala Tyr Leu Lys Asn Asn Arg Gln Phe Asp Tyr Leu
225                 230                 235                 240
Glu Pro Leu Pro Thr Ala Ile Asp Tyr Tyr Pro Val Leu Thr Lys Ala
            245                 250                 255
Ile Glu Asp Tyr Thr Asn Tyr Cys Val Thr Thr Tyr Lys Lys Gly Leu
            260                 265                 270
Asn Leu Ile Lys Thr Thr Pro Asp Ser Asn Leu Asp Gly Asn Ile Asn
        275                 280                 285
Trp Asn Thr Tyr Asn Thr Tyr Arg Thr Lys Met Thr Thr Ala Val Leu
        290                 295                 300
Asp Val Val Ala Leu Phe Pro Asn Tyr Asp Val Gly Lys Tyr Pro Ile
305                 310                 315                 320
Gly Val Gln Ser Glu Leu Thr Arg Glu Ile Tyr Gln Val Leu Asn Phe
            325                 330                 335
Glu Glu Ser Pro Tyr Lys Tyr Tyr Asp Phe Gln Tyr Gln Glu Asp Ser
            340                 345                 350
Leu Thr Arg Arg Pro His Leu Phe Thr Trp Leu Asp Ser Leu Asn Phe
        355                 360                 365
Tyr Glu Lys Ala Gln Thr Thr Pro Asn Asn Phe Phe Thr Ser His Tyr
        370                 375                 380
Asn Met Phe His Tyr Thr Leu Asp Asn Ile Ser Gln Lys Ser Ser Val
385                 390                 395                 400
Phe Gly Asn His Asn Val Thr Asp Lys Leu Lys Ser Leu Gly Leu Ala
            405                 410                 415
Thr Asn Ile Tyr Ile Phe Leu Leu Asn Val Ile Ser Leu Asp Asn Lys
        420                 425                 430
Tyr Leu Asn Asp Tyr Asn Asn Ile Ser Lys Met Asp Phe Phe Ile Thr
        435                 440                 445
```

```
Asn Gly Thr Arg Leu Leu Glu Lys Glu Leu Thr Ala Gly Ser Gly Gln
    450                 455                 460
Ile Thr Tyr Asp Val Asn Lys Asn Ile Phe Gly Leu Pro Ile Leu Lys
465                 470                 475                 480
Arg Arg Glu Asn Gln Gly Asn Pro Thr Leu Phe Pro Thr Tyr Asp Asn
                485                 490                 495
Tyr Ser His Ile Leu Ser Phe Ile Lys Ser Leu Ser Ile Pro Ala Thr
                500                 505                 510
Tyr Lys Thr Gln Val Tyr Thr Phe Ala Trp Thr His Ser Ser Val Asp
            515                 520                 525
Pro Lys Asn Thr Ile Tyr Thr His Leu Thr Thr Gln Ile Pro Ala Val
    530                 535                 540
Lys Ala Asn Ser Leu Gly Thr Ala Ser Lys Val Val Gln Gly Pro Gly
545                 550                 555                 560
His Thr Gly Gly Asp Leu Ile Asp Phe Lys Asp His Phe Lys Ile Thr
                565                 570                 575
Cys Gln His Ser Asn Phe Gln Gln Ser Tyr Phe Ile Arg Ile Arg Tyr
                580                 585                 590
Ala Ser Asn Gly Ser Ala Asn Thr Arg Ala Val Ile Asn Leu Ser Ile
            595                 600                 605
Pro Gly Val Ala Glu Leu Gly Met Ala Leu Asn Pro Thr Phe Ser Gly
    610                 615                 620
Thr Asp Tyr Thr Asn Leu Lys Tyr Lys Asp Phe Gln Tyr Leu Glu Phe
625                 630                 635                 640
Ser Asn Glu Val Lys Phe Ala Pro Asn Gln Asn Ile Ser Leu Val Phe
                645                 650                 655
Asn Arg Ser Asp Val Tyr Thr Asn Thr Thr Val Leu Ile Asp Lys Ile
                660                 665                 670
Glu Phe Leu Pro Ile Thr Arg Ser Ile Arg Glu Asp Arg Glu Lys Gln
            675                 680                 685
Lys Leu Glu Thr Val Gln Gln Ile Ile Asn Thr Phe Tyr Ala Asn Pro
    690                 695                 700
Ile Lys Asn Thr Leu Gln Ser Glu Leu Thr Asp Tyr Asp Ile Asp Gln
705                 710                 715                 720
Ala Ala Asn Leu Val Glu Cys Ile Ser Glu Glu Leu Tyr Pro Lys Glu
                725                 730                 735
Lys Met Leu Leu Leu Asp Glu Val Lys Asn Ala Lys Gln Leu Ser Gln
            740                 745                 750
Ser Arg Asn Val Leu Gln Asn Gly Asp Phe Glu Ser Ala Thr Leu Gly
    755                 760                 765
Trp Thr Thr Ser Asp Asn Ile Thr Ile Gln Glu Asp Asp Pro Ile Phe
    770                 775                 780
Lys Gly His Tyr Leu His Met Ser Gly Ala Arg Asp Ile Asp Gly Thr
785                 790                 795                 800
Ile Phe Pro Thr Tyr Ile Phe Gln Lys Ile Asp Glu Ser Lys Leu Lys
                805                 810                 815
Pro Tyr Thr Arg Tyr Leu Val Arg Gly Phe Val Gly Ser Ser Lys Asp
            820                 825                 830
Val Glu Leu Val Val Ser Arg Tyr Gly Glu Glu Ile Asp Ala Ile Met
            835                 840                 845
Asn Val Pro Ala Asp Leu Asn Tyr Leu Tyr Pro Ser Thr Phe Asp Cys
    850                 855                 860
```

Glu Gly Ser Asn Arg Cys Glu Thr Ser Ala Val Pro Ala Asn Ile Gly
865 870 875 880

Asn Thr Ser Asp Met Leu Tyr Ser Cys Gln Tyr Asp Thr Gly Lys Lys
885 890 895

His Val Val Cys Gln Asp Ser His Gln Phe Ser Phe Thr Ile Asp Thr
900 905 910

Gly Ala Leu Asp Thr Asn Glu Asn Ile Gly Val Trp Val Met Phe Lys
915 920 925

Ile Ser Ser Pro Asp Gly Tyr Ala Ser Leu Asp Asn Leu Glu Val Ile
930 935 940

Glu Glu Gly Pro Ile Asp Gly Glu Ala Leu Ser Arg Val Lys His Met
945 950 955 960

Glu Lys Lys Trp Asn Asp Gln Met Glu Ala Lys Arg Ser Glu Thr Gln
965 970 975

Gln Ala Tyr Asp Val Ala Lys Gln Ala Ile Asp Ala Leu Phe Thr Asn
980 985 990

Val Gln Asp Glu Ala Leu Gln Phe Asp Thr Thr Leu Ala Gln Ile Gln
995 1000 1005

Tyr Ala Glu Tyr Leu Val Gln Ser Ile Pro Tyr Val Tyr Asn Asp
1010 1015 1020

Trp Leu Ser Asp Val Pro Gly Met Asn Tyr Asp Ile Tyr Val Glu
1025 1030 1035

Leu Asp Ala Arg Val Ala Gln Ala Arg Tyr Leu Tyr Asp Ile Arg
1040 1045 1050

Asn Ile Ile Lys Asn Gly Asp Phe Thr Gln Gly Val Met Gly Trp
1055 1060 1065

His Val Thr Gly Asn Ala Asp Val Gln Gln Ile Asp Gly Val Ser
1070 1075 1080

Val Leu Val Leu Ser Asn Trp Ser Ala Gly Val Ser Gln Asn Val
1085 1090 1095

His Leu Gln His Asn His Gly Tyr Val Leu Gly Val Ile Ala Lys
1100 1105 1110

Lys Glu Gly Pro Gly Asn Gly Tyr Val Thr Leu Met Asp Trp Glu
1115 1120 1125

Glu Asn Gln Glu Lys Leu Thr Phe Thr Ser Cys Glu Glu Gly Tyr
1130 1135 1140

Ile Thr Lys Thr Val Asp Val Phe Pro Asp Thr Asp Arg Val Arg
1145 1150 1155

Ile Glu Ile Gly Glu Thr Glu Gly Ser Phe Tyr Ile Glu Ser Ile
1160 1165 1170

Glu Leu Ile Cys Met Asn Glu
1175 1180

<210> SEQ ID NO 7
<211> LENGTH: 1245
<212> TYPE: PRT
<213> ORGANISM: Bacillus thuringiensis

<400> SEQUENCE: 7

Met Ala Thr Ile Asn Glu Leu Tyr Pro Val Pro Tyr Asn Val Leu Ala
1 5 10 15

His Pro Ile Lys Glu Val Asp Asp Pro Tyr Ser Trp Ser Asn Leu Leu
20 25 30

Lys Gly Ile Gln Glu Gly Trp Glu Glu Trp Gly Lys Thr Gly Gln Lys
35 40 45

-continued

```
Lys Leu Phe Glu Asp His Leu Thr Ile Ala Trp Asn Leu Tyr Lys Thr
 50                  55                  60

Gly Lys Leu Asp Tyr Phe Ala Leu Thr Lys Ala Ser Ile Ser Leu Ile
 65                  70                  75                  80

Gly Phe Ile Pro Gly Ala Glu Ala Ala Val Pro Phe Ile Asn Met Phe
                 85                  90                  95

Val Asp Phe Val Trp Pro Lys Leu Phe Gly Ala Asn Thr Glu Gly Lys
             100                 105                 110

Asp Gln Gln Leu Phe Asn Ala Ile Met Asp Ala Val Asn Lys Met Val
             115                 120                 125

Asp Asn Lys Phe Leu Ser Tyr Asn Leu Ser Thr Leu Asn Lys Thr Ile
 130                 135                 140

Glu Gly Leu Gln Gly Asn Leu Gly Leu Phe Gln Asn Ala Ile Gln Val
145                 150                 155                 160

Ala Ile Cys Gln Gly Ser Thr Pro Glu Arg Val Asn Phe Asp Gln Asn
                165                 170                 175

Cys Thr Pro Cys Asn Pro Asn Gln Pro Cys Lys Asp Asp Leu Asp Arg
             180                 185                 190

Val Ala Ser Arg Phe Asp Thr Ala Asn Ser Gln Phe Thr Gln His Leu
             195                 200                 205

Pro Glu Phe Lys Asn Pro Trp Ser Asp Glu Asn Ser Thr Gln Glu Phe
 210                 215                 220

Lys Arg Thr Ser Val Glu Leu Thr Leu Pro Met Tyr Thr Thr Val Ala
225                 230                 235                 240

Thr Leu His Leu Leu Leu Tyr Glu Gly Tyr Ile Glu Phe Met Thr Lys
                245                 250                 255

Trp Asn Phe His Asn Glu Gln Tyr Leu Asn Asn Leu Lys Val Glu Leu
             260                 265                 270

Gln Gln Leu Ile His Ser Tyr Ser Glu Thr Val Arg Thr Ser Phe Leu
             275                 280                 285

Gln Phe Leu Pro Thr Leu Asn Asn Arg Ser Lys Ser Ser Val Asn Ala
 290                 295                 300

Tyr Asn Arg Tyr Val Arg Asn Met Thr Val Asn Cys Leu Asp Ile Ala
305                 310                 315                 320

Ala Thr Trp Pro Thr Phe Asp Thr His Asn Tyr His Gln Gly Gly Lys
                325                 330                 335

Leu Asp Leu Thr Arg Ile Ile Leu Ser Asp Thr Ala Gly Pro Ile Glu
             340                 345                 350

Glu Tyr Thr Thr Gly Asp Lys Thr Ser Gly Pro Glu His Ser Asn Ile
             355                 360                 365

Thr Pro Asn Asn Ile Leu Asp Thr Pro Ser Pro Thr Tyr Gln His Ser
 370                 375                 380

Phe Val Ser Val Asp Ser Ile Val Tyr Ser Arg Lys Glu Leu Gln Gln
385                 390                 395                 400

Leu Asp Ile Ala Thr Tyr Ser Thr Asn Asn Ser Asn Cys His Pro
                405                 410                 415

Tyr Gly Leu Arg Leu Ser Tyr Thr Asp Gly Ser Arg Tyr Asp Tyr Gly
             420                 425                 430

Asp Asn Gln Pro Asp Phe Thr Thr Ser Asn Asn Tyr Cys His Asn
             435                 440                 445

Ser Tyr Thr Ala Pro Ile Thr Leu Val Asn Ala Arg His Leu Tyr Asn
 450                 455                 460
```

-continued

```
Ala Lys Gly Ser Leu Gln Asn Val Glu Ser Leu Val Ser Thr Val
465                 470                 475                 480

Asn Gly Gly Ser Gly Ser Cys Ile Cys Asp Ala Trp Ile Asn Tyr Leu
            485                 490                 495

Arg Pro Pro Gln Thr Ser Lys Asn Glu Ser Arg Pro Asp Gln Lys Ile
            500                 505                 510

Asn Val Leu Tyr Pro Ile Thr Glu Thr Val Asn Lys Gly Thr Gly Gly
            515                 520                 525

Asn Leu Gly Val Ile Ser Ala Tyr Val Pro Met Glu Leu Val Pro Glu
530                 535                 540

Asn Val Ile Gly Asp Val Asn Ala Asp Thr Lys Leu Pro Leu Thr Gln
545                 550                 555                 560

Leu Lys Gly Phe Pro Phe Glu Lys Tyr Gly Ser Glu Tyr Asn Asn Arg
            565                 570                 575

Gly Ile Ser Leu Val Arg Glu Trp Ile Asn Gly Asn Asn Ala Val Lys
            580                 585                 590

Leu Ser Asn Ser Gln Ser Val Gly Ile Gln Ile Thr Asn Gln Thr Lys
            595                 600                 605

Gln Lys Tyr Glu Ile Arg Cys Arg Tyr Ala Ser Lys Gly Asp Asn Asn
610                 615                 620

Val Tyr Phe Asn Val Asp Leu Ser Glu Asn Pro Phe Arg Asn Ser Ile
625                 630                 635                 640

Ser Phe Gly Ser Thr Glu Ser Ser Val Val Gly Val Gln Gly Glu Asn
            645                 650                 655

Gly Lys Tyr Ile Leu Lys Ser Ile Thr Thr Val Glu Ile Pro Ala Gly
            660                 665                 670

Ser Phe Tyr Val His Ile Thr Asn Gln Gly Ser Ser Asp Leu Phe Leu
            675                 680                 685

Asp Arg Ile Glu Phe Val Pro Lys Ile Gln Phe Gln Phe Cys Asp Asn
690                 695                 700

Asn Asn Leu His Cys Asp Cys Asn Asn Pro Val Asp Thr Asp Cys Thr
705                 710                 715                 720

Phe Cys Cys Val Cys Thr Ser Leu Thr Asp Cys Asp Cys Asn Asn Pro
            725                 730                 735

Arg Gly Leu Asp Cys Thr Leu Cys Cys Gln Val Glu Asn Gln Leu Pro
            740                 745                 750

Ser Phe Val Thr Leu Thr Asp Leu Gln Asn Ile Thr Thr Gln Val Asn
            755                 760                 765

Ala Leu Val Ala Ser Ser Glu His Asp Thr Leu Ala Thr Asp Val Ser
770                 775                 780

Asp Tyr Glu Ile Glu Glu Val Val Leu Lys Val Asp Ala Leu Ser Gly
785                 790                 795                 800

Glu Val Phe Gly Lys Glu Lys Lys Ala Leu Arg Lys Leu Val Asn His
            805                 810                 815

Thr Lys Arg Leu Ser Lys Ala Arg Asn Leu Leu Ile Gly Gly Asn Phe
            820                 825                 830

Asp Asn Leu Asp Ala Trp Tyr Arg Gly Arg Asn Val Val Asn Val Ser
            835                 840                 845

Asp His Glu Leu Phe Lys Ser Asp His Val Leu Leu Pro Pro Pro Thr
850                 855                 860

Leu Tyr Ser Ser Tyr Met Phe Gln Lys Val Glu Glu Ser Lys Leu Lys
865                 870                 875                 880

Ala Asn Thr Arg Tyr Thr Val Ser Gly Phe Ile Ala His Ala Glu Asp
```

```
                    885                 890                 895
Leu Glu Ile Val Val Ser Arg Tyr Gly Gln Glu Val Lys Lys Val Val
                900                 905                 910
Gln Val Pro Tyr Gly Glu Ala Phe Pro Leu Thr Ser Arg Gly Ala Ile
                915                 920                 925
Cys Cys Pro Pro Arg Ser Thr Ser Asn Gly Lys Pro Ala Asp Pro His
                930                 935                 940
Phe Phe Ser Tyr Ser Ile Asp Val Gly Thr Leu Asp Val Glu Ala Asn
945                 950                 955                 960
Pro Gly Ile Glu Leu Gly Leu Arg Ile Val Glu Arg Thr Gly Met Ala
                965                 970                 975
Arg Val Ser Asn Leu Glu Ile Arg Glu Asp Arg Pro Leu Lys Lys Asn
                980                 985                 990
Glu Leu Arg Asn Val Gln Arg Ala Ala Arg Asn Trp Arg Thr Ala Tyr
                995                 1000                1005
Asp Gln Glu Arg Ala Glu Val Thr Ala Leu Ile Gln Pro Val Leu
            1010                1015                1020
Asn Gln Ile Asn Ala Leu Tyr Glu Asn Glu Asp Trp Asn Gly Ala
            1025                1030                1035
Ile Arg Ser Gly Val Ser Tyr His Asp Leu Glu Ala Ile Val Leu
            1040                1045                1050
Pro Thr Leu Pro Lys Leu Asn His Trp Phe Met Ser Asp Met Leu
            1055                1060                1065
Gly Glu Gln Gly Ser Ile Leu Ala Gln Phe Gln Glu Ala Leu Asp
            1070                1075                1080
Arg Ala Tyr Thr Gln Leu Glu Glu Ser Thr Ile Leu His Asn Gly
            1085                1090                1095
His Phe Thr Thr Asp Ala Ala Asn Trp Thr Ile Glu Gly Asp Ala
            1100                1105                1110
His His Ala Ile Leu Glu Asp Gly Arg Arg Val Leu Arg Leu Pro
            1115                1120                1125
Asp Trp Ser Ser Ser Val Ser Gln Thr Ile Glu Ile Glu Asn Phe
            1130                1135                1140
Asp Pro Asp Lys Glu Tyr Gln Leu Val Phe His Ala Gln Gly Glu
            1145                1150                1155
Gly Thr Val Ser Leu Gln His Gly Glu Glu Gly Glu Tyr Val Glu
            1160                1165                1170
Thr His Pro His Lys Ser Ala Asn Phe Thr Thr Ser His Arg Gln
            1175                1180                1185
Gly Val Thr Phe Glu Thr Asn Lys Val Thr Val Glu Ile Thr Ser
            1190                1195                1200
Glu Asp Gly Glu Phe Leu Val Asp His Ile Ala Leu Val Glu Ala
            1205                1210                1215
Pro Leu Pro Thr Asp Asp Gln Ser Ser Asp Gly Asn Thr Thr Ser
            1220                1225                1230
Asn Thr Asn Ser Asn Thr Ser Met Asn Asn Gln
            1235                1240                1245

<210> SEQ ID NO 8
<211> LENGTH: 1144
<212> TYPE: PRT
<213> ORGANISM: Bacillus thuringiensis

<400> SEQUENCE: 8
```

```
Met Asp Lys Gln Asn Asp Ser Gly Ile Ile Lys Ala Thr Leu Asn Glu
1               5                   10                  15

Asp Phe Ser Asn Ser Ile Gln Arg Tyr Pro Leu Val Thr Asp Gln Thr
            20                  25                  30

Ile Asn Tyr Lys Asp Phe Leu Asn Met Asn Glu Glu Ile Ala Pro Tyr
                35                  40                  45

Ala Ser Ser Lys Asp Val Ile Phe Ser Ser Ile Ser Ile Ile Arg Thr
50                  55                  60

Phe Met Gly Phe Ala Gly His Gly Thr Ala Gly Ile Ile Gly Leu
65                  70                  75                  80

Phe Thr Glu Val Leu Arg Leu Leu Trp Pro Asn Lys Gln Asn Asp Leu
                85                  90                  95

Trp Glu Ser Phe Met Asn Glu Val Glu Ala Leu Ile Asn Gln Glu Ile
                100                 105                 110

Thr Glu Ala Val Val Ser Lys Ala Leu Ser Glu Leu Glu Gly Leu Arg
            115                 120                 125

Asn Ala Leu Glu Gly Tyr Thr Ser Ala Leu Glu Ala Trp Gln Asn Asn
130                 135                 140

Arg Ser Asp Lys Leu Lys Gln Leu Leu Val Tyr Glu Arg Phe Val Ser
145                 150                 155                 160

Thr Glu Asn Leu Phe Lys Phe Ala Met Pro Ser Phe Arg Ser Val Gly
                165                 170                 175

Phe Glu Gly Pro Leu Leu Thr Val Tyr Ala Gln Ala Ala Asn Leu His
            180                 185                 190

Leu Phe Leu Leu Lys Asn Ala Glu Leu Phe Gly Ala Glu Trp Gly Met
    195                 200                 205

Gln Gln Tyr Glu Ile Asp Leu Phe Tyr Asn Glu Gln Lys Gly Tyr Val
210                 215                 220

Glu Tyr Thr Asp His Cys Val Lys Trp Tyr Lys Glu Gly Leu Asn
225                 230                 235                 240

Lys Leu Lys Asn Ala Ser Gly Val Lys Gly Lys Val Trp Glu Asn Tyr
                245                 250                 255

Asn Arg Phe Arg Arg Glu Met Thr Ile Met Val Leu Asp Leu Leu Pro
            260                 265                 270

Leu Phe Pro Ile Tyr Asp Ala Arg Thr Tyr Pro Met Glu Thr Val Thr
    275                 280                 285

Glu Leu Thr Arg Gln Ile Phe Thr Asp Pro Ile Gly Leu Thr Gly Ile
    290                 295                 300

Asn Glu Thr Lys Tyr Pro Asp Trp Tyr Gly Ala Ala Ser Ser Glu Phe
305                 310                 315                 320

Val Leu Ile Glu Asn Arg Ala Ile Pro Lys Pro Gly Leu Phe Gln Trp
                325                 330                 335

Leu Thr Lys Ile Asn Val Arg Ala Arg Val Glu Pro Asn Asp Arg
                340                 345                 350

Phe Ala Ile Trp Thr Arg His Ser Val Val Thr Gln Cys Thr Lys Ser
        355                 360                 365

Thr Thr Glu Asn Thr Phe Asn Tyr Gly Thr Ser Ser Gly Ser Thr Leu
    370                 375                 380

Ser His Thr Phe Asp Leu Ser Lys Asp Ile Tyr Gln Thr Tyr Ser
385                 390                 395                 400

Ile Ala Ala Ala Asn Lys Ser Ala Thr Trp Tyr Gln Ala Val Pro Leu
                405                 410                 415

Leu Arg Leu Tyr Gly Ile Asn Ser Ser Asn Val Leu Ser Glu Asp Ala
```

```
                420             425             430
    Phe Ser Phe Ser Asn Asn Ile Pro Ser Ser Lys Cys Lys Ser Thr Tyr
                        435             440             445

Ser Ser Asp Gln Leu Pro Ile Glu Leu Leu Asp Glu Pro Ile Tyr Gly
    450                     455             460

Asp Leu Glu Glu Tyr Gly His Arg Leu Ser Tyr Val Ser Glu Ile Phe
    465                     470              475             480

Lys Glu Thr Gly Ser Gly Thr Ile Pro Val Leu Gly Trp Thr His Val
                        485             490             495

Ser Val Arg Pro Asp Asn Lys Leu Tyr Pro Asp Lys Ile Thr Gln Ile
                    500             505             510

Pro Ala Val Lys Ala Phe Glu Thr Asn Thr Ala Gly Val Glu Ile Ile
                    515             520             525

Asp Ser Ala Ser Thr Gly Gly Pro Ile Leu Lys Ile Val Asn Asn Asn
                    530             535             540

Leu Pro Ser Asn Gln Val Phe Arg Met Arg Leu Ser Phe Ser Glu Pro
    545                     550             555             560

Gln Lys Ile Lys Val Arg Val Arg Tyr Ala Ala Thr Gly Asp Gly Val
                        565             570             575

Met Ser Phe Ser Gly Ile Ala His Asp Glu Tyr Phe Thr Ala Thr Met
                        580             585             590

Lys Glu Gly Glu Ala Leu Lys Tyr Ser Tyr Leu Thr Met Gly Asn Asp
                    595             600             605

Tyr Ala Gly Thr Ala Ala Glu Leu Ser Met Leu Tyr Ile Ile Lys Ala
                    610             615             620

Asn Thr Ser Asn Cys Thr Ile Tyr Ile Asp Lys Ile Glu Phe Ile Pro
    625                     630             635             640

Val Asp Glu Asn Tyr Asn Asn Arg Val Gln Leu Glu Lys Ala Gln Lys
                        645             650             655

Ala Val Asn Thr Leu Phe Thr Ala Gly Arg Asn Ala Leu Gln Lys Asp
                        660             665             670

Val Thr Asp Phe Lys Val Asp Gln Val Ser Ile Leu Val Asp Cys Val
                    675             680             685

Ser Gly Glu Leu Tyr Pro Asn Glu Lys Arg Glu Leu Leu Ser Leu Val
                690             695             700

Lys Tyr Ala Lys Arg Leu Ser Tyr Ser Arg Asn Leu Leu Leu Asp Pro
    705                     710             715             720

Thr Phe Asp Ser Ile Asn Ser Ser Glu Glu Asn Gly Trp Asn Gly Ser
                        725             730             735

Asn Gly Ile Ala Ile Gly Ser Gly Asp Phe Val Phe Lys Gly Asn Tyr
                    740             745             750

Leu Ile Phe Ser Gly Thr Asn Asp Glu Gln Tyr Pro Thr Tyr Leu Tyr
                755             760             765

Gln Lys Ile Asp Glu Ser Lys Leu Lys Glu Tyr Thr Arg Tyr Lys Leu
                770             775             780

Arg Gly Phe Ile Glu Ser Ser Gln Asp Leu Glu Ala Tyr Val Ile Arg
    785                     790             795             800

Tyr Asp Ala Lys His Glu Thr Leu Asp Val Ser Asn Asn Leu Leu Pro
                        805             810             815

Asp Ile Pro Pro Val Asn Ala Cys Gly Glu Pro Asn Arg Cys Ala Ala
                    820             825             830

Leu Gln Tyr Leu Asp Glu Asn Pro Lys Leu Glu Cys Ser Ser Ile Gln
                835             840             845
```

-continued

Asp Gly Ile Leu Ser Asp Ser His Ser Phe Ser Leu His Ile Asp Thr
850                 855                 860

Gly Ser Ile Asp Phe Asn Glu Asn Val Gly Ile Trp Val Leu Phe Lys
865                 870                 875                 880

Ile Ser Thr Pro Glu Gly Tyr Ala Lys Phe Gly Asn Leu Glu Val Ile
                885                 890                 895

Glu Asp Gly Pro Val Ile Gly Glu Ala Leu Ala Arg Val Lys Arg Gln
            900                 905                 910

Glu Thr Lys Trp Arg Asn Lys Leu Thr Gln Leu Arg Thr Glu Thr Gln
        915                 920                 925

Ala Ile Tyr Thr Arg Ala Lys Gln Ala Leu Asp Asn Leu Phe Thr Asp
    930                 935                 940

Ala Gln Asp Ser His Leu Lys Ile Gly Ala Thr Phe Ala Ala Ile Val
945                 950                 955                 960

Ala Ala Arg Lys Ile Val Gln Ser Ile Arg Glu Ala Tyr Met Ser Trp
                965                 970                 975

Leu Ser Asp Val Pro Gly Leu Asn Tyr Pro Ile Phe Thr Glu Leu Asn
            980                 985                 990

Asp Arg Val Gln Arg Ala Phe Gln Leu Tyr Asp Val Gln Asn Val Val
        995                 1000                1005

Arg Asn Gly Arg Phe Leu Asn Gly Val Leu Asp Trp Ile Val Thr
    1010                1015                1020

Ser Asp Val Lys Val Gln Glu Gly Asn Gly Asn Val Leu Val
    1025                1030                1035

Leu Ser Gly Trp Asp Ala Gln Val Leu Gln Cys Leu Asn Leu Tyr
    1040                1045                1050

Gln Asn Arg Gly Tyr Ile Leu Arg Val Thr Ala Arg Lys Glu Gly
    1055                1060                1065

Leu Gly Glu Gly Tyr Ile Thr Ile Thr Asp Glu Gly Asn Thr
    1070                1075                1080

Asp Gln Leu Thr Phe Gly Ser Cys Glu Asn Ile Asp Ser Ser Asn
    1085                1090                1095

Ser Phe Val Ser Thr Gly Tyr Ile Thr Lys Glu Leu Glu Phe Phe
    1100                1105                1110

Pro Asp Thr Asp Gln Ile Gln Ile Glu Ile Gly Glu Thr Glu Gly
    1115                1120                1125

Thr Phe Gln Val Glu Ser Val Glu Leu Phe Leu Met Glu Asn Leu
    1130                1135                1140

Cys

<210> SEQ ID NO 9
<211> LENGTH: 1164
<212> TYPE: PRT
<213> ORGANISM: Bacillus thuringiensis

<400> SEQUENCE: 9

Met Ser Pro Asn Asn Gln Asn Glu Tyr Glu Ile Ile Asp Met Ala Pro
1               5                   10                  15

Ser Thr Ser Val Ser Asn Asp Ser Asn Arg Tyr Pro Phe Ala Ser Asp
            20                  25                  30

Pro Thr Asn Ala Leu Gln Asn Met Asn Tyr Lys Glu Tyr Leu Arg Met
        35                  40                  45

Ser Glu Gly Tyr Asp Ser Glu Tyr Ser Gly Ser Pro Glu Val Leu Ile
    50                  55                  60

-continued

```
Ser Glu Arg Asp Ala Val Lys Thr Ala Ile Ser Leu Val Gly Thr Ile
 65                  70                  75                  80

Leu Gly Lys Leu Gly Val Pro Leu Val Gly Pro Ile Val Ser Leu Tyr
                 85                  90                  95

Ser Thr Leu Ile Asp Val Leu Trp Pro Gly Gly Lys Ser Gln Trp Glu
            100                 105                 110

Ile Phe Met Glu Gln Val Glu Ala Leu Ile Asn Gln Lys Ile Ala Glu
        115                 120                 125

Tyr Ala Arg Ala Lys Ala Leu Ala Glu Leu Glu Gly Leu Gly Asn Asn
    130                 135                 140

Tyr Gln Leu Tyr Leu Thr Ala Leu Glu Glu Trp Gln Glu Asn Pro Ser
145                 150                 155                 160

Ser Thr Arg Val Leu Arg Asp Val Arg Asn Arg Phe Glu Ile Leu Asp
                165                 170                 175

Ser Leu Phe Thr Gln Tyr Met Pro Ser Phe Arg Val Thr Gly Tyr Glu
            180                 185                 190

Val Pro Leu Leu Ser Val Tyr Ala Gln Ala Ala Asn Leu His Leu Leu
        195                 200                 205

Leu Leu Lys Asp Ala Ser Ile Phe Gly Glu Trp Gly Phe Ser Thr
    210                 215                 220

Thr Ala Ile Asn Asn Tyr Tyr Asn Arg Gln Met Ser Leu Ile Ala Gln
225                 230                 235                 240

Tyr Ser Asp His Cys Val Gln Trp Tyr Arg Thr Gly Leu Asp Arg Leu
                245                 250                 255

Lys Gly Ser Asn Ala Lys Gln Trp Val Glu Tyr Asn Arg Phe Arg Arg
            260                 265                 270

Glu Met Thr Leu Ser Val Leu Asp Ile Met Thr Leu Phe Pro Met Tyr
        275                 280                 285

Asp Met Arg Thr Tyr Pro Met Glu Thr Lys Ala Gln Leu Thr Arg Glu
    290                 295                 300

Val Tyr Thr Asp Pro Ile Gly Ala Ile Gly Ala Gln Gly Ser Trp Tyr
305                 310                 315                 320

Asp Ser Ala Pro Ser Phe Asn Thr Leu Glu Ser Thr Phe Ile Arg Gly
                325                 330                 335

Lys His Leu Phe Asp Phe Ile Thr Arg Leu Ser Ile Tyr Thr Gly Arg
            340                 345                 350

Ser Ser Phe Ser Ala Ser Asn Tyr Leu Lys Lys Trp Ile Gly His Gln
        355                 360                 365

Ile Ser Ser Gln Pro Ile Gly Gly Ser Ile Gln Thr Gln Thr Tyr Gly
    370                 375                 380

Thr Thr Ser Gly Ser Ser Val Ile Ala Thr Gln Gln Ile Gly Phe Thr
385                 390                 395                 400

Gly Phe Asp Val Tyr Lys Thr Leu Ser Thr Ala Gly Val Leu Phe Ala
                405                 410                 415

Tyr Thr Ser Lys Tyr Tyr Gly Val Ser Lys Val Val Phe Asp Ala Ile
            420                 425                 430

Tyr Pro Asp Asn Lys Tyr Lys Thr Thr Phe Thr Tyr Asn Pro Gly Ser
        435                 440                 445

Glu Gly Ile Gly Ala Gln Glu Lys Asp Ser Glu Val Glu Leu Pro Pro
    450                 455                 460

Glu Thr Leu Asp Gln Pro Asn Tyr Glu Ala Tyr Ser His Arg Leu Asn
465                 470                 475                 480
```

```
Tyr Val Thr Phe Ile Arg Asn Pro Asp Val Pro Val Phe Ser Trp Thr
            485                 490                 495

His Arg Ser Ala Asp Arg Thr Asn Thr Val Tyr Ser Asp Lys Ile Thr
        500                 505                 510

Gln Ile Pro Val Val Lys Ala Ser Asp Gly Pro Lys Pro Ser Ala Asn
        515                 520                 525

Glu Val Gly His Tyr Leu Gly Gly Asp Pro Ile Ser Phe Asn Ser Ser
        530                 535                 540

Gly Ser Thr Gly Val Ile Arg Leu Asn Ile Asn Ser Pro Leu Ser Gln
545                 550                 555                 560

Lys Tyr Arg Val Arg Ile Arg Tyr Cys Ser Ser Val Asp Phe Asp Leu
                565                 570                 575

Asp Val Val Arg Gly Thr Thr Val Asn Asn Gly Arg Phe Asn Lys
        580                 585                 590

Ser Ala Pro Asn Val Gly Trp Gln Ser Leu Lys Tyr Glu Asn Phe Lys
        595                 600                 605

Phe Ala Ser Phe Ser Thr Pro Phe Thr Phe Asn Gln Ala Gln Asp Thr
    610                 615                 620

Leu Lys Ile Ser Val Arg Asn Phe Ser Ser Ile Val Gly Gly Ser Val
625                 630                 635                 640

Val Tyr Ile Asp Arg Ile Glu Leu Ile Pro Val Asn Ala Thr Tyr Glu
                645                 650                 655

Ala Glu Gln Asp Leu Asp Ser Ala Lys Lys Ala Val Asn Thr Leu Phe
                660                 665                 670

Thr Asn Thr Lys Asp Gly Leu Arg Pro Gly Val Thr Asp Tyr Glu Val
            675                 680                 685

Asn Gln Ala Ala Asn Leu Val Glu Cys Leu Ser Asp Asp Leu Tyr Pro
        690                 695                 700

Asn Glu Lys Arg Leu Leu Phe Asp Ala Val Lys Glu Ala Lys Arg Leu
705                 710                 715                 720

Ser Glu Ala Arg Asn Leu Leu Gln Asp Pro Asp Phe Gln Glu Ile Asn
                725                 730                 735

Gly Glu Asn Gly Trp Thr Ala Ser Thr Gly Ile Glu Val Val Glu Gly
            740                 745                 750

Asp Ala Leu Phe Lys Gly Arg Tyr Leu Arg Leu Pro Gly Ala Arg Glu
        755                 760                 765

Met Asp Thr Glu Thr Tyr Pro Thr Tyr Leu Tyr Gln Lys Val Glu Glu
        770                 775                 780

Gly Val Leu Lys Pro Tyr Thr Arg Tyr Arg Leu Arg Gly Phe Val Gly
785                 790                 795                 800

Ser Ser Gln Gly Leu Glu Ile Ser Thr Ile Arg His Gln Thr Asn Arg
                805                 810                 815

Ile Val Lys Asn Val Pro Asp Asp Leu Leu Pro Asp Val Pro Pro Val
            820                 825                 830

Asn Ser Asp Gly Arg Ile Asn Arg Cys Ser Glu Gln Lys Tyr Val Asn
        835                 840                 845

Ser Arg Leu Glu Gly Glu Arg Gly Leu Pro Asn Gly Asn Arg Ser Ala
850                 855                 860

Glu Ala His Glu Phe Ser Leu Pro Ile Asp Ile Gly Glu Leu Asp Tyr
865                 870                 875                 880

Asn Glu Asn Ala Gly Ile Trp Val Gly Phe Lys Ile Thr Asp Pro Glu
                885                 890                 895

Gly Tyr Ala Thr Leu Gly Asn Leu Glu Leu Val Glu Glu Gly Pro Leu
```

```
                    900             905             910
Ser Gly Asp Ala Leu Glu Arg Leu Gln Arg Glu Glu Gln Gln Trp Lys
            915             920             925

Leu Gln Met Thr Lys Arg Arg Glu Glu Thr Asp Arg Lys Tyr Thr Ala
    930             935             940

Ala Lys Gln Ala Val Asp Arg Leu Tyr Ala Asp Tyr Gln Asp Gln Gln
945             950             955             960

Leu Asn Pro Asn Val Glu Ile Thr Asp Ile Thr Ala Ala Gln Asn Leu
            965             970             975

Ile Gln Ser Ile Pro Tyr Val Tyr Asn Glu Met Phe Pro Glu Ile Gln
        980             985             990

Gly Met Asn Tyr Thr Lys Tyr Thr Glu Leu Thr Asn Arg Leu Gln Gln
        995             1000            1005

Ala Trp Gly Leu Tyr Asp Gln Arg Asn Ala Ile Pro Asn Gly Asp
    1010            1015            1020

Phe Arg Asn Glu Leu Ser Asn Trp Asn Thr Thr Ser Gly Val Asn
    1025            1030            1035

Val Gln Gln Ile Asn Asn Thr Ser Val Leu Val Met Pro Asn Trp
    1040            1045            1050

Asp Gly Gln Val Ser Gln Gln Phe Thr Val Gln Pro Asn Gln Arg
    1055            1060            1065

Tyr Val Leu Arg Val Thr Ala Arg Lys Glu Gly Val Gly Asn Gly
    1070            1075            1080

Tyr Val Ser Ile Arg Asp Gly Gly Asn Gln Thr Glu Thr Leu Thr
    1085            1090            1095

Phe Ser Ala Ser Asp Tyr Asn Thr Asp Ser Val Tyr Asn Thr Gln
    1100            1105            1110

Val Ser Asn Thr Asn Gly Leu Tyr Asn Glu Gln Thr Gly Tyr Thr
    1115            1120            1125

Thr Lys Thr Val Thr Phe Ile Pro Tyr Thr Asp Gln Val Trp Ile
    1130            1135            1140

Glu Met Ser Glu Thr Glu Gly Met Phe Tyr Ile Glu Ser Val Glu
    1145            1150            1155

Leu Ile Val Asp Val Glu
    1160

<210> SEQ ID NO 10
<211> LENGTH: 675
<212> TYPE: PRT
<213> ORGANISM: Bacillus thuringiensis

<400> SEQUENCE: 10

Met Asn Pro Tyr Gln Asn Lys Asn Glu Tyr Glu Ile Phe Asn Ala Pro
1               5                   10                  15

Ser Asn Gly Phe Ser Lys Ser Asn Asn Tyr Ser Arg Tyr Pro Leu Ala
            20                  25                  30

Asn Lys Pro Asn Gln Pro Leu Lys Asn Thr Asn Tyr Lys Asp Trp Leu
        35                  40                  45

Asn Val Cys Gln Asp Asn Gln Gln Tyr Gly Asn Ala Gly Asn Phe
    50                  55                  60

Ala Ser Ser Glu Thr Ile Val Gly Val Ser Ala Gly Ile Ile Val Val
65                  70                  75                  80

Gly Thr Met Leu Gly Ala Phe Ala Ala Pro Val Leu Ala Ala Gly Ile
                85                  90                  95
```

-continued

```
Ile Ser Phe Gly Thr Leu Leu Pro Ile Phe Trp Gln Gly Ser Asp Pro
            100                 105                 110

Ala Asn Val Trp Gln Asp Leu Leu Asn Ile Gly Gly Arg Pro Ile Gln
            115                 120                 125

Glu Ile Asp Lys Asn Ile Ile Asn Val Leu Thr Ser Ile Val Thr Pro
130                 135                 140

Ile Lys Asn Gln Leu Asp Lys Tyr Gln Glu Phe Phe Asp Lys Trp Glu
145                 150                 155                 160

Pro Ala Arg Thr His Ala Asn Ala Lys Ala Val His Asp Leu Phe Thr
            165                 170                 175

Thr Leu Glu Pro Ile Ile Asp Lys Asp Leu Asp Met Leu Lys Asn Asn
            180                 185                 190

Ala Ser Tyr Arg Ile Pro Thr Leu Pro Ala Tyr Ala Gln Ile Ala Thr
            195                 200                 205

Trp His Leu Asn Leu Leu Lys His Ala Ala Thr Tyr Tyr Asn Ile Trp
            210                 215                 220

Leu Gln Asn Gln Gly Ile Asn Pro Ser Thr Phe Asn Ser Ser Asn Tyr
225                 230                 235                 240

Tyr Gln Gly Tyr Leu Lys Arg Lys Ile Gln Glu Tyr Thr Asp Tyr Cys
            245                 250                 255

Ile Gln Thr Tyr Asn Ala Gly Leu Thr Met Ile Arg Thr Asn Thr Asn
            260                 265                 270

Ala Thr Trp Asn Met Tyr Asn Thr Tyr Arg Leu Glu Met Thr Leu Thr
            275                 280                 285

Val Leu Asp Leu Ile Ala Ile Phe Pro Asn Tyr Asp Pro Glu Lys Tyr
290                 295                 300

Pro Ile Gly Val Lys Ser Glu Leu Ile Arg Glu Val Tyr Thr Asn Val
305                 310                 315                 320

Asn Ser Asp Thr Phe Arg Thr Ile Thr Glu Leu Glu Asn Gly Leu Thr
            325                 330                 335

Arg Asn Pro Thr Leu Phe Thr Trp Ile Asn Gln Gly Arg Phe Tyr Thr
            340                 345                 350

Arg Asn Ser Arg Asp Ile Leu Asp Pro Tyr Asp Ile Phe Ser Phe Thr
            355                 360                 365

Gly Asn Gln Met Ala Phe Thr His Thr Asn Asp Asp Arg Asn Ile Ile
            370                 375                 380

Trp Gly Ala Val His Gly Asn Ile Ile Ser Gln Asp Thr Ser Lys Val
385                 390                 395                 400

Phe Pro Phe Tyr Arg Asn Lys Pro Ile Asp Lys Val Glu Ile Val Arg
            405                 410                 415

His Arg Glu Tyr Ser Asp Ile Ile Tyr Glu Met Ile Phe Phe Ser Asn
            420                 425                 430

Ser Ser Glu Val Phe Arg Tyr Ser Asn Ser Thr Ile Glu Asn Asn
            435                 440                 445

Tyr Lys Arg Thr Asp Ser Tyr Met Ile Pro Lys Gln Thr Trp Lys Asn
450                 455                 460

Glu Glu Tyr Gly His Thr Leu Ser Tyr Ile Lys Thr Asp Asn Tyr Ile
465                 470                 475                 480

Phe Ser Val Val Arg Glu Arg Arg Val Ala Phe Ser Trp Thr His
            485                 490                 495

Thr Ser Val Asp Phe Gln Asn Thr Ile Asp Leu Asp Asn Ile Thr Gln
            500                 505                 510

Ile His Ala Leu Lys Ala Leu Lys Val Ser Ser Asp Ser Lys Ile Val
```

```
                515                 520                 525
Lys Gly Pro Gly His Thr Gly Gly Asp Leu Val Ile Leu Lys Asp Ser
530                 535                 540

Met Asp Phe Arg Val Arg Phe Leu Lys Asn Val Ser Arg Gln Tyr Gln
545                 550                 555                 560

Val Arg Ile Arg Tyr Ala Thr Asn Ala Pro Lys Thr Thr Val Phe Leu
                565                 570                 575

Thr Gly Ile Asp Thr Ile Ser Val Glu Leu Pro Ser Thr Thr Ser Arg
                580                 585                 590

Gln Asn Pro Asn Ala Thr Asp Leu Thr Tyr Ala Asp Phe Gly Tyr Val
                595                 600                 605

Thr Phe Pro Arg Thr Val Pro Asn Lys Thr Phe Glu Gly Glu Asp Thr
                610                 615                 620

Leu Leu Met Thr Leu Tyr Gly Thr Pro Asn His Ser Tyr Asn Ile Tyr
625                 630                 635                 640

Ile Asp Lys Ile Glu Phe Ile Pro Ile Thr Gln Ser Val Leu Asp Tyr
                645                 650                 655

Thr Glu Lys Gln Asn Ile Glu Lys Thr Gln Lys Ile Val Asn Asp Leu
                660                 665                 670

Phe Val Asn
675

<210> SEQ ID NO 11
<211> LENGTH: 643
<212> TYPE: PRT
<213> ORGANISM: Bacillus thuringiensis

<400> SEQUENCE: 11

Met Glu Asp Ser Ser Leu Asp Thr Leu Ser Ile Val Asn Glu Thr Asp
1               5                   10                  15

Phe Pro Leu Tyr Asn Asn Tyr Thr Glu Pro Thr Ile Ala Pro Ala Leu
                20                  25                  30

Ile Ala Val Ala Pro Ile Ala Gln Tyr Leu Ala Thr Ala Ile Gly Lys
                35                  40                  45

Trp Ala Ala Lys Ala Ala Phe Ser Lys Val Leu Ser Leu Ile Phe Pro
50                  55                  60

Gly Ser Gln Pro Ala Thr Met Glu Lys Val Arg Thr Glu Val Glu Thr
65                  70                  75                  80

Leu Ile Asn Gln Lys Leu Ser Gln Asp Arg Val Asn Ile Leu Asn Ala
                85                  90                  95

Glu Tyr Arg Gly Ile Ile Glu Val Ser Asp Val Phe Asp Ala Tyr Ile
                100                 105                 110

Lys Gln Pro Gly Phe Thr Pro Thr Ala Lys Gly Tyr Phe Leu Asn
                115                 120                 125

Leu Ser Gly Ala Ile Ile Gln Arg Leu Pro Gln Phe Glu Val Gln Thr
130                 135                 140

Tyr Glu Gly Val Ser Ile Ala Leu Phe Thr Gln Met Cys Thr Leu His
145                 150                 155                 160

Leu Thr Leu Leu Lys Asp Gly Ile Leu Ala Gly Ser Ala Trp Gly Phe
                165                 170                 175

Thr Gln Ala Asp Val Asp Ser Phe Ile Lys Leu Phe Asn Gln Lys Val
                180                 185                 190

Leu Asp Tyr Arg Thr Arg Leu Met Arg Met Tyr Thr Glu Glu Phe Gly
                195                 200                 205
```

```
Arg Leu Cys Lys Val Ser Leu Lys Asp Gly Leu Thr Phe Arg Asn Met
    210                 215                 220
Cys Asn Leu Tyr Val Phe Pro Phe Ala Glu Ala Trp Ser Leu Met Arg
225                 230                 235                 240
Tyr Glu Gly Leu Lys Leu Gln Ser Ser Leu Ser Leu Trp Asp Tyr Val
                245                 250                 255
Gly Val Ser Ile Pro Val Asn Tyr Asn Glu Trp Gly Gly Leu Val Tyr
                260                 265                 270
Lys Leu Leu Met Gly Glu Val Asn Gln Arg Leu Thr Thr Val Lys Phe
            275                 280                 285
Asn Tyr Ser Phe Thr Asn Glu Pro Ala Asp Ile Pro Ala Arg Glu Asn
    290                 295                 300
Ile Arg Gly Val His Pro Ile Tyr Asp Pro Ser Ser Gly Leu Thr Gly
305                 310                 315                 320
Trp Ile Gly Asn Gly Arg Thr Asn Asn Phe Asn Phe Ala Asp Asn Asn
                325                 330                 335
Gly Asn Glu Ile Met Glu Val Arg Thr Gln Thr Phe Tyr Gln Asn Pro
                340                 345                 350
Asn Asn Glu Pro Ile Ala Pro Arg Asp Ile Ile Asn Gln Ile Leu Thr
            355                 360                 365
Ala Pro Ala Pro Ala Asp Leu Phe Phe Lys Asn Ala Asp Ile Asn Val
    370                 375                 380
Lys Phe Thr Gln Trp Phe Gln Ser Thr Leu Tyr Gly Trp Asn Ile Lys
385                 390                 395                 400
Leu Gly Thr Gln Thr Val Leu Ser Ser Arg Thr Gly Thr Ile Pro Pro
                405                 410                 415
Asn Tyr Leu Ala Tyr Asp Gly Tyr Tyr Ile Arg Ala Ile Ser Ala Cys
            420                 425                 430
Pro Arg Gly Val Ser Leu Ala Tyr Asn His Asp Leu Thr Thr Leu Thr
    435                 440                 445
Tyr Asn Arg Ile Glu Tyr Asp Ser Pro Thr Thr Glu Asn Ile Ile Val
    450                 455                 460
Gly Phe Ala Pro Asp Asn Thr Lys Asp Phe Tyr Ser Lys Lys Ser His
465                 470                 475                 480
Tyr Leu Ser Glu Thr Asn Asp Ser Tyr Val Ile Pro Ala Leu Gln Phe
                485                 490                 495
Ala Glu Val Ser Asp Arg Ser Phe Leu Glu Asp Thr Pro Asp Gln Ala
            500                 505                 510
Thr Asp Gly Ser Ile Lys Phe Ala Arg Thr Phe Ile Ser Asn Glu Ala
            515                 520                 525
Lys Tyr Ser Ile Arg Leu Asn Thr Gly Phe Asn Thr Ala Thr Arg Tyr
    530                 535                 540
Lys Leu Ile Ile Arg Val Arg Val Pro Tyr Arg Leu Pro Ala Gly Ile
545                 550                 555                 560
Arg Val Gln Ser Gln Asn Ser Gly Asn Asn Arg Met Leu Gly Ser Phe
                565                 570                 575
Thr Ala Asn Ala Asn Pro Glu Trp Val Asp Phe Val Thr Asp Ala Phe
            580                 585                 590
Thr Phe Asn Asp Leu Gly Ile Thr Thr Ser Thr Asn Ala Leu Phe
            595                 600                 605
Ser Ile Ser Ser Asp Ser Leu Asn Ser Gly Glu Glu Trp Tyr Leu Ser
    610                 615                 620
Gln Leu Phe Leu Val Lys Glu Ser Ala Phe Thr Thr Gln Ile Asn Pro
```

Leu Leu Lys

<210> SEQ ID NO 12
<211> LENGTH: 205
<212> TYPE: PRT
<213> ORGANISM: Bacillus thuringiensis

<400> S

Lys Leu Glu Phe Lys Gly Glu Lys Val Tyr Arg Ala Val Ala Asn Thr
                100                 105                 110

Asn Leu Ala Val Trp Pro Ser Ala Val Tyr Ser Gly Val Thr Lys Val
            115                 120                 125

Lys Phe Ser Gln Tyr Asn Asp Lys Thr Lys Lys Ala Ser Lys Gln Thr
    130                 135                 140

Tyr Asp Ser Lys Arg Asn Val Gly Ala Val Ser Trp Asp Ser Ile Asp
145                 150                 155                 160

Gln Leu Pro Pro Glu Thr Lys Lys Pro Leu Lys Lys Gly Tyr Ser
                165                 170                 175

His Gln Leu Asn Tyr Val Met Cys Phe Leu Met Gln Gly Ser Arg Gly
            180                 185                 190

Thr Ile Pro Val Leu Thr Trp Thr His Lys Ser Val Asp
        195                 200                 205

<210> SEQ ID NO 14
<211> LENGTH: 83
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 14

Val Gln Lys Leu Glu Phe Lys Gly Glu Lys Val Tyr Arg Ala Val Ala
1               5                   10                  15

Asn Thr Asn Leu Ala Val Trp Pro Ser Ala Val Tyr Ser Gly Val Thr
            20                  25                  30

Lys Val Lys Phe Ser Gln Tyr Asn Asp Lys Thr Lys Lys Ala Ser Lys
        35                  40                  45

Gln Thr Tyr Asp Ser Lys Arg Asn Val Gly Ala Val Ser Trp Asp Ser
    50                  55                  60

Ile Asp Gln Leu Pro Pro Glu Thr Lys Lys Lys Pro Leu Lys Lys Gly
65                  70                  75                  80

Tyr Ser His

<210> SEQ ID NO 15
<211> LENGTH: 584
<212> TYPE: PRT
<213> ORGANISM: Bacillus thuringiensis

<400> SEQUENCE: 15

Thr Thr Lys Asp Val Ile Gln Lys Gly Ile Ser Val Val Gly Asp Leu
1               5                   10                  15

Leu Gly Val Val Gly Phe Pro Phe Gly Gly Ala Leu Val Ser Phe Tyr
            20                  25                  30

Thr Asn Phe Leu Asn Thr Ile Trp Pro Ser Glu Asp Pro Trp Lys Ala
        35                  40                  45

Phe Met Glu Gln Val Glu Ala Leu Met Asp Gln Lys Ile Ala Asp Tyr
    50                  55                  60

Ala Lys Asn Lys Ala Leu Ala Glu Leu Gln Gly Leu Gln Asn Asn Val
65                  70                  75                  80

Glu Asp Tyr Val Ser Ala Leu Ser Ser Trp Gln Lys Asn Pro Val Ser
            85                  90                  95

Ser Arg Asn Pro His Ser Gln Gly Arg Ile Arg Glu Leu Phe Ser Gln
            100                 105                 110

-continued

```
Ala Glu Ser His Phe Arg Asn Ser Met Pro Ser Phe Ala Ile Ser Gly
            115                 120                 125

Tyr Glu Val Leu Phe Leu Thr Thr Tyr Ala Gln Ala Ala Asn Thr His
130                 135                 140

Leu Phe Leu Leu Lys Asp Ala Gln Ile Tyr Gly Glu Glu Trp Gly Tyr
145                 150                 155                 160

Glu Lys Glu Asp Ile Ala Glu Phe Tyr Lys Arg Gln Leu Lys Leu Thr
                165                 170                 175

Gln Glu Tyr Thr Asp His Cys Val Lys Trp Tyr Asn Val Gly Leu Asp
            180                 185                 190

Lys Leu Arg Gly Ser Ser Tyr Glu Ser Trp Val Asn Phe Asn Arg Tyr
        195                 200                 205

Arg Arg Glu Met Thr Leu Thr Val Leu Asp Leu Ile Ala Leu Phe Pro
210                 215                 220

Leu Tyr Asp Val Arg Leu Tyr Pro Lys Glu Val Lys Thr Glu Leu Thr
225                 230                 235                 240

Arg Asp Val Leu Thr Asp Pro Ile Val Gly Val Asn Asn Leu Arg Gly
                245                 250                 255

Tyr Gly Thr Thr Phe Ser Asn Ile Glu Asn Tyr Ile Arg Lys Pro His
            260                 265                 270

Leu Phe Asp Tyr Leu His Arg Ile Gln Phe His Thr Arg Phe Gln Pro
        275                 280                 285

Gly Tyr Tyr Gly Asn Asp Ser Phe Asn Tyr Trp Ser Gly Asn Tyr Val
290                 295                 300

Ser Thr Arg Pro Ser Ile Gly Ser Asn Asp Ile Ile Thr Ser Pro Phe
305                 310                 315                 320

Tyr Gly Asn Lys Ser Ser Glu Pro Val Gln Asn Leu Glu Phe Asn Gly
                325                 330                 335

Glu Lys Val Tyr Arg Ala Val Ala Asn Thr Asn Leu Ala Val Trp Pro
            340                 345                 350

Ser Ala Val Tyr Ser Gly Val Thr Lys Val Glu Phe Ser Gln Tyr Asn
        355                 360                 365

Asp Gln Thr Asp Glu Ala Ser Thr Gln Thr Tyr Asp Ser Lys Arg Asn
370                 375                 380

Val Gly Ala Val Ser Trp Asp Ser Ile Asp Gln Leu Pro Pro Glu Thr
385                 390                 395                 400

Thr Asp Glu Pro Leu Glu Lys Gly Tyr Ser His Gln Leu Asn Tyr Val
                405                 410                 415

Met Cys Phe Leu Met Gln Gly Ser Arg Gly Thr Ile Pro Val Leu Thr
            420                 425                 430

Trp Thr His Lys Ser Val Asp Phe Phe Asn Met Ile Asp Ser Lys Lys
        435                 440                 445

Ile Thr Gln Leu Pro Leu Val Lys Ala Tyr Lys Leu Gln Ser Gly Ala
450                 455                 460

Ser Val Val Ala Gly Pro Arg Phe Thr Gly Gly Asp Ile Ile Gln Cys
465                 470                 475                 480

Thr Glu Asn Gly Ser Ala Ala Thr Ile Tyr Val Thr Pro Asp Val Ser
                485                 490                 495

Tyr Ser Gln Lys Tyr Arg Ala Arg Ile His Tyr Ala Ser Thr Ser Gln
            500                 505                 510

Ile Thr Phe Thr Leu Ser Leu Asp Gly Ala Pro Phe Asn Gln Tyr Tyr
        515                 520                 525

Phe Asp Lys Thr Ile Asn Lys Gly Asp Thr Leu Thr Tyr Asn Ser Phe
```

```
                530                 535                 540
Asn Leu Ala Ser Phe Ser Thr Pro Phe Glu Leu Ser Gly Asn Asn Leu
545                 550                 555                 560

Gln Ile Gly Val Thr Gly Leu Ser Ala Gly Asp Lys Val Tyr Ile Asp
                565                 570                 575

Lys Ile Glu Phe Ile Pro Val Asn
            580

<210> SEQ ID NO 16
<211> LENGTH: 577
<212> TYPE: PRT
<213> ORGANISM: Bacillus thuringiensis

<400> SEQUENCE: 16

Tyr Thr Pro Ile Asp Ile Ser Leu Ser Leu Thr Gln Phe Leu Leu Ser
1               5                   10                  15

Glu Phe Val Pro Gly Ala Gly Phe Val Leu Gly Leu Val Asp Ile Ile
                20                  25                  30

Trp Gly Ile Phe Gly Pro Ser Gln Trp Asp Ala Phe Leu Val Gln Ile
            35                  40                  45

Glu Gln Leu Ile Asn Gln Arg Ile Glu Glu Phe Ala Arg Asn Gln Ala
    50                  55                  60

Ile Ser Arg Leu Glu Gly Leu Ser Asn Leu Tyr Gln Ile Tyr Ala Glu
65                  70                  75                  80

Ser Phe Arg Glu Trp Glu Ala Asp Pro Thr Asn Pro Ala Leu Arg Glu
                85                  90                  95

Glu Met Arg Ile Gln Phe Asn Asp Met Asn Ser Ala Leu Thr Thr Ala
            100                 105                 110

Ile Pro Leu Leu Ala Val Gln Asn Tyr Gln Val Pro Leu Leu Ser Val
        115                 120                 125

Tyr Val Gln Ala Ala Asn Leu His Leu Ser Val Leu Arg Asp Val Ser
130                 135                 140

Val Phe Gly Gln Arg Trp Gly Phe Asp Ala Ala Thr Ile Asn Ser Arg
145                 150                 155                 160

Tyr Asn Asp Leu Thr Arg Leu Ile Gly Asn Tyr Thr Asp Tyr Ala Val
                165                 170                 175

Arg Trp Tyr Asn Thr Gly Leu Glu Arg Val Trp Gly Pro Asp Ser Arg
            180                 185                 190

Asp Trp Val Arg Tyr Asn Gln Phe Arg Arg Glu Leu Thr Leu Thr Val
        195                 200                 205

Leu Asp Ile Val Ala Leu Phe Ser Asn Tyr Asp Ser Arg Arg Tyr Pro
210                 215                 220

Ile Arg Thr Val Ser Gln Leu Thr Arg Glu Ile Tyr Thr Asn Pro Val
225                 230                 235                 240

Leu Glu Asn Phe Asp Gly Ser Phe Arg Gly Met Ala Gln Arg Ile Glu
                245                 250                 255

Gln Asn Ile Arg Gln Pro His Leu Met Asp Ile Leu Asn Ser Ile Thr
            260                 265                 270

Ile Tyr Thr Asp Val His Arg Gly Phe Asn Tyr Trp Ser Gly His Gln
        275                 280                 285

Ile Thr Ala Ser Pro Val Gly Phe Ser Gly Pro Glu Phe Ala Phe Pro
290                 295                 300

Leu Phe Gly Asn Ala Gly Asn Ala Ala Pro Pro Val Leu Val Ser Leu
305                 310                 315                 320
```

Thr Gly Leu Gly Ile Phe Arg Thr Leu Ser Ser Pro Leu Tyr Arg Arg
            325                 330                 335

Ile Ile Leu Gly Ser Gly Pro Asn Asn Gln Glu Leu Phe Val Leu Asp
            340                 345                 350

Gly Thr Glu Phe Ser Phe Ala Ser Leu Thr Thr Asn Leu Pro Ser Thr
            355                 360                 365

Ile Tyr Arg Gln Arg Gly Thr Val Asp Ser Leu Asp Val Ile Pro Pro
370                 375                 380

Gln Asp Asn Ser Val Pro Pro Arg Ala Gly Phe Ser His Arg Leu Ser
385                 390                 395                 400

His Val Thr Met Leu Ser Gln Ala Ala Gly Ala Val Tyr Thr Leu Arg
            405                 410                 415

Ala Pro Thr Phe Ser Trp Gln His Arg Ser Ala Glu Phe Asn Asn Ile
            420                 425                 430

Ile Pro Ser Ser Gln Ile Thr Gln Ile Pro Leu Thr Lys Ser Thr Asn
            435                 440                 445

Leu Gly Ser Gly Thr Ser Val Val Lys Gly Pro Gly Phe Thr Gly Gly
            450                 455                 460

Asp Ile Leu Arg Arg Thr Ser Pro Gly Gln Ile Ser Thr Leu Arg Val
465                 470                 475                 480

Asn Ile Thr Ala Pro Leu Ser Gln Arg Tyr Arg Val Arg Ile Arg Tyr
            485                 490                 495

Ala Ser Thr Thr Asn Leu Gln Phe His Thr Ser Ile Asp Gly Arg Pro
            500                 505                 510

Ile Asn Gln Gly Asn Phe Ser Ala Thr Met Ser Ser Gly Ser Asn Leu
            515                 520                 525

Gln Ser Gly Ser Phe Arg Thr Val Gly Phe Thr Thr Pro Phe Asn Phe
530                 535                 540

Ser Asn Gly Ser Ser Val Phe Thr Leu Ser Ala His Val Phe Asn Ser
545                 550                 555                 560

Gly Asn Glu Val Tyr Ile Asp Arg Ile Glu Phe Val Pro Ala Glu Val
            565                 570                 575

Thr

<210> SEQ ID NO 17
<211> LENGTH: 598
<212> TYPE: PRT
<213> ORGANISM: Bacillus thuringiensis

<400> SEQUENCE: 17

Gly Glu Leu Ser Ala Tyr Thr Ile Val Val Gly Thr Val Leu Thr Gly
1               5                   10                  15

Phe Gly Phe Thr Thr Pro Leu Gly Leu Ala Leu Ile Gly Phe Gly Thr
            20                  25                  30

Leu Ile Pro Val Leu Phe Pro Ala Gln Asp Gln Ser Asn Thr Trp Ser
            35                  40                  45

Asp Phe Ile Thr Gln Thr Lys Asn Ile Ile Lys Lys Glu Ile Ala Ser
            50                  55                  60

Thr Tyr Ile Ser Asn Ala Asn Lys Ile Leu Asn Arg Ser Phe Asn Val
65                  70                  75                  80

Ile Ser Thr Tyr His Asn His Leu Lys Thr Trp Glu Asn Asn Pro Asn
            85                  90                  95

Pro Gln Asn Thr Gln Asp Val Arg Thr Gln Ile Gln Leu Val His Tyr
            100                 105                 110

-continued

His Phe Gln Asn Val Ile Pro Glu Leu Val Asn Ser Cys Pro Pro Asn
         115                 120                 125

Pro Ser Asp Cys Asp Tyr Tyr Asn Ile Leu Val Leu Ser Ser Tyr Ala
130                 135                 140

Gln Ala Ala Asn Leu His Leu Thr Val Leu Asn Gln Ala Val Lys Phe
145                 150                 155                 160

Glu Ala Tyr Leu Lys Asn Asn Thr Ala Ile Asp Tyr Tyr Pro Val Leu
                165                 170                 175

Thr Lys Ala Ile Glu Asp Tyr Thr Asn Tyr Cys Val Thr Thr Tyr Lys
            180                 185                 190

Lys Gly Leu Asn Leu Ile Lys Thr Thr Pro Asp Ser Asn Leu Asp Gly
        195                 200                 205

Asn Ile Asn Trp Asn Thr Tyr Asn Thr Tyr Arg Thr Lys Met Thr Thr
    210                 215                 220

Ala Val Leu Asp Leu Val Ala Leu Phe Pro Asn Tyr Asp Val Gly Lys
225                 230                 235                 240

Tyr Pro Ile Gly Val Gln Ser Glu Leu Thr Arg Glu Ile Tyr Gln Val
                245                 250                 255

Leu Asn Phe Glu Glu Ser Pro Tyr Lys Tyr Tyr Asp Phe Gln Tyr Gln
            260                 265                 270

Glu Asp Ser Leu Thr Arg Arg Pro His Leu Phe Thr Trp Leu Asp Ser
        275                 280                 285

Leu Asn Phe Tyr Glu Lys Ala Gln Thr Thr Pro Asn Asn Phe Phe Thr
    290                 295                 300

Ser His Tyr Asn Met Phe His Tyr Thr Leu Asp Asn Ile Ser Gln Lys
305                 310                 315                 320

Ser Ser Val Phe Gly Asn His Asn Val Thr Asp Lys Leu Lys Ser Leu
                325                 330                 335

Gly Leu Ala Thr Asn Ile Tyr Ile Phe Leu Leu Asn Val Ile Ser Leu
            340                 345                 350

Asp Asn Lys Tyr Leu Asn Asp Tyr Asn Asn Ile Ser Lys Met Asp Phe
        355                 360                 365

Phe Ile Thr Asn Gly Thr Arg Leu Leu Glu Lys Glu Leu Thr Ala Gly
    370                 375                 380

Ser Gly Gln Ile Thr Tyr Asp Val Asn Lys Asn Ile Phe Gly Leu Pro
385                 390                 395                 400

Ile Leu Lys Arg Arg Glu Glu Thr Leu Phe Pro Thr Tyr Asp Asn Tyr
                405                 410                 415

Ser His Ile Leu Ser Phe Ile Lys Ser Leu Ser Ile Pro Ala Thr Tyr
            420                 425                 430

Lys Thr Gln Val Tyr Thr Phe Ala Trp Thr His Ser Ser Val Asp Pro
        435                 440                 445

Lys Asn Thr Ile Tyr Thr His Leu Thr Thr Gln Ile Pro Ala Val Lys
    450                 455                 460

Ala Asn Ser Leu Gly Thr Ala Ser Lys Val Val Gln Gly Pro Gly His
465                 470                 475                 480

Thr Gly Gly Asp Leu Ile Asp Phe Lys Asp His Phe Lys Ile Thr Cys
                485                 490                 495

Gln His Ser Asn Phe Gln Gln Ser Tyr Phe Ile Arg Ile Arg Tyr Ala
            500                 505                 510

Ser Asn Gly Ser Ala Asn Thr Arg Ala Val Ile Asn Leu Ser Ile Pro
        515                 520                 525

Gly Val Ala Glu Leu Gly Met Ala Leu Asn Pro Thr Phe Ser Gly Thr

```
                530             535             540
Asp Tyr Thr Asn Leu Lys Tyr Lys Asp Phe Gln Tyr Leu Glu Phe Ser
545                 550                 555                 560

Asn Glu Val Lys Phe Ala Pro Asn Gln Asn Ile Ser Leu Val Phe Asn
                565                 570                 575

Arg Ser Asp Val Tyr Thr Asn Thr Thr Val Leu Ile Asp Lys Ile Glu
            580                 585                 590

Phe Leu Pro Ile Thr Arg
            595

<210> SEQ ID NO 18
<211> LENGTH: 585
<212> TYPE: PRT
<213> ORGANISM: Bacillus thuringiensis

<400> SEQUENCE: 18

Lys Asp Gln Gln Leu Phe Asn Ala Ile Met Asp Ala Val Asn Lys Met
1               5                   10                  15

Val Asp Asn Lys Phe Leu Ser Tyr Asn Leu Ser Thr Leu Asn Lys Thr
            20                  25                  30

Ile Glu Gly Leu Gln Gly Asn Leu Gly Leu Phe Gln Asn Ala Ile Gln
        35                  40                  45

Val Ala Ile Cys Gln Gly Ser Thr Pro Glu Arg Phe Asp Gln Asn Cys
    50                  55                  60

Thr Pro Cys Asn Pro Asn Gln Pro Cys Lys Asp Asp Leu Asp Arg Val
65                  70                  75                  80

Ala Ser Arg Phe Asp Thr Ala Asn Ser Gln Phe Thr Gln His Leu Pro
                85                  90                  95

Glu Phe Lys Asn Pro Trp Ser Asp Glu Asn Ser Thr Gln Glu Phe Lys
            100                 105                 110

Arg Thr Ser Val Glu Leu Thr Leu Pro Met Tyr Thr Thr Val Ala Thr
        115                 120                 125

Leu His Leu Leu Leu Tyr Glu Gly Tyr Ile Glu Phe Met Thr Lys Trp
130                 135                 140

Asn Phe His Asn Glu Gln Tyr Leu Asn Asn Leu Lys Val Glu Leu Gln
145                 150                 155                 160

Gln Leu Ile His Ser Tyr Ser Glu Thr Val Arg Thr Ser Phe Leu Gln
                165                 170                 175

Phe Leu Pro Thr Leu Asn Asn Arg Ser Lys Ser Ser Val Asn Ala Tyr
            180                 185                 190

Asn Arg Tyr Val Arg Asn Met Thr Val Asn Cys Leu Asp Ile Ala Ala
        195                 200                 205

Thr Trp Pro Thr Phe Asp Thr His Asn Tyr His Gln Gly Gly Lys Leu
    210                 215                 220

Asp Leu Thr Arg Ile Ile Leu Ser Asp Thr Ala Gly Pro Ile Glu Glu
225                 230                 235                 240

Tyr Thr Thr Gly Asp Lys Thr Ser Gly Pro Glu His Ser Asn Ile Thr
                245                 250                 255

Pro Asn Asn Ile Leu Asp Thr Pro Ser Pro Thr Tyr Gln His Ser Phe
            260                 265                 270

Val Ser Val Asp Ser Ile Val Tyr Ser Arg Lys Glu Leu Gln Gln Leu
        275                 280                 285

Asp Ile Ala Thr Tyr Ser Thr Asn Asn Ser Asn Asn Cys His Pro Tyr
    290                 295                 300
```

```
Gly Leu Arg Leu Ser Tyr Thr Asp Gly Ser Arg Tyr Asp Tyr Gly Asp
305                 310                 315                 320

Asn Gln Pro Asp Phe Thr Thr Ser Asn Asn Asn Tyr Cys His Asn Ser
                325                 330                 335

Tyr Thr Ala Pro Ile Thr Leu Val Asn Ala Arg His Leu Tyr Asn Ala
            340                 345                 350

Lys Gly Ser Leu Gln Asn Val Glu Ser Leu Val Val Ser Thr Val Asn
        355                 360                 365

Gly Gly Ser Gly Ser Cys Ile Cys Asp Ala Trp Ile Asn Tyr Leu Arg
    370                 375                 380

Pro Pro Gln Thr Ser Lys Asn Glu Ser Arg Pro Asp Gln Lys Ile Asn
385                 390                 395                 400

Val Leu Tyr Pro Ile Thr Glu Thr Val Asn Lys Gly Thr Gly Gly Asn
                405                 410                 415

Leu Gly Val Ile Ser Ala Tyr Val Pro Met Glu Leu Val Pro Glu Asn
            420                 425                 430

Val Ile Gly Asp Val Asn Ala Asp Thr Lys Leu Pro Leu Thr Gln Leu
        435                 440                 445

Lys Gly Phe Pro Phe Glu Lys Tyr Gly Ser Glu Tyr Asn Asn Arg Gly
    450                 455                 460

Ile Ser Leu Val Arg Glu Trp Ile Asn Gly Asn Asn Ala Val Lys Leu
465                 470                 475                 480

Ser Asn Ser Gln Ser Val Gly Ile Gln Ile Thr Asn Gln Thr Lys Gln
                485                 490                 495

Lys Tyr Glu Ile Arg Cys Arg Tyr Ala Ser Lys Gly Asp Asn Asn Val
            500                 505                 510

Tyr Phe Asn Val Asp Leu Ser Glu Asn Pro Phe Arg Asn Ser Ile Ser
        515                 520                 525

Phe Gly Ser Thr Glu Ser Ser Val Val Gly Val Gln Gly Glu Asn Gly
    530                 535                 540

Lys Tyr Ile Leu Lys Ser Ile Thr Thr Val Glu Ile Pro Ala Gly Ser
545                 550                 555                 560

Phe Tyr Val His Ile Thr Asn Gln Gly Ser Ser Asp Leu Phe Leu Asp
                565                 570                 575

Arg Ile Glu Phe Val Pro Lys Ile Gln
            580                 585

<210> SEQ ID NO 19
<211> LENGTH: 590
<212> TYPE: PRT
<213> ORGANISM: Bacillus thuringiensis

<400> SEQUENCE: 19

Ser Met Ile Phe Ser Ser Ile Ser Ile Ile Arg Thr Phe Met Gly Phe
1               5                   10                  15

Ala Gly His Gly Thr Ala Gly Gly Ile Ile Gly Leu Phe Thr Glu Val
            20                  25                  30

Leu Arg Leu Leu Trp Pro Asn Lys Gln Asn Asp Leu Trp Glu Ser Phe
        35                  40                  45

Met Asn Glu Val Glu Ala Leu Ile Asn Gln Glu Ile Thr Glu Ala Val
    50                  55                  60

Val Ser Lys Ala Leu Ser Glu Leu Glu Gly Leu Arg Asn Ala Leu Glu
65                  70                  75                  80

Gly Tyr Thr Ser Ala Leu Glu Ala Trp Gln Asn Asn Arg Ser Asp Lys
                85                  90                  95
```

```
Leu Lys Gln Leu Leu Val Tyr Glu Arg Phe Val Ser Thr Glu Asn Leu
            100                 105                 110

Phe Lys Phe Ala Met Pro Ser Phe Arg Ser Val Gly Phe Glu Gly Pro
            115                 120                 125

Leu Leu Thr Val Tyr Ala Gln Ala Ala Asn Leu His Leu Phe Leu Leu
            130                 135                 140

Lys Asn Ala Glu Leu Phe Gly Ala Glu Trp Gly Met Gln Gln Tyr Glu
145                 150                 155                 160

Ile Asp Leu Phe Tyr Asn Glu Gln Lys Gly Tyr Val Glu Tyr Thr
                    165                 170                 175

Asp His Cys Val Lys Trp Tyr Lys Gly Leu Asn Lys Leu Lys Asn
                180                 185                 190

Ala Ser Gly Val Lys Gly Lys Val Trp Glu Asn Tyr Asn Arg Phe Arg
            195                 200                 205

Arg Glu Met Thr Ile Met Val Leu Asp Leu Leu Pro Leu Phe Pro Ile
            210                 215                 220

Tyr Asp Ala Arg Thr Tyr Pro Met Glu Thr Val Thr Glu Leu Thr Arg
225                 230                 235                 240

Gln Ile Phe Thr Asp Pro Ile Gly Leu Thr Gly Ile Asn Glu Thr Lys
                    245                 250                 255

Tyr Pro Asp Trp Tyr Gly Ala Ala Ser Ser Glu Phe Val Leu Ile Glu
                260                 265                 270

Asn Arg Ala Ile Pro Lys Pro Gly Leu Phe Gln Trp Leu Thr Lys Ile
            275                 280                 285

Asn Val Arg Ala Arg Val Val Glu Pro Asn Asp Arg Phe Ala Ile Trp
            290                 295                 300

Thr Gly His Ser Val Val Thr Gln Tyr Thr Lys Ser Thr Thr Glu Asn
305                 310                 315                 320

Thr Phe Asn Tyr Gly Thr Ser Ser Gly Ser Thr Leu Ser His Thr Phe
                    325                 330                 335

Asp Leu Leu Ser Lys Asp Ile Tyr Gln Thr Tyr Ser Ile Ala Ala Ala
                340                 345                 350

Asn Lys Ser Ala Thr Trp Tyr Gln Ala Val Pro Leu Leu Arg Leu Tyr
            355                 360                 365

Gly Ile Asn Ser Ser Asn Val Leu Ser Glu Asp Ala Phe Ser Phe Ser
            370                 375                 380

Asn Asn Ile Pro Ser Ser Lys Cys Lys Ser Thr Tyr Ser Ser Asp Gln
385                 390                 395                 400

Leu Pro Ile Glu Leu Asp Glu Pro Ile Tyr Gly Asp Leu Glu Glu
                    405                 410                 415

Tyr Gly His Arg Leu Ser Tyr Val Ser Glu Ile Phe Lys Glu Thr Gly
                420                 425                 430

Ser Gly Thr Ile Pro Val Leu Gly Trp Thr His Val Ser Val Arg Pro
            435                 440                 445

Asp Asn Lys Leu Tyr Pro Asp Lys Ile Thr Gln Ile Pro Ala Val Lys
            450                 455                 460

Ala Phe Glu Thr Asn Thr Ala Gly Val Glu Ile Ile Asp Ser Ala Ser
465                 470                 475                 480

Thr Gly Gly Pro Ile Leu Lys Ile Val Asn Asn Leu Pro Ser Asn
                    485                 490                 495

Gln Val Phe Arg Met Arg Leu Ser Phe Ser Glu Pro Gln Lys Ile Lys
                500                 505                 510
```

```
Val Arg Val Arg Tyr Ala Ala Thr Gly Asp Gly Val Met Ser Phe Ser
            515                 520                 525

Gly Ile Ala His Asp Glu Tyr Phe Thr Ala Thr Met Lys Glu Gly Glu
        530                 535                 540

Ala Leu Lys Tyr Ser Tyr Leu Thr Met Gly Asn Asp Tyr Ala Gly Thr
545                 550                 555                 560

Ala Ala Glu Leu Ser Met Leu Tyr Ile Ile Lys Ala Asn Thr Ser Asn
                565                 570                 575

Cys Thr Ile Tyr Ile Asp Lys Ile Glu Phe Ile Pro Val Val
            580                 585                 590

<210> SEQ ID NO 20
<211> LENGTH: 589
<212> TYPE: PRT
<213> ORGANISM: Bacillus thuringiensis

<400> SEQUENCE: 20

Ile Ser Glu Arg Asp Ala Val Lys Thr Ala Ile Ser Leu Val Gly Thr
1               5                   10                  15

Ile Leu Gly Lys Leu Gly Val Pro Leu Val Gly Pro Ile Val Ser Leu
            20                  25                  30

Tyr Ser Thr Leu Ile Asp Val Leu Trp Pro Gly Gly Lys Ser Gln Trp
        35                  40                  45

Glu Ile Phe Met Glu Gln Val Glu Ala Leu Ile Asn Gln Lys Ile Ala
    50                  55                  60

Glu Tyr Ala Arg Ala Lys Ala Leu Ala Glu Leu Gly Leu Gly Asn
65                  70                  75                  80

Asn Tyr Gln Leu Tyr Leu Thr Ala Leu Glu Glu Trp Gln Glu Asn Pro
                85                  90                  95

Ser Ser Thr Arg Val Leu Arg Asp Val Arg Asn Arg Phe Glu Ile Leu
            100                 105                 110

Asp Ser Leu Phe Thr Gln Tyr Met Pro Ser Phe Arg Val Thr Gly Tyr
        115                 120                 125

Glu Val Pro Leu Leu Ser Val Tyr Ala Gln Ala Ala Asn Leu His Leu
    130                 135                 140

Leu Leu Leu Lys Asp Ala Ser Ile Phe Gly Glu Trp Gly Phe Ser
145                 150                 155                 160

Thr Thr Ala Ile Asn Asn Tyr Tyr Asn Arg Gln Met Ser Leu Ile Ala
                165                 170                 175

Gln Tyr Ser Asp His Cys Val Gln Trp Tyr Arg Thr Gly Leu Asp Arg
            180                 185                 190

Leu Lys Gly Ser Asn Ala Lys Gln Trp Val Glu Tyr Asn Arg Phe Arg
        195                 200                 205

Arg Glu Met Thr Leu Ser Val Leu Asp Ile Met Thr Leu Phe Pro Met
    210                 215                 220

Tyr Asp Met Arg Thr Tyr Pro Met Glu Thr Lys Ala Gln Leu Thr Arg
225                 230                 235                 240

Glu Val Tyr Thr Asp Pro Ile Gly Ala Ile Gly Ala Gln Gly Ser Trp
                245                 250                 255

Tyr Asp Ser Ala Pro Ser Phe Asn Thr Leu Glu Ser Thr Phe Ile Arg
            260                 265                 270

Gly Lys His Leu Phe Asp Phe Ile Thr Arg Leu Ser Ile Tyr Thr Gly
        275                 280                 285

Arg Ser Ser Phe Ser Ala Ser Asn Tyr Leu Lys Lys Trp Ile Gly His
    290                 295                 300
```

Gln Ile Ser Ser Gln Pro Ile Gly Gly Ser Ile Gln Thr Gln Thr Tyr
305 310 315 320

Gly Thr Thr Ser Gly Ser Ser Val Ile Ala Thr Gln Gln Ile Gly Phe
325 330 335

Thr Gly Phe Asp Val Tyr Lys Thr Leu Ser Thr Ala Gly Val Leu Phe
340 345 350

Ala Tyr Thr Ser Lys Tyr Tyr Gly Val Ser Lys Val Val Phe Asp Ala
355 360 365

Ile Tyr Pro Asp Asn Lys Tyr Lys Thr Thr Phe Thr Tyr Asn Pro Gly
370 375 380

Ser Glu Gly Ile Gly Ala Gln Glu Lys Asp Ser Glu Val Glu Leu Pro
385 390 395 400

Pro Glu Thr Leu Asp Gln Pro Asn Tyr Glu Ala Tyr Ser His Arg Leu
405 410 415

Asn Tyr Val Thr Phe Ile Arg Asn Pro Asp Val Pro Val Phe Ser Trp
420 425 430

Thr His Arg Ser Ala Asp Arg Thr Asn Thr Val Tyr Ser Asp Lys Ile
435 440 445

Thr Gln Ile Pro Val Val Lys Ala Ser Asp Gly Pro Lys Pro Ser Ala
450 455 460

Asn Glu Val Gly His Tyr Leu Gly Gly Asp Pro Ile Ser Phe Asn Ser
465 470 475 480

Ser Gly Ser Thr Gly Val Ile Arg Leu Asn Ile Asn Ser Pro Leu Ser
485 490 495

Gln Lys Tyr Arg Val Arg Ile Arg Tyr Cys Ser Ser Val Asp Phe Asp
500 505 510

Leu Asp Val Val Arg Gly Gly Thr Thr Val Asn Asn Gly Arg Phe Asn
515 520 525

Lys Ser Ala Pro Asn Val Gly Trp Gln Ser Leu Lys Tyr Glu Asn Phe
530 535 540

Lys Phe Ala Ser Phe Ser Thr Pro Phe Thr Phe Asn Gln Ala Gln Asp
545 550 555 560

Thr Leu Lys Ile Ser Val Arg Asn Phe Ser Ser Ile Val Gly Gly Ser
565 570 575

Val Val Tyr Ile Asp Arg Ile Glu Leu Ile Pro Val Asn
580 585

<210> SEQ ID NO 21
<211> LENGTH: 571
<212> TYPE: PRT
<213> ORGANISM: Bacillus thuringiensis

<400> SEQUENCE: 21

Thr Met Leu Gly Ala Phe Ala Ala Pro Val Leu Ala Ala Gly Ile Ile
1 5 10 15

Ser Phe Gly Thr Leu Leu Pro Ile Phe Trp Gln Gly Ser Asp Pro Ala
20 25 30

Asn Val Trp Gln Asp Leu Leu Asn Ile Gly Gly Arg Pro Ile Gln Glu
35 40 45

Ile Asp Lys Asn Ile Ile Asn Val Leu Thr Ser Ile Val Thr Pro Ile
50 55 60

Lys Asn Gln Leu Asp Lys Tyr Gln Glu Phe Phe Asp Lys Trp Glu Pro
65 70 75 80

Ala Arg Thr His Ala Asn Ala Lys Ala Val His Asp Leu Phe Thr Thr

```
                85                  90                  95
Leu Glu Pro Ile Ile Asp Lys Asp Leu Asp Met Leu Lys Asn Asn Ala
            100                 105                 110

Ser Tyr Arg Ile Pro Thr Leu Pro Ala Tyr Ala Gln Ile Ala Thr Trp
            115                 120                 125

His Leu Asn Leu Leu Lys His Ala Ala Thr Tyr Tyr Asn Ile Trp Leu
            130                 135                 140

Gln Asn Gln Gly Ile Asn Pro Ser Thr Phe Asn Ser Ser Asn Tyr Tyr
145                 150                 155                 160

Gln Gly Tyr Leu Lys Arg Lys Ile Gln Glu Tyr Thr Asp Tyr Cys Ile
                165                 170                 175

Gln Thr Tyr Asn Ala Gly Leu Thr Met Ile Arg Thr Asn Thr Asn Ala
            180                 185                 190

Thr Trp Asn Met Tyr Asn Thr Tyr Arg Leu Glu Met Thr Leu Thr Val
            195                 200                 205

Leu Asp Leu Ile Ala Ile Phe Pro Asn Tyr Asp Pro Glu Lys Tyr Pro
            210                 215                 220

Ile Gly Val Lys Ser Glu Leu Ile Arg Glu Val Tyr Thr Asn Val Asn
225                 230                 235                 240

Ser Asp Thr Phe Arg Thr Ile Thr Glu Leu Glu Asn Gly Leu Thr Arg
                245                 250                 255

Asn Pro Thr Leu Phe Thr Trp Ile Asn Gln Gly Arg Phe Tyr Thr Arg
            260                 265                 270

Asn Ser Arg Asp Ile Leu Asp Pro Tyr Asp Ile Phe Ser Phe Thr Gly
                275                 280                 285

Asn Gln Met Ala Phe Thr His Thr Asn Asp Arg Asn Ile Ile Trp
            290                 295                 300

Gly Ala Val His Gly Asn Ile Ile Ser Gln Asp Thr Ser Lys Val Phe
305                 310                 315                 320

Pro Phe Tyr Arg Asn Lys Pro Ile Asp Lys Val Glu Ile Val Arg His
                325                 330                 335

Arg Glu Tyr Ser Asp Ile Ile Tyr Glu Met Ile Phe Phe Ser Asn Ser
            340                 345                 350

Ser Glu Val Phe Arg Tyr Ser Ser Asn Ser Thr Ile Glu Asn Asn Tyr
            355                 360                 365

Lys Arg Thr Asp Ser Tyr Met Ile Pro Lys Gln Thr Trp Lys Asn Glu
            370                 375                 380

Glu Tyr Gly His Thr Leu Ser Tyr Ile Lys Thr Asp Asn Tyr Ile Phe
385                 390                 395                 400

Ser Val Val Arg Glu Arg Arg Val Ala Phe Ser Trp Thr His Thr
                405                 410                 415

Ser Val Asp Phe Gln Asn Thr Ile Asp Leu Asp Asn Ile Thr Gln Ile
            420                 425                 430

His Ala Leu Lys Ala Leu Lys Val Ser Ser Asp Ser Lys Ile Val Lys
            435                 440                 445

Gly Pro Gly His Thr Gly Gly Asp Leu Val Ile Leu Lys Asp Ser Met
            450                 455                 460

Asp Phe Arg Val Arg Phe Leu Lys Asn Val Ser Arg Gln Tyr Gln Val
465                 470                 475                 480

Arg Ile Arg Tyr Ala Thr Asn Ala Pro Lys Thr Thr Val Phe Leu Thr
                485                 490                 495

Gly Ile Asp Thr Ile Ser Val Glu Leu Pro Ser Thr Thr Ser Arg Gln
            500                 505                 510
```

Asn Pro Asn Ala Thr Asp Leu Thr Tyr Ala Asp Phe Gly Tyr Val Thr
515 520 525

Phe Pro Arg Thr Val Pro Asn Lys Thr Phe Glu Gly Glu Asp Thr Leu
530 535 540

Leu Met Thr Leu Tyr Gly Thr Pro Asn His Ser Tyr Asn Ile Tyr Ile
545 550 555 560

Asp Lys Ile Glu Phe Ile Pro Ile Thr Gln Ser
565 570

<210> SEQ ID NO 22
<211> LENGTH: 559
<212> TYPE: PRT
<213> ORGANISM: Bacillus thuringiensis

<400> SEQUENCE: 22

Lys Val Leu Ser Leu Ile Phe Pro Gly Ser Gln Pro Ala Thr Met Glu
1 5 10 15

Lys Val Arg Thr Glu Val Glu Thr Leu Ile Asn Gln Lys Leu Ser Gln
20 25 30

Asp Arg Val Asn Ile Leu Asn Ala Glu Tyr Arg Gly Ile Ile Glu Val
35 40 45

Ser Asp Val Phe Asp Ala Tyr Ile Lys Gln Pro Gly Phe Thr Pro Ala
50 55 60

Thr Ala Lys Gly Tyr Phe Leu Asn Leu Ser Gly Ala Ile Ile Gln Arg
65 70 75 80

Leu Pro Gln Phe Glu Val Gln Thr Tyr Glu Gly Val Ser Ile Ala Leu
85 90 95

Phe Thr Gln Met Cys Thr Leu His Leu Thr Leu Leu Lys Asp Gly Ile
100 105 110

Leu Ala Gly Ser Ala Trp Gly Phe Thr Gln Ala Asp Val Asp Ser Phe
115 120 125

Ile Lys Leu Phe Asn Gln Lys Val Leu Asp Tyr Arg Thr Arg Leu Met
130 135 140

Arg Met Tyr Thr Glu Glu Phe Gly Arg Leu Cys Lys Val Ser Leu Lys
145 150 155 160

Asp Gly Leu Thr Phe Arg Asn Met Cys Asn Leu Tyr Val Phe Pro Phe
165 170 175

Ala Glu Ala Trp Ser Leu Met Arg Tyr Glu Gly Leu Lys Leu Gln Ser
180 185 190

Ser Leu Ser Leu Trp Asp Tyr Val Gly Val Ser Ile Pro Val Asn Tyr
195 200 205

Asn Glu Trp Gly Gly Leu Val Tyr Lys Leu Leu Met Gly Glu Val Asn
210 215 220

Gln Arg Leu Thr Thr Val Lys Phe Asn Tyr Ser Phe Thr Asn Glu Pro
225 230 235 240

Ala Asp Ile Pro Ala Arg Glu Asn Ile Arg Gly Val His Pro Ile Tyr
245 250 255

Asp Pro Ser Ser Gly Leu Thr Gly Trp Ile Gly Asn Gly Arg Thr Asn
260 265 270

Asn Phe Asn Phe Ala Asp Asn Asn Gly Asn Glu Ile Met Glu Val Arg
275 280 285

Thr Gln Thr Phe Tyr Gln Asn Pro Asn Asn Glu Pro Ile Ala Pro Arg
290 295 300

Asp Ile Ile Asn Gln Ile Leu Thr Ala Pro Ala Pro Ala Asp Leu Phe

```
305                 310                 315                 320
Phe Lys Asn Ala Asp Ile Asn Val Lys Phe Thr Gln Trp Phe Gln Ser
                325                 330                 335

Thr Leu Tyr Gly Trp Asn Ile Lys Leu Gly Thr Gln Thr Val Leu Ser
                340                 345                 350

Ser Arg Thr Gly Thr Ile Pro Pro Asn Tyr Leu Ala Tyr Asp Gly Tyr
                355                 360                 365

Tyr Ile Arg Ala Ile Ser Ala Cys Pro Arg Gly Val Ser Leu Ala Tyr
                370                 375                 380

Asn His Asp Leu Thr Thr Leu Thr Tyr Asn Arg Ile Glu Tyr Asp Ser
385                 390                 395                 400

Pro Thr Thr Glu Asn Ile Ile Val Gly Phe Ala Pro Asp Asn Thr Lys
                405                 410                 415

Asp Phe Tyr Ser Lys Lys Ser His Tyr Leu Ser Asn Asp Ser Tyr Val
                420                 425                 430

Ile Pro Ala Leu Gln Phe Thr Asp Gly Ser Ile Lys Phe Ala Arg Thr
                435                 440                 445

Phe Ile Ser Asn Glu Ala Lys Tyr Ser Ile Arg Leu Asn Thr Gly Phe
450                 455                 460

Asn Thr Ala Thr Arg Tyr Lys Leu Ile Ile Arg Val Arg Val Pro Tyr
465                 470                 475                 480

Arg Leu Pro Ala Gly Ile Arg Val Gln Ser Gln Asn Ser Gly Asn Asn
                485                 490                 495

Arg Met Leu Gly Ser Phe Thr Ala Asn Ala Asn Pro Glu Trp Val Asp
                500                 505                 510

Phe Val Thr Asp Ala Phe Thr Phe Asn Asp Leu Gly Ile Thr Thr Ser
                515                 520                 525

Ser Thr Asn Ala Leu Phe Ser Ile Ser Ser Asp Ser Leu Asn Ser Gly
                530                 535                 540

Glu Glu Trp Tyr Leu Ser Gln Leu Phe Leu Val Lys Glu Ser Ala
545                 550                 555
```